(12) United States Patent
Toyooka

(10) Patent No.: US 10,989,843 B2
(45) Date of Patent: Apr. 27, 2021

(54) TRANSPARENT ELECTRODE-ATTACHED COMPLEX, TRANSFER FILM, METHOD FOR MANUFACTURING TRANSPARENT ELECTRODE-ATTACHED COMPLEX, AND ELECTROSTATIC CAPACITANCE-TYPE INPUT DEVICE

(71) Applicant: FUJIFILM Corporation, Tokyo (JP)

(72) Inventor: Kentaro Toyooka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 177 days.

(21) Appl. No.: 15/828,849

(22) Filed: Dec. 1, 2017

(65) Prior Publication Data

US 2018/0081087 A1    Mar. 22, 2018

Related U.S. Application Data

(63) Continuation of application No. PCT/JP2016/071829, filed on Jul. 26, 2016.

(30) Foreign Application Priority Data

Jul. 27, 2015   (JP) .............................. JP2015-148099

(51) Int. Cl.
  *G02B 1/115*   (2015.01)
  *B32B 7/02*    (2019.01)
  (Continued)

(52) U.S. Cl.
  CPC ............. *G02B 1/115* (2013.01); *B32B 7/02* (2013.01); *B32B 37/02* (2013.01); *B32B 37/025* (2013.01);
  (Continued)

(58) Field of Classification Search
  None
  See application file for complete search history.

(56) References Cited

U.S. PATENT DOCUMENTS 7,247,568 B2 * 7/2007 Grupp ................. G04B 39/006
  438/694
8,872,786 B2 * 10/2014 Matsuo .................. G06F 3/044
  345/174
(Continued)

FOREIGN PATENT DOCUMENTS

CN      1636914 A     7/2005
JP   2010-086684 A    4/2010
(Continued)

OTHER PUBLICATIONS

Machine translation of WO 2014084112 into English; Kanna. (Year: 2014).*
(Continued)

*Primary Examiner* — Brian M Butcher
(74) *Attorney, Agent, or Firm* — Sughrue Mion, PLLC

(57) ABSTRACT

Provided are a transparent electrode-attached complex which includes a base material, a transparent electrode pattern, an optical adjustment member, and a transparent protective layer in this order, in which the optical adjustment member has at least one layer of low-refractive index layers that are odd-numbered layers from a transparent electrode pattern side and at least one layer of high-refractive index layers that are even-numbered layers from the transparent electrode pattern side, a difference in refractive index between the low-refractive index layer and the high-refractive index layer that are directly adjacent to each other is 0.05 or more, a refractive index of the high-refractive index layer is 2.10 or lower, and a thickness of each of the low-refractive index layer and the high-refractive index layer is 5 to 80 nm, has excellent transparent electrode pattern-masking properties, is capable of reducing unevenness attributed to an optical adjustment member, and has an excellent pencil hardness even without using a transparent film having a high refractive index on the base material-side (Continued)

of a transparent electrode pattern; a transfer film; a method for manufacturing a transparent electrode-attached complex; and an electrostatic capacitance-type input device.

21 Claims, 9 Drawing Sheets

(51) Int. Cl.
| | | |
|---|---|---|
| *B32B 37/02* | (2006.01) | |
| *G02B 1/14* | (2015.01) | |
| *G06F 3/044* | (2006.01) | |
| *H01B 5/14* | (2006.01) | |
| *B32B 37/00* | (2006.01) | |
| *H01B 13/00* | (2006.01) | |

(52) U.S. Cl.
CPC ............ *G02B 1/14* (2015.01); *G06F 3/0446* (2019.05); *H01B 5/14* (2013.01); *H01B 13/0036* (2013.01); *B32B 2307/412* (2013.01); *B32B 2307/418* (2013.01); *B32B 2457/208* (2013.01); *G06F 2203/04103* (2013.01)

(56) References Cited

U.S. PATENT DOCUMENTS

| | | |
|---|---|---|
| 2013/0063820 A1 | 3/2013 | Yang et al. |
| 2015/0251393 A1 | 9/2015 | Kanna et al. |

FOREIGN PATENT DOCUMENTS

| | | |
|---|---|---|
| JP | 2013-057928 A | 3/2013 |
| JP | 2013-246610 A | 12/2013 |
| JP | 2014-106779 A | 6/2014 |
| JP | 2014-108541 A | 6/2014 |
| JP | 2014-142834 A | 8/2014 |
| JP | 2014-153987 A | 8/2014 |
| JP | 2015-099538 A | 5/2015 |

OTHER PUBLICATIONS

Notification of Reasons for Refusal dated Feb. 26, 2019 from the Japanese Patent Office in Japanese application No. 2017-530874.
International Search Report for PCT/JP2016/071829 dated Oct. 4, 2016 [PCT/ISA/210].
International Preliminary Report on Patentability with translation of Written Opinion dated Jan. 30, 2018 in counterpart International Application No. PCT/JP2016/071829.
Written Opinion dated Oct. 4, 2016 in counterpart International Application No. PCT/JP2016/071829.
Office Action dated Sep. 10, 2019, from the Japanese Patent Office in counterpart Japanese Application No. 2017-530874.
Office Action dated Dec. 18, 2019 from the State Intellectual Property Office of the P.R.C. in Chinese Application No. 201680036684.8.

\* cited by examiner

TRANSPARENT ELECTRODE-ATTACHED COMPLEX, TRANSFER FILM, METHOD FOR MANUFACTURING TRANSPARENT ELECTRODE-ATTACHED COMPLEX, AND ELECTROSTATIC CAPACITANCE-TYPE INPUT DEVICE

CROSS-REFERENCE TO RELATED APPLICATIONS

This application is a Continuation of PCT International Application No. PCT/JP2016/071829, filed on Jul. 26, 2016, which claims priority under 35 U.S.C. Section 119(a) to Japanese Patent Application No. 2015-148099 filed on Jul. 27, 2015. Each of the above applications is hereby expressly incorporated by reference, in its entirety, into the present application.

BACKGROUND OF THE INVENTION

1. Field of the Invention

The present invention relates to a transparent electrode-attached complex, a transfer film, a method for manufacturing a transparent electrode-attached complex, and an electrostatic capacitance-type input device.

2. Description of the Related Art

Recently, as electronic devices such as mobile phones, car navigations, personal computers, ticket vending machines, and bank terminals, there are electronic devices in which a liquid crystal display device having a touch panel-type input device is provided and desired commands can be input by touching images and the like displayed on the liquid crystal display device with a finger, a stylus, or the like.

As the input device (touch panel), there are resistance film-type input devices, electrostatic capacitance-type input devices, and the like.

The electrostatic capacitance-type input devices have an advantage that a transparent conductive film needs to be formed on only one base material. As such electrostatic capacitance-type input devices, for example, there are input devices in which transparent electrode patterns are extended in mutually intersecting directions and input locations are detected by detecting changes in the electrostatic capacitance between electrodes caused in a case in which the input surfaces of electrostatic capacitance-type input devices are touched by fingers or the like (for example, refer to JP2014-108541A).

JP2014-108541A describes a transparent laminate having a transparent electrode pattern, a second curable transparent resin layer disposed adjacent to the transparent electrode pattern, and a first curable transparent resin layer disposed adjacent to the second curable transparent resin layer, in which the refractive index of the second curable transparent resin layer is higher than the refractive index of the first curable transparent resin layer, and the refractive index of the second curable transparent resin layer is 1.6 or higher. JP2014-108541A describes that the transparent laminate preferably further has a transparent film having a refractive index of 1.6 to 1.78 and a thickness of 55 to 110 nm on a side of the transparent electrode pattern opposite to the side on which the second curable transparent resin layer is formed. According to JP2014-108541A, it is described that, in a case in which the refractive index difference between the transparent electrode pattern (preferably indium tin oxide; ITO) and the second curable transparent resin layer and the refractive index difference between the second curable transparent resin layer and the first curable transparent resin layer are decreased, light reflection is reduced, and thus the transparent electrode pattern becomes rarely visible, and the visibility can be improved.

JP2014-106779A describes a transparent conductive film including a hardcoat layer, a high-refractive index layer having a refractive index of 1.60 or higher and 1.70 or lower and a thickness of 25 nm or more and 35 nm or less, a low-refractive index layer having a refractive index of 1.40 or higher and 1.50 or lower and a thickness of 40 nm or more and 50 nm or less, and a transparent conductive layer in this order on a single surface or each of both surfaces of a transparent film base material. According to JP2014-106779A, it is described that, due to the above-described constitution, the generation of tints is suppressed, and, even in a case in which the transparent conductive layer is patterned, a transparent conductive film capable of suppressing the difference in visibility between pattern-formed portions and pattern-opening portions can be obtained.

JP2015-99538A describes a hardcoat film for a touch panel in which an undercoat layer containing fine particles a, a high-refractive index layer containing fine particles b, and a low-refractive index layer containing fine particles c are laminated in this order on a light-transmitting base material, and the respective average particle diameters of the fine particles a, the fine particles b, and the fine particles c satisfy a relationship of the following expression;

the average particle diameter of the fine particles a>the average particle diameter of the fine particles b>the average particle diameter of the fine particles c.

According to JP2015-99538A, it is described that, due to the above-described constitution, the adhesiveness between the high-refractive index layer and the low-refractive index layer is extremely excellent and the film hardness is also excellent.

JP2010-86684A describes a transparent conductive wire film-attached glass substrate in which a transparent conductive wire film is formed on a glass substrate, and a dielectric optical multilayer film in which the transmittance in portions provided with the wire film and the transmittance in portions not provided with the wire film become equal to each other is provided. Table 1 in JP2010-86684A shows that a laminated film of six layers (five layers in portions not provided with an ITO wiring pattern) of the ITO wiring pattern/$SiO_2$/$Nb_2O_5$/$SiO_2$/$Nb_2O_5$/$SiO_2$ on soda-lime glass. According to JP2010-86684A, it is described that, due to the above-described constitution, in a case in which portions having a wiring pattern and portions not having a wiring pattern are compared to each other in the visible light range, both the transmittance and the reflectivity are different only to a slight extent and almost identical, and thus a defect of wiring patterns being visible, which is a defect of the related art, is solved, and neutral tones can also be realized.

SUMMARY OF THE INVENTION

In the method for providing a high-refractive index layer between a base material and the transparent electrode pattern, which is described in JP2014-108541A, the transparent electrode pattern-masking properties are excellent, but the reduction of manufacturing costs and the improvement of manufacturing suitability in the case of forming the transparent electrode pattern are required. Therefore, there is a demand for providing a transparent electrode-attached complex having excellent transparent electrode pattern-masking properties with a new layer constitution having excellent manufacturing costs and excellent manufacturing suitability in which the high-refractive index layer is provided on a side of the transparent electrode pattern opposite to the base material without using a high-refractive index transparent film on the base material side of the transparent electrode pattern.

The present inventors studied the improvement of the transparent electrode pattern-masking properties with new layer constitutions. As a result, it was found that the layer constitutions are different from each other in a case in which a transparent film having a high refractive index is provided on the base material side of a transparent conductive pattern and in a case in which a transparent film having a high refractive index is provided on the side opposite to the base material, and thus the preferred range of the refractive index or the thickness is preferably different from that of the high-refractive index layer or the low-refractive index layer described in JP2014-106779A or JP2010-86684A.

Furthermore, in the constitution of the ITO wiring pattern/ $SiO_2/Nb_2O_5/SiO_2/Nb_2O_5/SiO_2$ shown in Table 1 of JP2010-86684A, it is found that, thickness unevenness (the unevenness of thickness) caused due to the thin thickness of layers for adjusting refractive indexes other than the transparent electrode pattern, that is, unevenness attributed to optical adjustment members is caused in reflected light from the base material surface.

In addition, even in a case in which the transparent electrode pattern-masking properties are improved with the new lamination order, the demand for imparting the hardcoat characteristics described in JP2014-106779A or JP2015-99538A still remains.

The present invention has been made in consideration of the above-described circumstances. An object that the present invention tries to achieve is to provide a transparent electrode-attached complex which, even without using a transparent film having a high refractive index on the base material-side of a transparent electrode pattern, has excellent transparent electrode pattern-masking properties, is capable of reducing unevenness attributed to an optical adjustment member, and has an excellent pencil hardness.

Another object that the present invention tries to achieve is to provide a transfer film which is used in a method for manufacturing a transparent electrode-attached complex which, even without using a transparent film having a high refractive index on the base material-side of a transparent electrode pattern, has excellent transparent electrode pattern-masking properties, is capable of reducing unevenness attributed to an optical adjustment member, and has an excellent pencil hardness.

Still another object that the present invention tries to achieve is to provide a method for manufacturing a transparent electrode-attached complex which, even without using a transparent film having a high refractive index on the base material-side of a transparent electrode pattern, has excellent transparent electrode pattern-masking properties, is capable of reducing unevenness attributed to an optical adjustment member, and has an excellent pencil hardness.

Far still another object that the present invention tries to achieve is to provide an electrostatic capacitance-type input device including a transparent electrode-attached complex which, even without using a transparent film having a high refractive index on the base material-side of a transparent electrode pattern, has excellent transparent electrode pattern-masking properties, is capable of reducing unevenness attributed to an optical adjustment member, and has an excellent pencil hardness.

The present inventors carried out intensive studies in order to achieve the above-described objects. As a result, it was found that, in a transparent electrode-attached complex having a base material, a transparent electrode pattern, an optical adjustment member, and a transparent protective layer in this order, in a case in which the thicknesses and refractive indexes of a low-refractive index layer and a high-refractive index layer included in the optical adjustment member are designed to be in specific ranges, even without using a transparent film having a high refractive index on the base material-side of the transparent electrode pattern, the transparent electrode pattern-masking properties are excellent, unevenness attributed to the optical adjustment member can be reduced, and the pencil hardness is excellent.

This new layer constitution was a layer constitution which could not be imagined by ordinary designs of persons skilled in the art. For example, JP2015-99538A described that a laminate in which a transparent substrate is attached to the surface of the hardcoat film for a touch panel on which the low-refractive index layer and a conductive layer are not formed through a transparent pressure-sensitive adhesive layer may be formed. JP2015-99538A does not disclose or imply the attachment of a transparent substrate to the surface of the hardcoat film for a touch panel on which the low-refractive index layer and a conductive layer are formed. The hardcoat film for a touch panel is generally a hardcoat film that serves as a base material for conductive layers in the touch panel field as described in "Investigation Results of Electrostatic Capacitance-Type Touch Panel and Member Market 2015" by Yano Research Institute Ltd. Therefore, the lamination of the transparent substrate on the conductive layer side of the hardcoat film for a touch panel of Cited Document 3 is a layer constitution that cannot be imagined by ordinary designs of persons skilled in the art.

Meanwhile, in fields other than transparent electrode-attached complexes, JP2004-50734A describes a transfer film having an antireflection transfer film provided on the base material film surface, in which the antireflection transfer film includes at least a first refraction layer, a second refraction layer, or a third refraction layer, the respective layers are laminated on the base material film surface in the described order, and the visible light refractive indexes of the first refraction layer, the second refraction layer, and the third refraction layer decrease in the order of the second refraction layer, the third refraction layer, and the first refraction layer. The transfer film described in JP2004-50734A in which three layers having different refractive indexes are laminated together has an object of preventing reflection on the interface between glass and the air by being transferred to glass or acrylic resins, and the interface used to prevent reflection is different from that in the present invention, and thus the design of the refractive index and the thickness is different.

The present invention which is specific means for achieving the above-described objects and preferred aspects of the present invention will be described below.

[1] A transparent electrode-attached complex comprising in this order: a base material; a transparent electrode pattern; an optical adjustment member; and a transparent protective layer, in which the optical adjustment member has at least one layer of low-refractive index layers that are odd-numbered layers from a transparent electrode pattern side and at least one layer of high-refractive index layers that are even-numbered layers from the transparent electrode pattern side, a difference in refractive index between the low-refractive index layer and the high-refractive index layer that are directly adjacent to each other is 0.05 or more, a refractive index of the high-refractive index layer is 2.10 or lower, and a thickness of each of the low-refractive index layer and the high-refractive index layer is 5 to 80 nm.

[2] The transparent electrode-attached complex according to [1], in which the base material and the transparent electrode pattern are preferably disposed directly or through a transparent film having a refractive index of 1.46 to 1.58.

[3] The transparent electrode-attached complex according to [1] or [2], in which the optical adjustment member preferably has one low-refractive index layer and one high-refractive index layer.

[4] The transparent electrode-attached complex according to any one of [1] to [3], in which a refractive index of the low-refractive index layer is preferably 1.25 to 1.53.

[5] The transparent electrode-attached complex according to any one of [1] to [4], in which the refractive index of the high-refractive index layer is preferably 1.60 to 2.00.

[6] The transparent electrode-attached complex according to any one of [1] to [5], in which the high-refractive index layer preferably contains 10% to 95% by mass of metal oxide particles.

[7] The transparent electrode-attached complex according to any one of [1] to [6], in which the optical adjustment member and the transparent protective layer are preferably formed by means of transferring.

[8] The transparent electrode-attached complex according to any one of [1] to [7], in which the low-refractive index layer and the high-refractive index layer are preferably transparent resin layers.

[9] A transfer film comprising in this order: a temporary support; a transparent protective layer; an optical adjustment member; and a protective film, in which the optical adjustment member has at least one layer of low-refractive index layers that are odd-numbered layers from a transparent electrode pattern side and at least one layer of high-refractive index layers that are even-numbered layers from the transparent electrode pattern side, a difference in refractive index between the low-refractive index layer and the high-refractive index layer that are directly adjacent to each other is 0.05 or more, a refractive index of the high-refractive index layer is 2.10 or lower, and a thickness of each of the low-refractive index layer and the high-refractive index layer is 5 to 80 nm.

[10] The transfer film according to [9], in which the low-refractive index layer and the high-refractive index layer are preferably curable transparent resin layers including a polymerizable compound, and the curable transparent resin layers are preferably in a state of being not cured.

[11] A method for manufacturing a transparent electrode-attached complex, the method comprising: a lamination step of laminating an optical adjustment member and a transparent protective layer in this order on a transparent electrode pattern disposed on a base material, in which the optical adjustment member has at least one layer of low-refractive index layers that are odd-numbered layers from a transparent electrode pattern side and at least one layer of high-refractive index layers that are even-numbered layers from the transparent electrode pattern side, a difference in refractive index between the low-refractive index layer and the high-refractive index layer that are directly adjacent to each other is 0.05 or more, a refractive index of the high-refractive index layer is 2.10 or lower, and a thickness of each of the low-refractive index layer and the high-refractive index layer is 5 to 80 nm.

[12] The method for manufacturing a transparent electrode-attached complex according to [11], in which the base material and the transparent electrode pattern are preferably disposed directly or through a transparent film having a refractive index of 1.46 to 1.58.

[13] The method for manufacturing a transparent electrode-attached complex according to [11] or [12], in which the lamination step is preferably a step of transferring the optical adjustment member and the transparent protective layer from the transfer film according to [9] or [10] onto the transparent electrode pattern disposed on the base material.

[14] The method for manufacturing a transparent electrode-attached complex according to any one of [11] to [13], in which the low-refractive index layer and the high-refractive index layer are preferably curable transparent resin layers including a polymerizable compound, and the curable transparent resin layers before being laminated on the transparent electrode pattern are preferably in a state of being not cured.

[15] A transparent electrode-attached complex manufactured using the method for manufacturing a transparent electrode-attached complex according to any one of [11] to [14].

[16] An electrostatic capacitance-type input device comprising: the transparent electrode-attached complex according to any one of [1] to [8] and [15].

According to the present invention, it is possible to provide a transparent electrode-attached complex which, even without using a transparent film having a high refractive index on the base material-side of a transparent electrode pattern, has excellent transparent electrode pattern-masking properties, is capable of reducing unevenness attributed to an optical adjustment member, and has an excellent pencil hardness.

BRIEF DESCRIPTION OF THE DRAWINGS

FIG. 14 is a schematic view illustrating an example of a state in which the transfer film of the present invention having the transparent protective layer and an optical adjustment member is laminated on the transparent electrode pattern in the electrostatic capacitance-type input device by means of lamination and is yet to be cured by means of exposure or the like.

DESCRIPTION OF THE PREFERRED EMBODIMENTS

Figure 1:
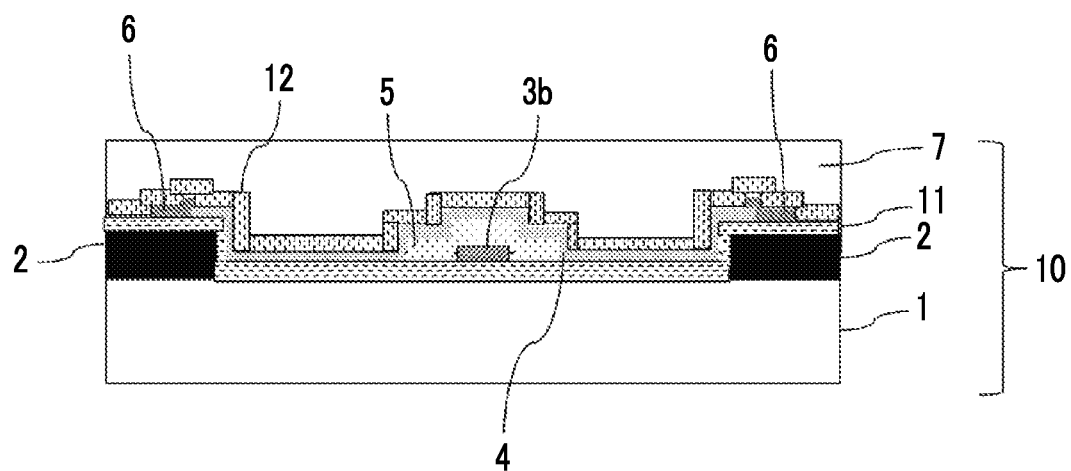
FIG. 1 is a schematic cross-sectional view illustrating an example of a constitution of an electrostatic capacitance-type input device of the present invention.

Hereinafter, a transparent electrode-attached complex, a transfer film, a method for manufacturing a transparent electrode-attached complex, and an electrostatic capacitance-type input device of the present invention will be described. Hereinafter, constituent requirements will be described on the basis of typical embodiments or specific examples of the present invention in some cases, but the present invention is not limited to the embodiments or specific examples. Meanwhile, in the present specification, numerical ranges expressed using "to" include numerical values before and after the "to" as the lower limit value and the upper limit value.

[Transparent Electrode-Attached Complex]

A transparent electrode-attached complex of the present invention is a transparent electrode-attached complex having a base material, a transparent electrode pattern, an optical adjustment member, and a transparent protective layer in this order, in which the optical adjustment member has at least one layer of low-refractive index layers that are odd-numbered layers from a transparent electrode pattern side and at least one layer of high-refractive index layers that are even-numbered layers from the transparent electrode pattern side, a difference in refractive index between the low-refractive index layer and the high-refractive index layer that are directly adjacent to each other is 0.05 or more, a refractive index of the high-refractive index layer is 2.10 or lower, and a thickness of each of the low-refractive index layer and the high-refractive index layer is 5 to 80 nm.

Due to this constitution, the transparent electrode-attached complex, even without using a transparent film having a high refractive index on the base material-side of a transparent electrode pattern, has excellent transparent electrode pattern-masking properties, is capable of reducing unevenness attributed to an optical adjustment member, and has an excellent pencil hardness.

In the transparent electrode-attached complex of the present invention, the optical adjustment member and the transparent protective layer are preferably formed by means of transferring compared to methods for manufacturing transparent electrode-attached complexes having a layer constitution of the related art in which a transparent conductive pattern is formed on an optical adjustment member-attached base material. Particularly, the above-described method is preferred since the optical adjustment member is not damaged during the formation of transparent conductive layers, the optical adjustment member is not damaged by etchants during the patterning of transparent conductive layers, and the adhesiveness between the optical adjustment member and the transparent conductive pattern is also improved. In addition, the method is preferred since it is possible to easily manufacture, with favorable productivity, the transparent electrode-attached complex which has excellent transparent electrode pattern-masking properties, is capable of reducing unevenness attributed to an optical adjustment member, and has an excellent pencil hardness even without using a transparent film having a high refractive index on the base material-side of the transparent electrode pattern. Furthermore, the optical adjustment member and the transparent protective layer are preferably formed by means of transferring from the viewpoint of easily reducing the generation of unevenness attributed to the optical adjustment member (thickness unevenness; the thickness unevenness is the same as the unevenness in thickness).

Unless particularly otherwise described, refractive indexes in the present specification refer to refractive indexes at a wavelength of 550 nm.

Meanwhile, being transparent in the present specification means that visible light having wavelengths of 400 nm to 700 nm are transmitted at an average transmittance of 80% or more. Therefore, transparent layers refer to layers that transmit visible light having wavelengths of 400 nm to 700 nm at an average transmittance of 80% or more. The average transmittance of transparent layers with respect to visible light having wavelengths of 400 nm to 700 nm is preferably 90% or more.

The average transmittance of a transfer film of the present invention or a transparent layer in the transfer film with respect to visible light having wavelengths of 400 nm to 700 nm is measured using a spectrophotometer U-3310 manufactured by Hitachi High-Tech Science Corporation.

Hereinafter, a preferred aspect of the transparent electrode-attached complex of the present invention will be described.

<Constitution of Transparent Electrode-Attached Complex>

The transparent electrode-attached complex of the present invention is a transparent electrode-attached complex having a base material, a transparent electrode pattern, an optical adjustment member, and a transparent protective layer, and the optical adjustment member has at least one layer of low-refractive index layers that are odd-numbered layers from a transparent electrode pattern side and at least one layer of high-refractive index layers that are even-numbered layers from the transparent electrode pattern side.

Figure 11:
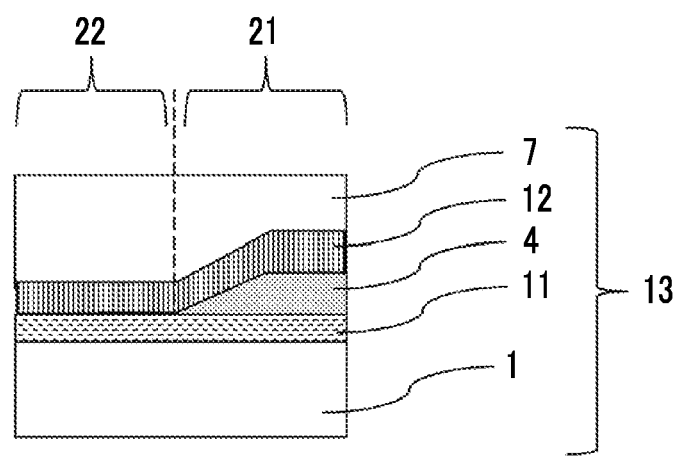
FIG. 11 is a schematic cross-sectional view illustrating an example of a constitution of a transparent electrode-attached complex of the present invention.

FIG. 11 illustrates an example of the constitution of the transparent electrode-attached complex of the present invention. The transparent electrode-attached complex of the present invention illustrated in FIG. 11 has a base material 1, a transparent electrode pattern 4, an optical adjustment member 12, and a transparent protective layer 7 in this order, and the base material 1 and the transparent electrode pattern 4 are disposed through a transparent film 11 having a refractive index of 1.46 to 1.58. FIG. 11 does not illustrate the detail of the optical adjustment member 12; however, even in FIG. 11, the optical adjustment member 12 and the like having the constitution illustrated in FIG. 17 or 18 can be employed.

Figure 17:
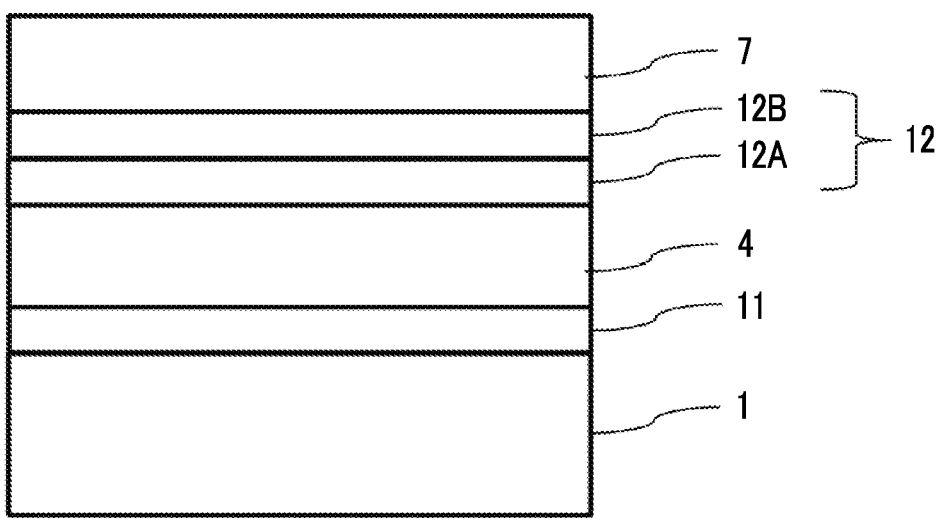
FIG. 17 is a schematic cross-sectional view illustrating another example of the constitution of the transparent electrode-attached complex of the present invention.

FIG. 17 illustrates another example of the constitution of the transparent electrode-attached complex of the present invention. The transparent electrode-attached complex of the present invention illustrated in FIG. 17 has the base material 1, the transparent electrode pattern 4, the optical adjustment member 12, and the transparent protective layer 7 in this order, the base material 1 and the transparent electrode pattern 4 are disposed through the transparent film 11 having a refractive index of 1.46 to 1.58, and the optical adjustment member 12 has a low-refractive index layer 12A that is an odd-numbered layer from the transparent electrode pattern side and a high-refractive index layer 12B that is an even-numbered layer from the transparent electrode pattern side.

Figure 18:
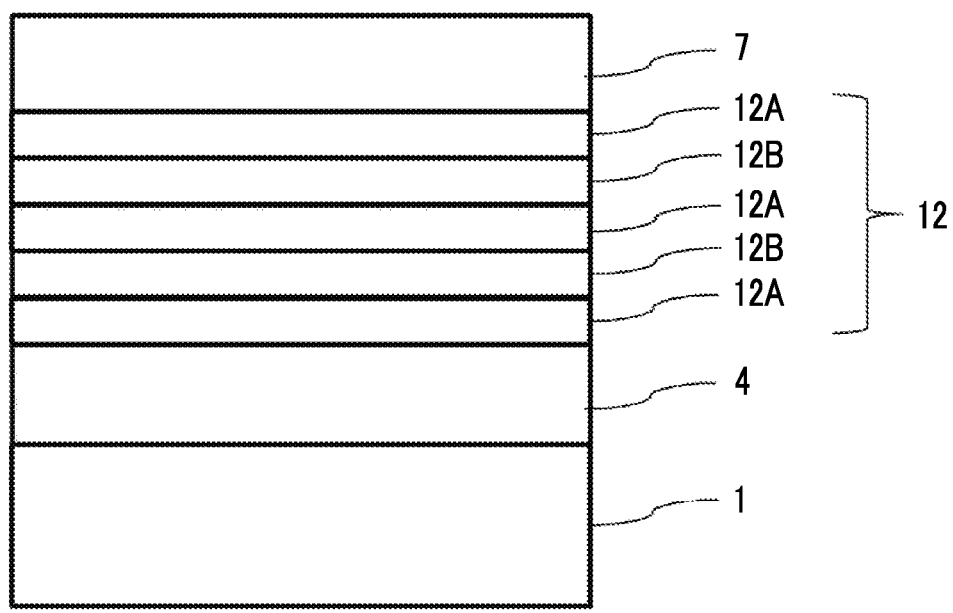
FIG. 18 is a schematic cross-sectional view illustrating still another example of the constitution of the transparent electrode-attached complex of the present invention.

FIG. 18 illustrates still another example of the constitution of the transparent electrode-attached complex of the present invention. The transparent electrode-attached complex of the present invention illustrated in FIG. 18 has the base material 1, the transparent electrode pattern 4, the optical adjustment member 12, and the transparent protective layer 7 in this order, the base material 1 and the transparent electrode pattern 4 are directly disposed (in direct contact with each other), and the optical adjustment member 12 has three low-refractive index layers 12A that are odd-numbered layers from the transparent electrode pattern side and two high-refractive index layers 12B that are even-numbered layer from the transparent electrode pattern side.

In the transparent electrode-attached complex of the present invention, the base material and the transparent electrode pattern may be disposed directly or through a transparent film. FIG. 11 and FIG. 17 illustrate aspects in which the base material 1 and the transparent electrode pattern 4 are disposed through the transparent film 11 having a refractive index of 1.46 to 1.58. On the other hand, FIG. 18 illustrates an aspect in which the base material 1 and the transparent electrode pattern 4 are disposed directly.

The base material 1 and the transparent electrode pattern 4 are preferably disposed directly from the viewpoint of the reduction of the reflectivity of the transparent electrode pattern and the transparent electrode pattern-masking properties.

The layer number of each of the low-refractive index layers and the high-refractive index layers in the optical adjustment member is not particularly limited, but is preferably one to five, more preferably one to three, particularly preferably one or two, and more particularly preferably one from the viewpoint of processes such as the reduction of manufacturing costs, the improvement of manufacturing suitability, and the like. In the transparent electrode-attached complex of the present invention, the optical adjustment member preferably has one low-refractive index layer and one high-refractive index layer.

The transparent electrode-attached complex of the present invention preferably has a region 21 in which the base material 1, the transparent film 11, the transparent electrode pattern 4, the optical adjustment member 12, and the transparent protective layer 7 are laminated in this order in a plane as illustrated in FIG. 11. In addition, FIG. 11 illustrates the transparent electrode-attached complex including, in addition to the above-described region, a region 22 in which the base material 1, the transparent film 11, the optical adjustment member 12, and the transparent protective layer 7 are laminated in this order (that is, a non-patterned region 22 in which the transparent electrode pattern is not formed).

The in-plane direction refers to a direction that is substantially parallel to a surface parallel to the base material in the transparent electrode-attached complex. Therefore, the region in which the base material 1, the transparent electrode pattern 4, the optical adjustment member 12, and the transparent protective layer 7 are laminated in this order being included in a plane means that the orthogonal projection of the region in which the base material 1, the transparent electrode pattern 4, the optical adjustment member 12, and the transparent protective layer 7 are laminated in this order to a surface parallel to the base material in the transparent electrode-attached complex is present in a plane parallel to the base material in the transparent electrode-attached complex.

Here, in a case in which the transparent electrode-attached complex of the present invention is used in an electrostatic capacitance-type input device described below, there are cases in which the transparent electrode pattern is provided as a first transparent electrode pattern and a second transparent electrode pattern respectively in two directions that are substantially orthogonal to each other (the row direction and the column direction) (for example, refer to FIG. 3). For example, in the constitution of FIG. 3, the transparent electrode pattern in the transparent electrode-attached complex of the present invention may be a second transparent electrode pattern 4 or a pad portion 3a of a first transparent electrode pattern 3.

In other words, in the following description of the transparent electrode-attached complex of the present invention, there are cases in which the transparent electrode pattern is represented by a representative reference sign "4", but the transparent electrode pattern in the transparent electrode-attached complex of the present invention may be used not only as the second transparent electrode pattern 4 in the electrostatic capacitance-type input device of the present invention but also as, for example, the pad portion 3a of the first transparent electrode pattern 3.

The transparent electrode-attached complex of the present invention preferably includes a non-patterned region in which the transparent electrode pattern is not formed. In the present specification, the non-patterned region refers to a region in which the transparent electrode pattern 4 is not formed.

FIG. 11 illustrates an aspect in which the transparent electrode-attached complex of the present invention includes the non-patterned region 22.

The transparent electrode-attached complex of the present invention preferably includes, in at least a part of the non-patterned region 22 in which the transparent electrode pattern 4 is not formed, a region in which the base material and the optical adjustment member are laminated in this order in a plane.

Here, in regions other than the non-patterned region 22, other members may be disposed at arbitrary locations within the scope of the gist of the present invention, and, in a case in which the transparent electrode-attached complex of the present invention is used in an electrostatic capacitance-type input device described below, a mask layer 2, an insulating layer 5, an additional conductive element 6, and the like in FIG. 1 can be laminated.

An end portion of the transparent electrode pattern 4 is not particularly limited in terms of the shape and may have a taper shape as illustrated in FIG. 11, for example, a taper shape in which the surface on the base material side is wider than the surface on the side opposite to the base material.

Here, the angle of the end portion of the transparent electrode pattern in a case in which the end portion of the transparent electrode pattern has a taper shape (hereinafter, referred to as the taper angle) is preferably 30° or less, more preferably 0.1° to 15°, and particularly preferably 0.5° to 5°.

Regarding the method for measuring the taper angle in the present specification, a micrograph of the end portion of the transparent electrode pattern is captured, the taper portion in the micrograph is approximated to a triangular shape, and the taper angle is directly measured.

Figure 10:
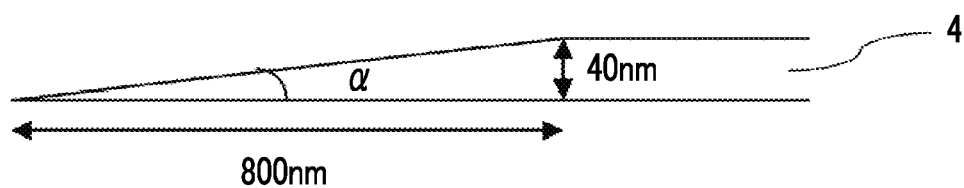
FIG. 10 is an explanatory view illustrating an example of a taper shape of an end portion of the transparent electrode pattern.

FIG. 10 illustrates an example of a case in which the end portion of the transparent electrode pattern has a taper shape. The triangular shape obtained by approximating the taper portion in FIG. 10 has an 800 nm-long base surface and a height (the thickness of the upper base portion that is substantially parallel to the base surface) of 40 nm, and the taper angle α at this time is approximately three degrees. The base surface of the triangular shape obtained by approximating the taper portion is preferably 10 to 3,000 nm, more preferably 100 to 1,500 nm, and particularly preferably 300 to 1,000 nm.

Meanwhile, the preferred range of the height of the triangular shape obtained by approximating the taper portion is the same as the preferred range of the thickness of the transparent electrode pattern.

The transparent electrode-attached complex of the present invention preferably includes a region in which the transparent electrode pattern and the optical adjustment member are adjacent to each other.

FIG. 11 illustrates an aspect in which, in the region 21 in which the transparent electrode pattern, the optical adjustment member, and the transparent protective layer are laminated in this order, the transparent electrode pattern, the optical adjustment member, and the transparent protective layer are adjacent to each other.

In addition, in the transparent electrode-attached complex of the present invention, both the transparent electrode pattern and the non-patterned region 22 in which the transparent electrode pattern is not formed are preferably continuously coated through the optical adjustment member.

Here, "being continuously coated" means that the optical adjustment member is not a pattern film but a continuous film. That is, the optical adjustment member preferably does not have any opening portions from the viewpoint of making the transparent electrode pattern be rarely visible.

In addition, the transparent electrode pattern and the non-patterned region 22 are preferably coated with the optical adjustment member directly rather than through other layers.

Examples of "other layers" in the case of being coated with other layers include the insulating layer 5 included in the electrostatic capacitance-type input device of the present invention described below, in a case in which two or more transparent electrode patterns are included as in the electrostatic capacitance-type input device of the present invention described below, the transparent electrode pattern on the second layer, and the like.

FIG. 11 illustrates an aspect in which the optical adjustment member 12 is laminated. The optical adjustment member 12 is laminated so as to astride the region in which the transparent electrode pattern 4 is not laminated on the transparent film 11 and the region in which the transparent electrode pattern 4 is laminated. That is, the optical adjustment member 12 is adjacent to the transparent film 11, and furthermore, the optical adjustment member 12 is adjacent to the transparent electrode pattern 4.

In addition, in a case in which the end portion of the transparent electrode pattern 4 has a taper shape, the optical adjustment member 12 is preferably laminated along the taper shape (at a slope that is the same as the taper angle).

FIG. 11 illustrates an aspect in which, on the surfaces of the optical adjustment member 12, the transparent protective layer 7 is laminated on the surface opposite to the surface on which the transparent electrode pattern is formed. The shape of the transparent protective layer 7 is not particularly limited, but is preferably a continuous film that covers the optical adjustment member 12.

<Materials of Transparent Electrode-Attached Complex>
(Base Material)

In the transparent electrode-attached complex of the present invention, the base material is preferably a glass base material 1 or a film base material and more preferably a film base material. In addition, the base material is preferably a transparent base material. That is, the base material is preferably a transparent film base material.

The refractive index of the base material is particularly preferably 1.5 to 1.52.

The base material may be composed of a glass base material, and, as the glass base material, reinforced glass or the like represented by Corning's GORILLA glass can be used.

In addition, as the transparent base material, it is possible to preferably use the materials used in JP2010-86684A, JP2010-152809A, and JP2010-257492A.

In a case in which a film base material is used as the base material, a film base material causing no optical distortion or a film base material having high transparency is more preferably used, and specific examples thereof include polyethylene terephthalate (PET), polyethylene naphthalate, polycarbonate, triacetyl cellulose, and cycloolefin polymers.

In the transparent electrode-attached complex, the transparent electrode pattern is preferably a transparent electrode pattern formed on a transparent film base material.

The transparent electrode-attached complex also preferably has a constitution in which the transparent electrode pattern, the optical adjustment member, and the transparent protective layer are provided on each of both surfaces of the base material. In this case, the transparent electrode-attached complex is preferably used as a film sensor.

(Transparent Electrode Pattern)

The refractive index of the transparent electrode pattern in the transparent electrode-attached complex of the present invention is preferably 1.75 to 2.1.

The material of the transparent electrode pattern is not particularly limited, and well-known materials can be used. Examples of the material of the transparent electrode pattern include metal films and transparent and conductive metal oxide films such as ITO and indium zinc oxide (IZO). Examples of the metal films and the metal oxide films include metal films of Al, Zn, Cu, Fe, Ni, Cr, Mo, or the like; metal oxide films such as ITO and $SiO_2$; and the like. At this time, the thickness of the transparent electrode pattern can be set to 10 to 200 nm.

In addition, in a case in which amorphous ITO films are turned into polycrystalline ITO films by firing, it is also possible to reduce electric resistance.

In addition, the method for manufacturing the transparent electrode pattern is not particularly limited. For example, as described below, the first transparent electrode pattern 3, the second transparent electrode pattern 4, and the additional conductive element 6 described below can also be manufactured using a photosensitive film having a photocurable resin layer for which a conductive fiber is used. Additionally, in a case in which the first transparent electrode pattern or the like is formed using ITO or the like, it is possible to refer to Paragraphs "0014" to "0016" and the like of JP4506785B.

The transparent electrode pattern is preferably an ITO film.

In the transparent electrode-attached complex of the present invention, the transparent electrode pattern is more preferably an ITO film having a refractive index of 1.75 to 2.1.

(Optical Adjustment Member)

The transparent electrode-attached complex has an optical adjustment member, the optical adjustment member has at least one layer of low-refractive index layers that are odd-numbered layers from the transparent electrode pattern side and at least one layer of high-refractive index layers that are even-numbered layers from the transparent electrode pattern side, the difference in refractive index between the low-refractive index layer and the high-refractive index layer that are directly adjacent to each other is 0.05 or more, the refractive index of the high-refractive index layer is 2.10 or lower, and the thickness of each of the low-refractive index layer and the high-refractive index layer is 5 to 80 nm.

In the transparent electrode-attached complex of the present invention, the difference in refractive index between the low-refractive index layer and the high-refractive index layer that are directly adjacent to each other is 0.05 or more.

The difference in refractive index between the low-refractive index layer and the high-refractive index layer that are directly adjacent to each other is preferably 0.05 to 0.50 and more preferably 0.05 to 0.30.

In the transparent electrode-attached complex of the present invention, the refractive index of the low-refractive index layer is preferably 1.25 to 1.53, more preferably 1.30 to 1.53, and particularly preferably 1.35 to 1.53.

In the transparent electrode-attached complex of the present invention, the refractive index of the high-refractive index layer is 2.10 or lower. In a case in which the refractive index is increased, the thickness of the high-refractive index layer is preferably decreased from the viewpoint of improving the transparent electrode pattern-masking properties. In contrast, in the present invention, the thickness of the high-refractive index layer is not excessively decreased in order to employ refractive indexes of 2.10 or lower which are lower than the refractive index of, for example, niobium oxide (n=2.33), which also enables the improvement of the problem of unevenness of reflected light from the base material surface caused due to the optical adjustment member other than the transparent electrode pattern at the same time as the transparent electrode pattern-masking properties.

In the transparent electrode-attached complex of the present invention, the refractive index of the high-refractive index layer is preferably 1.60 to 2.00, more preferably 1.60 to 1.80, and particularly preferably 1.60 to 1.75.

In a case in which the refractive index of the transparent electrode pattern exceeds 2.0 as in the case of oxides of In or Zn, the refractive index of the high-refractive index layer in the optical adjustment member is preferably 1.7 or higher and 1.85 or lower.

In the transparent electrode-attached complex of the present invention, the thickness of each of the low-refractive index layer and the high-refractive index layer is 5 to 80 nm.

The thickness of each of the low-refractive index layer and the high-refractive index layer in the optical adjustment member is more preferably 10 to 75 nm respectively and particularly preferably 15 to 70 nm.

The thicknesses of the low-refractive index layer and the high-refractive index layer in the optical adjustment member are obtained using a method described in examples described below.

The low-refractive index layer and the high-refractive index layer in the optical adjustment member may be transparent resin films or inorganic films. In the transparent electrode-attached complex of the present invention, the low-refractive index layer and the high-refractive index layer are more preferably transparent resin layers than inorganic films formed by means of vapor deposition from the viewpoint of processes such as the reduction of manufacturing costs, the improvement of manufacturing suitability, and the like. Particularly, the high-refractive index layer is more preferably a transparent resin layer including a metal oxide.

As the inorganic film, it is possible to use inorganic films that are used in JP2010-86684A, JP2010-152809A, JP2010-257492A, and the like, and the inorganic film having a laminate structure of a low-refractive index material and a high-refractive index material or the inorganic film of a mixed film of a low-refractive index material and a high-refractive index material described in the above-described documents is preferably used from the viewpoint of controlling refractive indexes. As low-refractive index materials and high-refractive index materials, the materials described in JP2010-86684A, JP2010-152809A, and JP2010-257492A can be preferably used, and the contents of these documents are incorporated into the present specification by reference.

The inorganic film may be a $SiO_x$ film (x is preferably 1.5 to 2.5, more preferably 1.5 to 2.0, and particularly preferably 1.7 to 2.0), an $Y_2O_3$ film, or a $ZrO_2$ film. The inorganic film may be a film formed by means of vapor deposition, a film formed by means of sputtering, or a film formed by other methods, but is preferably a film formed by means of sputtering from the viewpoint of processes such as the reduction of manufacturing costs, the improvement of manufacturing suitability, and the like.

The transparent resin film may be a curable transparent resin layer or a non-curable transparent resin layer, but is preferably a curable transparent resin layer from the viewpoint of increasing the photolithographic properties of the transparent electrode-attached complex (or the transfer film described below). That is, in the transparent electrode-attached complex of the present invention, the low-refractive index layer and the high-refractive index layer are preferably curable transparent resin layers including a polymerizable compound. Meanwhile, the curable transparent resin layer preferably has a final form of a cured film. In the present specification, the curable transparent resin layer being not cured means that the consumption percentage of curable groups in the curable transparent resin layer is less than 10%. For example, in a case in which the unsaturated double bond consumption percentage of unsaturated double bond groups is less than 10%, non-cured curable transparent resin layers are formed. The curable transparent resin layer being a cured film means that the consumption percentage of curable groups in the curable transparent resin layer is 10% or more. The consumption percentage of curable groups in cured films is preferably 90% or more.

In a case in which the low-refractive index layer and the high-refractive index layer in the optical adjustment member are curable transparent resin layers, the layers may be thermosetting layers, photocurable layers, or thermosetting and photocurable layers. Among these, the low-refractive index layer and the high-refractive index layer in the optical adjustment member are preferably at least thermosetting layers since it is possible to impart the reliability and moisture-heat resistance of films by being thermally cured after being transferred and more preferably thermosetting and photocurable layers since it is easy to form films by being photocured after being transferred and it is possible to impart the reliability and moisture-heat resistance of films by being thermally cured after the formation of films.

The low-refractive index layer and the high-refractive index layer in the optical adjustment member preferably include a binder polymer, a photopolymerizable compound, and a photopolymerization initiator.

The low-refractive index layer and the high-refractive index layer in the optical adjustment member may be negative-type materials or positive-type material.

In a case in which the low-refractive index layer and the high-refractive index layer in the optical adjustment member are negative-type materials, the low-refractive index layer and the high-refractive index layer in the optical adjustment member preferably include a binder polymer (preferably an alkali-soluble resin), a photopolymerizable compound, a photopolymerization initiator. The high-refractive index layer in the optical adjustment member more preferably includes metal oxide particles. Furthermore, additives and the like used therefor are not limited thereto.

The method for controlling the refractive indexes of the low-refractive index layer and the high-refractive index layer in the optical adjustment member is not particularly limited, and it is possible to singly use a transparent resin layer having a desired refractive index, use a transparent resin layer to which particles such as metal particles or metal oxide particles are added, or use a complex of a metal salt and a macromolecule.

In the transparent electrode-attached complex of the present invention, the high-refractive index layer preferably contains metal oxide particles. The content of the metal oxide particles in the high-refractive index layer is preferably 10% to 95% by mass, more preferably 40% to 95% by mass, particularly preferably 55% to 95% by mass, more particularly preferably 62% to 90% by mass, and still more particularly preferably 65% to 90% by mass.

Furthermore, in the low-refractive index layer and the high-refractive index layer in the optical adjustment member, additives may be used. Examples of the additives include the surfactants described in Paragraph "0017" of JP4502784B and Paragraphs "0060" to "0071" of JP2009-237362A, the thermal polymerization inhibitors described in Paragraph "0018" of JP4502784B and, furthermore, other additives described in Paragraphs "0058" to "0071" of JP2000-310706A.

The details of the materials of the low-refractive index layer and the high-refractive index layer in the optical adjustment member will be described in the section of the method for manufacturing a transfer film described below.

(Transparent Protective Layer)

The transparent protective layer is preferably a transparent resin layer and more preferably a curable transparent resin layer.

In a case in which the transparent protective layer is a curable transparent resin layer, the curable transparent resin layer may be a thermosetting layer, a photocurable layer, or a thermosetting and photocurable layer. Among these, the transparent protective layer is preferably an at least thermosetting layer since it is possible to impart the reliability of films by being thermally cured after being transferred and more preferably a thermosetting and photocurable layer since it is easy to form films by being photocured after being transferred and it is possible to impart the reliability of films by being thermally cured after the formation of films.

The content of a surfactant containing fluorine atoms in the transparent protective layer is preferably 0.01% to 0.5% by mass with respect to the solid content of the transparent protective layer. In a case in which the transparent protective layer includes the surfactant containing fluorine atoms, an effect of "suppressing surface tension and flattening the surfaces of coated films in a wet state after being applied", which is an effect of surfactants in the related art, can be obtained. Additionally, in a case in which the transparent protective layer includes the surfactant containing fluorine atoms, when the transparent protective layer is coated and dried, a thin layer of the surfactant containing fluorine atoms is formed on the surface of the transparent protective layer, the surfactant layer serves as a protective layer, and interlaminar mixing with the transparent protective layer can be suppressed when the optical adjustment member is coated. In the case of including 0.01% by mass or more of the surfactant containing fluorine atoms with respect to the solid content of the transparent protective layer, the above-described effect can be significantly obtained, and, in the case of including 0.02% by mass or more of the surfactant containing fluorine atoms with respect to the solid content of the transparent protective layer, furthermore, the above-described effect can be more significantly obtained.

The content of the surfactant containing fluorine atoms in the transparent protective layer is more preferably 0.02% to 0.5% by mass and particularly preferably 0.02% to 0.4% by mass with respect to the solid content of the transparent protective layer. In order to favorably maintain the adhesiveness between the optical adjustment member and the transparent electrode pattern, the content of the surfactant containing fluorine atoms is preferably 0.5% by mass and more preferably 0.4% by mass with respect to the solid content of the transparent protective layer.

Furthermore, in a case in which an acrylic resin is selected as a resin in the transparent protective layer and combined with the surfactant containing fluorine atoms, the above-described effect can be more significantly obtained.

Examples of the surfactant containing fluorine atoms that is preferably used in the transparent protective layer include the surfactants described in Paragraph "0017" of JP4502784B and Paragraphs "0060" to "0071" of JP2009-237362A. In addition, as the surfactant containing fluorine atoms that is preferably used in the transparent protective layer, commercially surfactants containing fluorine atoms can be used. Particularly, surfactants containing fluorine atoms described below are preferred.

MEGAFACE F251, MEGAFACE F253, MEGAFACE F281, MEGAFACE F444, MEGAFACE F477, MEGAFACE F551, MEGAFACE F552, MEGAFACE F553, MEGAFACE F554, MEGAFACE F555, MEGAFACE F556, MEGAFACE F557, MEGAFACE F558, MEGAFACE F559, MEGAFACE F560, MEGAFACE F561, MEGAFACE F562, MEGAFACE F563, MEGAFACE F565, MEGAFACE F568, MEGAFACE F569, MEGAFACE F570, MEGAFACE F571, MEGAFACE R40, MEGAFACE R41, MEGAFACE R43, MEGAFACE R94, MEGAFACE RS55, MEGAFACE RS56, MEGAFACE RS72-K, MEGAFACE RS75, MEGAFACE RS76-E,

MEGAFACE RS76-NS, MEGAFACE RS78, MEGAFACE RS90, and MEGAFACE F780F manufactured by DIC Corporation.

In addition, a compound represented by Formula (3) (weight-average molecular weight: 15,000, solid content: 30% by mass, methyl ethyl ketone: 70% by mass) is also preferred and can be used.

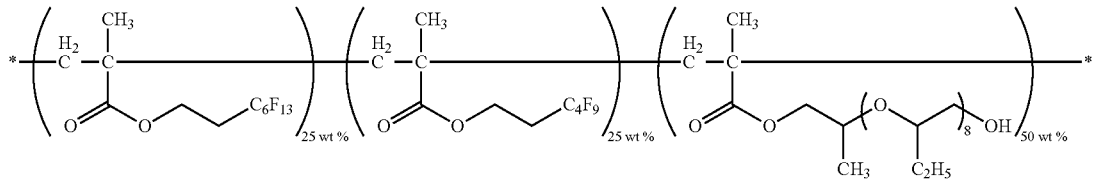

The transparent protective layer preferably includes a binder polymer, a polymerizable compound, and a photopolymerization initiator.

The transparent protective layer is a negative-type material or a positive-type material.

In a case in which the transparent protective layer is a negative-type material, the transparent protective layer preferably includes a binder polymer (preferably an alkali-soluble resin), a photopolymerizable compound, and a photopolymerization initiator. Furthermore, additives and the like used therefor are not limited thereto.

The method for controlling the refractive index of the transparent protective layer is not particularly limited, and it is possible to singly use a transparent protective layer having a desired refractive index, use a transparent protective layer to which particles such as metal particles or metal oxide particles are added, or use a complex of a metal salt and a macromolecule.

Furthermore, in the transparent protective layer, additives may also be used. Examples of the additives include the thermal polymerization inhibitors described in Paragraph "0018" of JP4502784B and, furthermore, other additives described in Paragraphs "0058" to "0071" of JP2000-310706A.

The thickness of the transparent protective layer is preferably 1 μm or more, more preferably 1 to 15 μm, particularly preferably 2 to 12 μm, and more particularly preferably 3 to 10 μm from the viewpoint of increasing pencil hardness by exhibiting a sufficient surface protection function during the formation of transparent protective layers in electrostatic capacitance-type input devices using the transparent protective layer.

The thickness of the transparent protective layer is obtained using the method described in examples described below.

The refractive index of the transparent protective layer is preferably 1.45 to 1.59, more preferably 1.50 to 1.53, particularly preferably 1.50 to 1.52, and more particularly preferably 1.51 to 1.52.

(Transparent Film)

In a case in which the base material and the transparent electrode pattern are disposed through the transparent film, the refractive index of the transparent film is not particularly limited. In the transparent electrode-attached complex of the present invention, the base material and the transparent electrode pattern may be disposed through a transparent film having a refractive index of 1.45 or less or a transparent film having a refractive index of 1.59 or more, but the base material and the transparent electrode pattern are preferably disposed directly or through a transparent film having a refractive index of 1.46 to 1.58 from the viewpoint of processes such as the reduction of manufacturing costs, the improvement of manufacturing suitability, and the like. In the transparent electrode-attached complex of the present invention, the refractive index of the transparent film is preferably 1.46 to 1.58, more preferably 1.5 to 1.53, particularly preferably 1.5 to 1.52, and more particularly preferably 1.51 to 1.52. Here, the transparent film may be a monolayer structure or a laminate structure of two or more layers. In a case in which the transparent film is a laminate structure of two or more layers, the refractive index of the transparent film refers to the refractive index of all of the layers.

The material of the transparent film is not particularly limited, and a material satisfying this range of refractive index is preferred.

The preferred range of the material of the transparent film and the preferred range of the properties such as refractive indexes are the same as the preferred ranges of those of the optical adjustment member.

In the transparent electrode-attached complex of the present invention, the transparent film and the optical adjustment member are preferably composed of the same material from the viewpoint of optical uniformity.

In the transparent electrode-attached complex of the present invention, the thickness of the transparent film is preferably 55 to 110 nm, more preferably 60 to 110 nm, and particularly preferably 70 to 90 nm.

Here, the transparent film may be a monolayer structure or a laminate structure of two or more layers. In a case in which the transparent film is a laminate structure of two or more layers, the thickness of the transparent film refers to the total thickness of all of the layers.

In the transparent electrode-attached complex of the present invention, the transparent film is preferably a transparent resin film.

The metal oxide particles, the resin (the binder), and other additives that are used in the transparent resin film are not particularly limited within the scope of the gist of the present invention, and the resin and other additives that are used in the optical adjustment member in the transparent electrode-attached complex of the present invention can be preferably used.

In the transparent electrode-attached complex of the present invention, the transparent film may be an inorganic film. As materials that are used for the inorganic film, the materials that are used for the optical adjustment member in the transparent electrode-attached complex of the present invention can be preferably used.

[Method for Manufacturing Transparent Electrode-Attached Complex]

A method for manufacturing a transparent electrode-attached complex of the present invention has a lamination step of laminating the optical adjustment member and the transparent protective layer in this order on the transparent electrode pattern disposed on the base material, the optical adjustment member has at least one layer of the low-refractive index layers that are odd-numbered layers from a transparent electrode pattern side and at least one layer of the high-refractive index layers that are even-numbered layers from the transparent electrode pattern side, the difference in refractive index between the low-refractive index layer and the high-refractive index layer that are directly adjacent to each other is 0.05 or more, the refractive index of the high-refractive index layer is 2.10 or lower, and the thickness of each of the low-refractive index layer and the high-refractive index layer is 5 to 80 nm.

Due to this constitution, the method for manufacturing a transparent electrode-attached complex of the present invention becomes excellent in terms of manufacturing costs and manufacturing suitability. In the method for manufacturing a transparent electrode-attached complex of the present invention, the optical adjustment member and the transparent protective layer are laminated on the transparent conductive pattern formed. Due to the above-described order, the manufacturing method is more preferred compared to methods for manufacturing transparent electrode-attached complexes having a layer constitution of the related art in which a transparent conductive pattern is formed on an optical adjustment member-attached base material. Particularly, the optical adjustment member is not damaged during the formation of the transparent conductive layer, the optical adjustment member is not damaged by etchants during the patterning of the transparent conductive layer, and the adhesiveness between the optical adjustment member and the transparent conductive pattern is also improved. Even in a case in which a transparent base body is laminated on the conductive layer side of the hardcoat film for a touch panel of JP2015-99538A, the above-described advantage of the method for manufacturing a transparent electrode-attached complex of the present invention cannot be obtained since the lamination order is different.

<Surface Treatment of Base Material>

In addition, in order to increase the adhesiveness between the respective layers after lamination in the following transfer step, it is possible to carry out a surface treatment on a noncontact surface (out of the surfaces of the base material constituting the electrostatic capacitance-type input device, the surface on a side opposite to the surface with which input means such as a finger comes into contact) of the base material in advance. As the surface treatment, a surface treatment using a silane compound (a silane coupling treatment) is preferably carried out. As a silane coupling agent, silane coupling agents having a functional group that interacts with photosensitive resins are preferred. For example, a silane coupling liquid (an aqueous solution of 0.3% by mass of N-β(aminoethyl)γ-aminopropyltrimethoxysilane, trade name: KBM603, manufactured by Shin-Etsu Chemical Co., Ltd.) is showered on the surface for 20 seconds, and the surface is cleaned by means of pure water showering. After that, it is preferable to cause a reaction by means of heating. A heating tank may be used, the preliminarily heating of a laminator may be used, and the reaction can be accelerated by any method.

<Formation of Transparent Film>

In the method for manufacturing a transparent electrode-attached complex of the present invention, the base material and the transparent electrode pattern are preferably disposed directly or through a transparent film and more preferably disposed directly or through a transparent film having a refractive index of 1.46 to 1.58. In a case in which the base material and the transparent electrode pattern are disposed through a transparent film having a refractive index of 1.46 to 1.58 in the transparent electrode-attached complex of the present invention, the method for forming the transparent film having a refractive index of 1.46 to 1.58 is not particularly limited and is preferably formed by means of transferring or sputtering.

Between them, in the transparent electrode-attached complex of the present invention, the transparent film is preferably formed by transferring a transparent curable resin formed on a temporary support onto the base material and more preferably formed by curing the transparent curable resin after being transferred. Examples of the methods for transferring and curing include methods in which transferring, exposure, development, and other steps are carried out in the same manner as in the method for transferring the transparent protective layer and the optical adjustment member in the method for manufacturing a transparent electrode-attached complex using the photosensitive film in the described of an electrostatic capacitance-type input device of the present invention described below. In this case, the refractive index of the transparent film is preferably adjusted to be in the above-described range by dispersing the metal oxide particles in the photocurable resin layer in the photosensitive film.

Meanwhile, in a case in which the transparent film is an inorganic film, the transparent film is preferably formed by means of sputtering. That is, in the transparent electrode-attached complex of the present invention, the transparent film is also preferably formed by means of sputtering.

As the method for sputtering, it is possible to preferably use the methods that are used in JP2010-86684A, JP2010-152809A, and JP2010-257492A.

<Formation of Transparent Electrode Pattern>

The transparent electrode pattern can be formed on the base material or the transparent film using methods for forming the first transparent electrode pattern 3, the second transparent electrode pattern 4, and the additional conductive element 6 described below, and a method in which a photosensitive film is used is preferred.

<Lamination Step>

The method for manufacturing a transparent electrode-attached complex of the present invention has a lamination step of laminating the optical adjustment member and the transparent protective layer in this order on the transparent electrode pattern disposed on the base material.

Meanwhile, in the method for manufacturing a transparent electrode-attached complex, the optical adjustment member is formed on the transparent electrode pattern and on the base material or the transparent film in the non-patterned region.

The lamination step is not particularly limited, and examples thereof include a transfer step, a coating step, a step of attaching layers through a pressure-sensitive adhesive material, and the like.

In the method for manufacturing a transparent electrode-attached complex of the present invention, the lamination step is preferably a step of transferring the optical adjustment member and the transparent protective layer from the transfer film of the present invention described below onto the transparent electrode pattern disposed on the base material. Due to this constitution, the optical adjustment member and the transparent protective layer in the transparent electrode-attached complex can be collectively transferred, and it is possible to easily manufacture, with favorable productivity, the transparent electrode-attached complex which has excellent transparent electrode pattern-masking properties, is capable of reducing unevenness attributed to the optical adjustment member, and has an excellent pencil hardness even without using a transparent film having a high refractive index on the base material-side of the transparent electrode pattern.

In the method for manufacturing a transparent electrode-attached complex of the present invention, it is preferable that the low-refractive index layer and the high-refractive index layer are curable transparent resin layers including a polymerizable compound, and the curable transparent resin layers before being laminated on the transparent electrode pattern are in a state of being not cured.

The method for manufacturing a transparent electrode-attached complex preferably includes a step of curing the transparent protective layer and the optical adjustment member at the same time and more preferably includes a step of pattern-curing the transparent protective layer and the optical adjustment member at the same time. After the lamination of the transparent protective layer, the optical adjustment member is preferably laminated without curing the transparent protective layer. The transparent protective layer and the optical adjustment member obtained as described above can be cured at the same time. In such a case, the transparent protective layer and the optical adjustment member can be developed in a desired pattern by means of photolithography after being laminated on the transparent electrode pattern.

The method for manufacturing a transparent electrode-attached complex of the present invention more preferably includes a step of developing and removing non-cured portions (in the case of photocuring, only non-exposed portions or only exposed portions) of the transparent protective layer and the optical adjustment member after the step of curing the transparent protective layer and the optical adjustment member at the same time.

Examples of the method for forming the transparent protective layer and the optical adjustment member include methods including a protective film removal step of removing the protective film from the transfer film, a transfer step of transferring the transparent protective layer and the optical adjustment member in the transfer film of the present invention from which the protective film is removed onto the transparent electrode pattern disposed on the base material, an exposure step of exposing the transparent protective layer and the optical adjustment member transferred onto the transparent electrode pattern, and a development step of developing the exposed transparent protective layer and the exposed optical adjustment member.

(Transfer Step)

Figure 16:
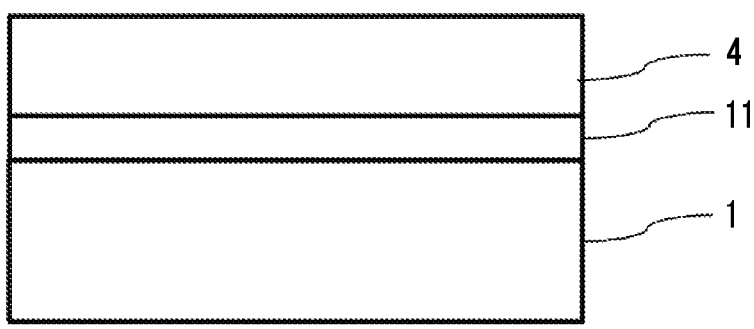
FIG. 16 is a schematic cross-sectional view illustrating an example of the transparent electrode pattern disposed on the base material, which is used in the method for manufacturing a transparent electrode-attached complex of the present invention.

A case in which the lamination step is a transfer step will be described. The transfer step is preferably a step of transferring the optical adjustment member and the transparent protective layer from the transfer film of the present invention onto the transparent electrode pattern disposed on the base material. FIG. 16 is a schematic cross-sectional view illustrating an example of the transparent electrode pattern disposed on the base material, which is used in the method for manufacturing a transparent electrode-attached complex of the present invention. In the transparent electrode pattern disposed on the base material illustrated in FIG. 16, the transparent electrode pattern 4 is disposed on the base material 1 through the transparent film 11. After, for example, a protective film 29 is removed from a transfer film 30 illustrated in FIG. 12, the optical adjustment member 12 made up of the low-refractive index layer 12A and the high-refractive index layer 12B and the transparent protective layer 7 are transferred onto the transparent electrode pattern 4 disposed on the base material 1 illustrated in FIG. 16, thereby obtaining the transparent electrode-attached complex of the present invention illustrated in FIG. 17.

At this time, a method including a step of laminating the transparent protective layer and the optical adjustment member in the transfer film of the present invention onto the transparent electrode pattern and then removing the temporary support is preferred.

The transferring (attachment) of the transparent protective layer and the optical adjustment member onto the surface of the transparent electrode pattern is carried out by overlaying the transparent protective layer and the optical adjustment member on the surface of the transparent electrode pattern and pressurizing and heating the layer, the member, and the pattern. For the attachment, well-known laminators such as laminators, vacuum laminators, and auto-cut laminators capable of further increasing productivity can be used.

(Exposure Step, Development Step, and Other Steps)

As examples of the exposure step, the development step, and other steps, it is also possible to preferably use the method described in Paragraphs "0035" to "0051" of JP2006-23696A in the present invention.

The exposure step is preferably a step of exposing the transparent protective layer and the optical adjustment member transferred onto the transparent electrode pattern.

Specific examples thereof include methods in which a predetermined mask is disposed above the transparent protective layer and the optical adjustment member formed on the transparent electrode pattern and the temporary support and then the transparent protective layer and the optical adjustment member are exposed to light sources (through the mask and the temporary support) above the mask.

Here, as the light sources for the exposure, it is possible to appropriately select and use light sources as long as the light sources are capable of radiating light having wavelengths in a range (for example, 365 nm, 405 nm, or the like) with which the transparent protective layer and the optical adjustment member can be cured. Specific examples thereof include an ultrahigh-pressure mercury lamp, a high-pressure mercury lamp, a metal halide lamp, and the like. The exposure amount is, generally, approximately 5 to 200 $mJ/cm^2$ and preferably approximately 10 to 100 $mJ/cm^2$.

The development step is preferably a step of developing the exposed transparent protective layer and the exposed optical adjustment member.

In the present invention, the development step is a narrowly-defined development step in which the transparent protective layer and the optical adjustment member which have been pattern-exposed are pattern-developed using a developer.

The development can be carried out using a developer. The developer is not particularly limited, and it is possible to use well-known developers such as the developer described in JP1993-72724A (JP-H05-72724A). Furthermore, the developer is preferably a developer in which photocurable resin layers perform dissolution-type development behaviors and, for example, preferably a developer including a compound having a pKa (the negative logarithm of the acid dissociation constant; Ka represents the acid dissociation constant) of 7 to 13 at a concentration of 0.05 to 5 mol/L. Meanwhile, in a case in which the transparent protective layer and the optical adjustment member do not form any patterns, the developer is preferably a developer which performs development behaviors so as not to dissolve the non-alkali development-type coloring composition layer and, for example, preferably a developer including a compound having a pKa of 7 to 13 at a concentration of 0.05 to 5 mol/L. To the developer, a small amount of a water-miscible organic solvent may be further added. Examples of the water-miscible organic solvent include methanol, ethanol, 2-propanol, 1-propanol, butanol, diacetone alcohol, ethylene glycol monomethyl ether, ethylene glycol monoethyl ether, ethylene glycol mono-n-butyl ether, pentyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, N-methyl pyrrolidone, and the like. The concentration of the organic solvent is preferably 0.1% by mass to 30% by mass.

In addition, to the developer, it is possible to further add a well-known surfactant. The concentration of the surfactant is preferably 0.01% by mass to 10% by mass.

The development method may be any one of puddle development, shower development, shower and spin development, dip development, and the like. In the case of the shower development, a developer is showered onto the transparent protective layer and the optical adjustment member which have been exposed, whereby it is possible to remove non-cured portions. Furthermore, in a case in which the thermoplastic resin layer or the interlayer is provided, it is preferable to shower an alkaline liquid that does not easily dissolve the transparent protective layer and the optical adjustment member and remove the thermoplastic resin layer, the interlayer, and the like before development. In addition, after the development, it is preferable to shower a cleaning agent or the like and remove development residue by rubbing the surface with a brush or the like. The liquid temperature of the developer is preferably 20° C. to 40° C., and the power of hydrogen (pH) of the developer is preferably 8 to 13.

The method for manufacturing the electrostatic capacitance-type input device may have other steps such as a post exposure step and a post baking step. In a case in which the transparent protective layer and the optical adjustment member are thermosetting members, it is preferable to carry out a post baking step.

Furthermore, patterning exposure or full-surface exposure may be carried out after the peeling of the temporary support or may be carried out before the peeling of the temporary support, which is followed by the peeling of the temporary support. The exposure may be exposure through a mask or digital exposure using a laser or the like.

[Transfer Film]

A transfer film of the present invention is a transfer film having a temporary support, a transparent protective layer, an optical adjustment member, and a protective film in this order, the optical adjustment member has at least one layer of low-refractive index layers that are odd-numbered layers from a protective film side and at least one layer of high-refractive index layers that are even-numbered layers from the protective film side, the difference in refractive index between the low-refractive index layer and the high-refractive index layer that are directly adjacent to each other is 0.05 or more, the refractive index of the high-refractive index layer is 2.10 or lower, and the thickness of each of the low-refractive index layer and the high-refractive index layer is 5 to 80 nm.

The transparent electrode pattern (preferably including a metal oxide such as indium tin oxide (ITO)) generally has a refractive index that is higher than 2.10. The transfer film of the present invention has the optical adjustment member including the high-refractive index layer having a refractive index of 2.10 or less and the transparent protective layer, and thus it is possible to obtain transparent electrode-attached complexes in which the refractive index difference between the transparent electrode pattern and the optical adjustment member and the refractive index difference between the optical adjustment member and the transparent protective layer decrease. In a case in which the optical adjustment member and the transparent protective layer are formed on the viewer side of the transparent electrode pattern, light reflection is reduced, and thus the transparent electrode pattern becomes rarely visible, and the transparent electrode pattern-masking properties can be improved.

In addition, in the transfer film of the present invention, it is preferable that the low-refractive index layer and the high-refractive index layer are curable transparent resin layers including a polymerizable compound, and the curable transparent resin layers are in a state of being not cured. In this case, in the transfer film of the present invention, even in a case in which the transparent protective layer is laminated with the optical adjustment member while remaining curable, the layers are favorably differentiated from each other, and thus the transparent electrode pattern-masking properties can be improved with the above-described mechanism. Furthermore, in this case, the transparent protective layer and the optical adjustment member can be developed in a desired pattern by means of photolithography after the transparent protective layer and the optical adjustment member are transferred onto the transparent electrode pattern from the transfer film.

Meanwhile, in a case in which the transparent protective layer and the optical adjustment member are favorably differentiated from each other, there is a tendency that it becomes easy to sufficiently obtain the refractive index adjustment effect which can be obtained with the above-described mechanism and the transparent electrode pattern-masking properties is sufficiently improved. The photolithography is preferably carried out on at least the transparent protective layer which becomes a layer closer to the outside than the transferred optical adjustment member. The optical adjustment member which becomes a layer closer to the inside than the transferred transparent protective layer may not have photolithographic properties. In the present invention, the transparent protective layer is preferably curable in a state of a transfer film, and the transparent protective layer which becomes a layer that closer to the outside than the transferred optical adjustment member preferably has photolithographic properties.

Hereinafter, a preferred aspect of the transfer film of the present invention will be described.

<Layer Constitution of Transfer Film>

The transfer film of the present invention has a temporary support, a transparent protective layer, an optical adjustment member, and a protective film in this order. The temporary support and the transparent protective layer may be disposed in direct contact with each other or may be disposed through an additional layer. Examples of the additional layer include a thermoplastic resin layer or an interlayer described below. The temporary support and the transparent protective layer are preferably disposed in direct contact with each other.

Figure 12:
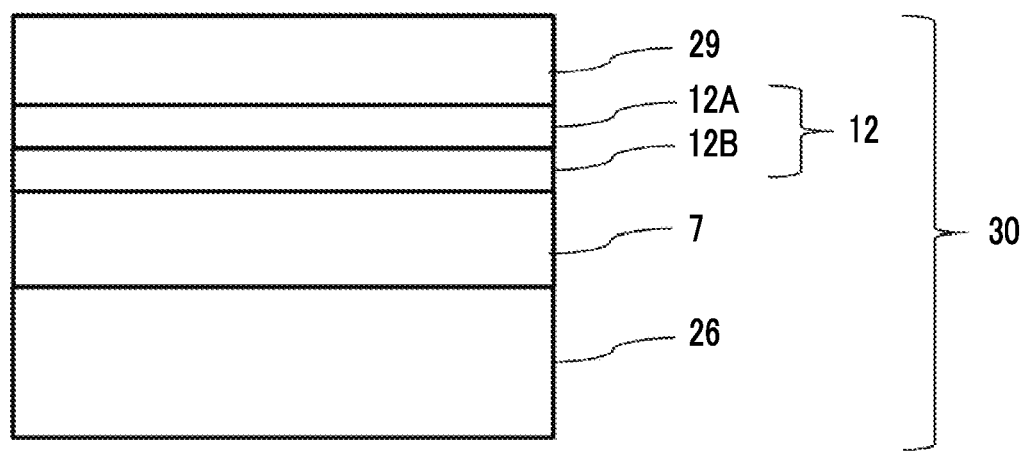
FIG. 12 is a schematic cross-sectional view illustrating an example of the constitution of a transfer film of the present invention.

FIG. 12 illustrates an example of a preferred layer constitution of the transfer film of the present invention. FIG. 12 is a schematic view of the transfer film 30 of the present invention in which a temporary support 26, the transparent protective layer 7, the optical adjustment member 12, and the protective film 29 are laminated adjacent to each other in this order. In FIG. 12, the optical adjustment member 12 has one low-refractive index layer 12A that is an odd-numbered layer from the protective film 29 side (the side opposite to the transparent protective layer 7) and one high-refractive index layer 12B that is an even-numbered layer from the protective film 29 side (the side opposite to the transparent protective layer 7).

The transfer film of the present invention is preferably a negative-type material, but the transfer film of the present invention may also be a negative-type material. In a case in which the transfer film of the present invention is a positive-type material, for the transparent protective layer and the optical adjustment member, the material described in, for example, JP2005-221726A is used, but the material is not limited thereto.

<Temporary Support>

The temporary support that is used in the transfer film of the present invention is not particularly limited, and examples thereof include glass plate, Si wafers, paper, non-woven fabrics, films, and the like. Among these, the temporary support is preferably a film and more preferably a resin film.

As the film that is used as the temporary support, it is possible to use flexible materials that do not significantly deform, contract, or extend under pressurization or under pressurization and heating. Examples of temporary supports satisfying the above-described properties include polyethylene terephthalate films, triacetylcellulose films, polystyrene films, polycarbonate films, and the like, and, among these, biaxially-stretched polyethylene terephthalate films are particularly preferred.

The thickness of the temporary support is not particularly limited, but is generally in a range of 5 to 200 μm, particularly, preferably in a range of 10 to 150 μm from the viewpoint of easy handling, versatility, and the like, and more preferably in a range of 10 to 20 μm from the viewpoint of weight reduction.

In addition, the temporary support may be transparent and may contain dyed silicon, an alumina sol, a chromium salt, a zirconium salt, or the like.

In addition, the temporary support can be imparted with a conductive property using the method described in JP2005-221726A.

<Transparent Protective Layer>

The preferred range of the transparent protective layer in the transfer film is the same as the preferred range of the transparent protective layer in the transparent electrode-attached complex.

In a case in which the transparent protective layer is curable, the transfer film of the present invention is capable of imparting photolithographic properties to the transferred transparent protective layer. In the transfer film of the present invention, the transparent protective layer preferably includes a resin that is soluble in organic solvents. On the other hand, the low-refractive index layer and the high-refractive index layer in the optical adjustment member are preferably formed of a water-based resin composition, but the formed low-refractive index layer and the formed high-refractive index layer may not include any resins that are soluble in water, and, for example, the formed low-refractive index layer and the formed high-refractive index layer preferably include a resin soluble in basic aqueous solutions (for example, ammonia water). In the case of manufacturing the transfer film of the present invention, it is preferable to impart curing properties to the transparent protective layer in a state of being used as a dry-resist film by applying and drying an organic solvent-based resin composition which is used to form the transparent protective layer and then applying the water-based resin composition which is used to form the low-refractive index layer and the high-refractive index layer in the optical adjustment member without exposing the organic solvent-based resin composition.

<Optical Adjustment Member>

The transfer film of the present invention has the optical adjustment member, the optical adjustment member has at least one layer of the low-refractive index layers that are odd-numbered layers from the protective film side and at least one layer of the high-refractive index layers that are even-numbered layers from the protective film side, the difference in refractive index between the low-refractive index layer and the high-refractive index layer that are directly adjacent to each other is 0.05 or more, the refractive index of the high-refractive index layer is 2.10 or lower, and the thickness of each of the low-refractive index layer and the high-refractive index layer is 5 to 80 nm.

The preferred range of the optical adjustment member in the transfer film is the same as the preferred range of the optical adjustment member in the transparent electrode-attached complex.

<Protective Film>

The transfer film of the present invention has a protective film and preferably has a protective film (also referred to as "protective peeling layer") on the surface of the optical adjustment member.

As the protective film, the protective films described in Paragraphs "0083" to "0087" and "0093" of JP2006-259138A can be appropriately used.

<Thermoplastic Resin Layer>

In the transfer film, it is also possible to provide a thermoplastic resin layer between the temporary support and the transparent protective layer.

The thermoplastic resin layer is preferably alkali-soluble. The thermoplastic resin layer plays a role of a cushion material so as to be capable of absorbing protrusions and recesses (also including protrusions, recesses, and the like caused by images and the like which have been previously formed) on the base surface and is preferably capable of transforming in accordance with protrusions and recesses on subject surfaces.

The thermoplastic resin layer preferably includes the organic macromolecular substance described in JP1993-72724A (JP-H05-72724A) as a component and particularly preferably includes at least one substance selected from organic macromolecular substances having a softening point of approximately 80° C. or lower which is obtained using the Vicat method [specifically, the polymer softening point measurement method based on ASTM D1235].

Specific examples thereof include organic macromolecules such as polyolefins such as polyethylene and polypropylene, ethylene copolymers of ethylene and vinyl acetate or a saponified substance thereof, copolymers of ethylene and an acrylic acid ester or a saponified substance thereof, vinyl chloride copolymers of polyvinyl chloride or vinyl chloride and vinyl acetate or a saponified substance thereof, polyvinylidene chloride, vinylidene chloride copolymers, polystyrene, styrene-based copolymers of styrene and a (meth)acrylic acid ester or a saponified substance thereof, polyvinyl toluene, vinyl toluene copolymers of vinyl toluene and a (meth)acrylic acid ester or a saponified substance thereof, poly(meth)acrylic acid esters, (meth) acrylic acid ester copolymers of butyl (meth)acrylate and vinyl acetate, polyamide resins such as vinyl acetate copolymer nylon, copolymerized nylon, N-alkoxymethylated nylon, and N-dimethylaminated nylon, and the like.

The thickness of the thermoplastic resin layer is preferably 3 to 30 μm. The thickness of the thermoplastic resin layer is more preferably 4 to 25 μm and particularly preferably 5 to 20 μm.

The thermoplastic resin layer can be formed by means of the application or the like of a prepared liquid including a thermoplastic organic macromolecule, and the prepared liquid that is used in the case of application or the like can be prepared using a solvent. The solvent is not particularly limited as long as the solvent is capable of dissolving macromolecular components constituting the thermoplastic resin layer, and examples thereof include methyl ethyl ketone, cyclohexanone, propylene glycol monomethyl ether acetate, n-propanol, 2-propanol, and the like.

<Interlayer>

In the transfer film, it is also possible to provide an interlayer between the thermoplastic resin layer and the transparent protective layer. The interlayer is preferably a layer described in JP1993-72724A (JP-H05-72724A) as "separation layer".

<Method for Manufacturing Transfer Film>

The method for manufacturing the transfer film is not particularly limited, and the transfer film can be manufactured using a well-known method.

The transfer film is preferably manufactured using a manufacturing method having a step of forming the transparent protective layer on the temporary support, a step of forming the optical adjustment member on the transparent protective layer, and a step of forming the protective film on the optical adjustment member.

In the method for manufacturing a transfer film, the interlaminar mixing between the transparent protective layer and the optical adjustment member is preferably suppressed. In order to suppress the interlaminar mixing, it is preferable to use an organic solvent-based resin composition as the composition for forming the transparent protective layer (for example, a coating fluid) and use a water-based resin composition as the composition for forming the low-refractive index layer and the high-refractive index layer in the optical adjustment member (for example, a coating fluid). In this case, even in a case in which the composition for forming the low-refractive index layer and the composition for forming the high-refractive index layer are applied onto the composition for forming the transparent protective layer without curing the composition for forming the transparent protective layer, the transparent protective layer does not dissolve, and thus interlaminar mixing does not easily occur.

The step of forming the transparent protective layer is a step of applying the organic solvent-based resin composition including a resin soluble in organic solvents onto the temporary support, and the step of forming the low-refractive index layer and the high-refractive index layer in the optical adjustment member is preferably a step of applying the water-based resin composition since the uniformity of the thicknesses of the low-refractive index layer and the high-refractive index layer in the optical adjustment member becomes favorable and color unevenness is significantly reduced. The water-based resin composition preferably includes "a resin soluble in water or a resin that is not soluble in water but soluble in ammonia water" and more preferably includes a resin that is soluble in water but soluble in ammonia water. In detail, in a case in which the water-based resin composition including an ammonium salt of a monomer having an acidic group or an ammonium salt of a resin having an acidic group is applied onto the transparent protective layer obtained using the organic solvent-based resin composition, even in a case in which the low-refractive index layer and the high-refractive index layer in the optical adjustment member are formed without curing the transparent protective layer, interlaminar mixing does not easily occur, and the uniformity of the thicknesses of the low-refractive index layer and the high-refractive index layer in the optical adjustment member becomes favorable.

At this time, in a case in which the resin for the transparent protective layer includes a resin having photolithographic properties, it is possible to impart photolithographic properties.

Examples of the resin having photolithographic properties include specific acrylic resins and the like, acrylic resins that are alkali-soluble resins are preferred, and the acrylic resins described in "0028" to "0072" of JP2008-146018A are more preferred.

In addition, in a case in which the resin for the low-refractive index layer and the high-refractive index layer in the optical adjustment member includes an ammonium salt of a monomer having an acidic group or an ammonium salt of a resin having an acidic group, it is possible to improve the moisture-heat resistance of layers to be obtained. In detail, in a case in which a coated film obtained using the water-based resin composition including an ammonium salt of a monomer having an acidic group or an ammonium salt of a resin having an acidic group is dried, ammonia having a lower boiling point than water is likely to be volatilized from the ammonium salt of a monomer having an acidic group or the ammonium salt of a resin having an acidic group in a drying step. Therefore, it is possible to generate (regenerate) acidic groups and make the acidic groups present in the low-refractive index layer and the high-refractive index layer in the optical adjustment member as a monomer having an acidic group or a resin having an acidic group. Therefore, in a case in which the transfer film is stored at a high temperature and a high humidity and absorbs moisture, the monomer having an acidic group or the resin having an acidic group which constitutes the low-refractive index layer and the high-refractive index layer has already become insoluble in water, and thus it is possible to suppress a problem of moisture-heat resistance caused when the transfer film absorbs humidity.

Furthermore, in a case in which the composition for forming the transparent protective layer (for example, coating fluid) includes a surfactant containing a fluorine atom (also referred to as fluorine-based surfactant), even in a case in which the low-refractive index layer and the high-refractive index layer in the optical adjustment member are formed without curing the transparent protective layer, interlaminar mixing does not occur, and the uniformity of the thickness of the low-refractive index layer and the high-refractive index layer in the optical adjustment member becomes favorable. In addition, in a case in which the content of the surfactant in the composition for forming the transparent protective layer is adjusted so that the content of the surfactant with respect to the solid contents of the transparent protective layer, in the case of manufacturing a transparent electrode-attached complex described below, adhesiveness between the optical adjustment member and the transparent electrode pattern becomes favorable. The preferred range of the content of the surfactant with respect to the solid contents of the composition for forming the transparent protective layer is the same as the preferred range of the content of the surfactant containing a fluorine atom in the transparent protective layer with respect to the solid contents of the transparent protective layer.

Particularly, an aspect in which the step of forming the transparent protective layer is a step of applying an organic solvent-based resin composition including an acrylic resin and a surfactant containing fluorine atoms onto the temporary support and the step of forming the optical adjustment member is a step of applying a water-based resin composition including an ammonium salt of a monomer having an acidic group or an ammonium salt of a resin having an acidic group is preferred. This aspect is preferred since interlaminar mixing between the transparent protective layer and the optical adjustment member can be suppressed, the uniformity of the thickness of the optical adjustment member becomes favorable, and color unevenness is significantly reduced. Furthermore, this aspect is preferred since adhesiveness between the optical adjustment member and the transparent electrode pattern becomes favorable and, in a case in which the transfer film is stored at a high temperature and a high humidity and absorbs moisture, it is possible to suppress problems caused by the absorption of moisture by the transparent resin layer (here, the optical adjustment member) formed using the water-based resin composition.

(Step of Forming Transparent Protective Layer on Temporary Support)

The step of forming the transparent protective layer on the temporary support is preferably a step of applying the resin composition for forming the transparent protective layer on the temporary support.

The concentration of the solid content of the resin composition for forming the transparent protective layer is preferably 15% to 30% by mass, more preferably 20% to 24% by mass, and particularly preferably 21% to 23% by mass.

The step of forming the transparent protective layer on the temporary support is more preferably a step of applying an organic solvent-based resin composition on the above-described temporary support.

The organic solvent-based resin composition refers to a resin composition that is soluble in organic solvents.

As the organic solvents, ordinary organic solvents can be used. Examples of the organic solvents include methyl ethyl ketone, propylene glycol monomethyl ether, propylene glycol monomethyl ether acetate, cyclohexanone, methyl isobutyl ketone, ethyl lactate, methyl lactate, caprolactam, and the like.

The resin composition that is used to form the transparent protective layer preferably includes a binder polymer, a photopolymerizable compound, and a photopolymerization initiator.

—Binder Polymer—

As the binder polymer included in the resin composition that is used to form the transparent protective layer, an arbitrary polymer component can be used without any particular limitations. From the viewpoint of being used as the transparent protective layer, particularly, a protective film for the transparent electrode in electrostatic capacitance-type input devices, the binder polymer is preferably a binder polymer having high surface hardness and favorable heat resistance and more preferably an alkali-soluble resin. Among alkali-soluble resins, well-known photosensitive siloxane resin materials, acrylic resin materials, and the like are preferably used. The binder polymer included in the resin composition that is used to form the transparent protective layer is preferably an acrylic resin. Both the binder polymer included in the resin composition that is used to form the transparent protective layer and a resin or binder polymer having an acidic group included in the resin composition that is used to form the optical adjustment member, which will be described below, more preferably contain an acrylic resin from the viewpoint of enhancing interlaminar adhesiveness before and after the transfer of the transparent protective layer and the optical adjustment member. A preferred range of the binder polymer for the transparent protective layer will be specifically described.

The resin which is used in the organic solvent-based resin composition that is used to form the transparent protective layer and is soluble in organic solvents (also referred to as "binder" or "polymer") is not particularly limited within the scope of the purport of the present invention, can be appropriately selected from well-known resins, and alkali-soluble resins are preferred. As the alkali-soluble resins, it is possible to use the polymer described in Paragraph "0025" of JP2011-95716A and Paragraphs "0033" to "0052" of JP2010-237589A.

In addition, the resin composition that is used to form the transparent protective layer may also include polymer latex. Polymer latex mentioned herein is latex obtained by dispersing the fine particles of a polymer that is insoluble in water in water. The polymer latex is described in, for example, "Chemistry of high-molecular-weight latex (published by Kobunshi Kankokai (1973))" by Muroi Soichi.

Polymer particles that can be used are preferably polymer particles of a polymer such as an acrylic polymer, a vinyl acetate-based polymer, a rubber-based (for example, styrene-butadiene-based or chloroprene-based) polymer, an olefin-based polymer, a polyester-based polymer, a polyurethane-based polymer, a polystyrene-based polymer or a copolymer thereof.

It is preferable to strengthen the bonding forces between polymer chains constituting the polymer particles. Examples of means for strengthening the bonding forces between polymer chains include means for using interactions generated due to hydrogen bonds and means for generating covalent bonds.

Means for using interactions generated due to hydrogen bonds is preferably the introduction of monomers having a polar group into polymer chains by means of copolymerization or graft polymerization. Examples of the polar group in the binder polymer include carboxyl groups (included in acrylic acid, methacrylic acid, itaconic acid, fumaric acid, maleic acid, crotonic acid, partially-esterified maleic acid, and the like), primary, secondary, and tertiary amino groups, ammonium salt groups, sulfonic acid groups (styrenesulfonic acid group and the like), and the like, and carboxyl groups and sulfonic acid groups are particularly preferred. The preferred range of the copolymerization ratio of the monomers having a polar group is in a range of 5% to 35% by mass, more preferably 5% to 20% by mass, and still more preferably 15% to 20% by mass with respect to 100% by mass of the polymer.

Meanwhile, examples of means for generating covalent bonds include methods in which at least one compound of an epoxy compound, blocked isocyanate, isocyanate, a vinylsulfone compound, an aldehyde compound, a methylol compound, a carboxylic acid anhydride, or the like is reacted with at least one group of a hydroxyl group, a carboxyl group, a primary or secondary amino group, an acetoacetyl group, or a sulfonic acid group.

Among polymers for which the above-described reaction is used, polyurethane derivatives obtained by a reaction between a polyol and a polyisocyanate compound are preferred, polymers for which a polyvalent amine is jointly used as a chain extender are more preferred, and, furthermore, polymers which are turned into an ionomer by introducing the polar group into polymer chains are particularly preferred.

The weight-average molecular weight of the polymer is preferably 10,000 or more and more preferably 20,000 to 100,000. Examples of polymers preferable for the present invention include ethylene ionomers and polyurethane ionomers which are copolymers between ethylene and methacrylic acid.

The polymer latex that can be used in the present invention may be polymer latex obtained by emulsification polymerization or polymer latex obtained by emulsification. Methods for preparing the polymer latex are described in, for example, "Emulsion Latex Handbook" (edited by the emulsion latex handbook editorial committee, published by Taiseisha Ltd. (1975)).

Examples of the polymer latex that can be used in the present invention include polymer latex obtained by means of the ammonia-neutralization and emulsification of an aqueous dispersion of a polyethylene ionomer (trade name: CHEMIPEARL S120, manufactured by Mitsui Chemicals, Inc., the solid content: 27% by mass), (trade name: CHEMIPEARL S100 manufactured by Mitsui Chemicals, Inc. the solid content: 27% by mass), (trade name: CHEMIPEARL S111 manufactured by Mitsui Chemicals, Inc. the solid content: 27% by mass), (trade name: CHEMIPEARL S200 manufactured by Mitsui Chemicals, Inc. the solid content: 27% by mass), (trade name: CHEMIPEARL S300 manufactured by Mitsui Chemicals, Inc. the solid content: 35% by mass), (trade name: CHEMIPEARL S650 manufactured by Mitsui Chemicals, Inc. the solid content: 27% by mass), and (trade name: CHEMIPEARL S75N manufactured by Mitsui Chemicals, Inc. the solid content: 24% by mass), an aqueous dispersion of a polyether-based polyurethane (trade name: HYDRAN WLS-201, manufactured by DIC Corporation, the solid content: 35% by mass. Tg −50° C., Tg is the abbreviation of the glass transition temperature), (trade name: HYDRAN WLS-202, manufactured by DIC Corporation, the solid content: 35% by mass, Tg −50° C.), (trade name: HYDRAN WLS-221, manufactured by DIC Corporation, the solid content: 35% by mass, Tg −30° C.), (trade name: HYDRAN WLS-210, manufactured by DIC Corporation, the solid content: 35% by mass, Tg −15° C.), (trade name: HYDRAN WLS-213, manufactured by DIC Corporation, the solid content: 35% by mass, Tg −15° C.), (trade name: HYDRAN WLI-602, manufactured by DIC Corporation, the solid content: 39.5% by mass, Tg −50° C.), (trade name: HYDRAN WLI-611, manufactured by DIC Corporation, the solid content: 39.5% by mass, Tg −15° C.), alkyl acrylate copolymer-ammonium (trade name: JURYMER AT-210, manufactured by Toagosei Co., Ltd.) (trade name: JURYMER ET-410, manufactured by Toagosei Co., Ltd.) (trade name: JURYMER AT-510, manufactured by Toagosei Co., Ltd.), or polyacrylic acid (trade name: JURYMER AC-10L, manufactured by Toagosei Co., Ltd.).

—Photopolymerizable Compound—

As the photopolymerizable compound that is used in the water-based resin composition or the organic solvent-based resin composition, it is possible to use the photopolymerizable compound described in Paragraphs "0023" and "0024" of JP4098550B. Among these, pentaerythritol tetraacrylate, pentaerythritol triacrylate, and tetraacrylates of pentaerythritol ethylene oxide adduct can be preferably used. These photopolymerizable compounds may be used singly or a plurality of photopolymerizable compounds may be used in combination. In a case in which a mixture of pentaerythritol tetraacrylate and pentaerythritol triacrylate is used, the percentage of pentaerythritol triacrylate in the entire mixture of pentaerythritol tetraacrylate and pentaerythritol triacrylate is preferably 0% to 80% and more preferably 10% to 60% in terms of mass ratio.

Examples of the photopolymerizable compound that is used in the organic solvent-based resin composition include photopolymerizable compounds obtained by causing an addition reaction of an ethylene oxide or a propylene oxide with a polyfunctional alcohol such as polyethylene glycol di(meth)acrylate, polypropylene glycol di(meth)acrylate, trimethylolethane tri(meth)acrylate, trimethylolpropane tri (meth)acrylate, trimethylolpropane di(meth)acrylate, neopentyl glycol di(meth)acrylate, pentaerythritol tetra(meth) acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl) ether, tri(acryloyloxyethyl) isocyanurate, tri (acryloyloxyethyl) cyanurate, glycerin tri(meth)acrylate, trimethylol propane or glycerin, or bisphenol and forming a (meth)acrylate thereof, polyfunctional acrylates or methacrylates of the urethane acrylates respectively described in JP1973-41708B (JP-S48-41708B), JP1975-6034B (JP-S50-6034B), and JP1976-37193A (JP-S51-37193A); the polyester acrylates respectively described in JP1973-64183A (JP-S48-64183A), JP1974-43191B (JP-S49-43191B), and JP1977-30490B (JP-S52-30490B); epoxy acrylates which are reaction products between epoxy resins and (meth) acrylic acids; and the like, and the like. Among these, trimethylolpropane tri(meth)acrylate, pentaerythritol tetra (meth)acrylate, dipentaerythritol hexa(meth)acrylate, dipentaerythritol penta(meth)acrylate pentaerythritol tetraacrylate mixtures (NK ester A-TMMT manufactured by Shin-Nakamura Chemical Co., Ltd.), and tetraacrylates of pentaerythritol ethylene oxide adducts (KAYARAD RP-1040 manufactured by Nippon Kayaku Co., Ltd.) can be preferably used. These photopolymerizable compounds may be used singly or two or more photopolymerizable compounds may be jointly used.

—Photopolymerization Initiator—

In a case in which the resin composition that is used to form the transparent protective layer includes the photopolymerizable compound and the photopolymerization initiator, it is possible to facilitate the formation of patterns of the transparent protective layer.

As the photopolymerization initiator that is used in the organic solvent-based resin composition, it is possible to use the photopolymerization initiators described in Paragraphs "0031" to "0042" of JP2011-95716A. For example, it is possible to preferably use 1,2-octane dione, 1-[4-(phenylthio)-, 2-(O-benzoyloxime)] (trade name: Irgacure OXE-01, manufactured by BASF), additionally, ethanone, 1-[9-ethyl-6-(2-methylbenzoyl)-9H-carbazole-3-yl]-, 1-(O-acetyloxime) (trade name: Irgacure OXE-02, manufactured by BASF), 2-(dimethylamino)-2-[(4-methylphenyl)methyl]-1-[4-(4-morpholinyl)phenyl]-1-butanone (trade name: Irgacure 379EG, manufactured by BASF), 2-methyl-1-(4-methyl thiophenyl)-2-morpholino propan-1-one (trade name: Irgacure 907, manufactured by BASF), 2-hydroxy-1-{4-[4-(2-hydroxy-2-methyl-propionyl)-benzyl]phenyl}-2-yl-propan-1-one (trade name: Irgacure 127, manufactured by BASF), 2-benzyl-2-dimethylamino-1-(4-morpholinophenyl)-butanone-1 (trade name: Irgacure 369, manufactured by BASF), 2-hydroxy-2-methyl-1-phenyl-erypropan-1-one (trade name: Irgacure 1173, manufactured by BASF), 1-hydroxy-cyclohexyl-phenyl-ketone (trade name: Irgacure 184, manufactured by BASF), 2,2-dimethoxy-1,2-diphenyl ethan-1-one (trade name: Irgacure 651, manufactured by BASF), oxime ester-based photopolymerization initiator (trade name: Lunar 6, manufactured by DKSH Japan K.K.), and the like.

In the resin composition that is used to form the transparent protective layer, the content of the photopolymerization initiator is preferably 1% by mass or more and more preferably 2% by mass or more of the solid content of the resin composition that is used to form the transparent protective layer. In the resin composition that is used to form the transparent protective layer, the content of the photopolymerization initiator is preferably 10% by mass or less and more preferably 5% by mass or less of the solid content of the resin composition that is used to form the transparent protective layer from the viewpoint of improving the patterning property of the transparent electrode-attached complex of the present invention.

—Metal Oxide Particles—

The resin composition that is used to form the transparent protective layer may or may not include particles (preferably metal oxide particles) for the purpose of adjusting the refractive index or the light-transmitting property. In order to control the refractive index of the transparent protective layer in the above-described range, it is possible to add metal oxide particles to the resin composition in an arbitrary ratio depending on the kind of the polymer or the polymerizable compound being used (preferably the photopolymerizable compound). In the resin composition that is used to form the transparent protective layer, the content of the metal oxide particles is preferably 0% to 35% by mass, more preferably 0% to 10% by mass, and particularly preferably 0% by mass of the solid content of the resin composition that is used to form the transparent protective layer.

(Step of Forming Optical Adjustment Member)

The step of forming the optical adjustment member on the transparent protective layer is preferably a step of applying the resin composition for forming the optical adjustment member (the resin composition for forming the low-refractive index layer and the resin composition for forming the high-refractive index layer) onto the transparent protective layer.

The concentration of the solid content of the resin composition for forming the optical adjustment member is preferably 1.0% to 5.0% by mass, more preferably 1.2% to 3.0% by mass, and particularly preferably 1.5% to 2.0% by mass.

The step of directly forming the optical adjustment member on the transparent protective layer is more preferably a step of applying a water-based resin composition for forming the optical adjustment member. The step of directly forming the optical adjustment member on the transparent protective layer is particularly preferably a step of applying a water-based resin composition for forming the optical adjustment member including an ammonium salt of a monomer having an acidic group or an ammonium salt of a resin having an acidic group.

The water-based resin composition refers to a resin composition that is soluble in water-based solvents.

In the resin composition for forming the optical adjustment member, in a case in which the total amount of the solvent is set to 100 parts by mass, the content of water is preferably 15 to 85 parts by mass, more preferably 20 to 80 parts by mass, and particularly preferably 25 to 75 parts by mass.

The water-based solvent is preferably water or a solvent mixture of a lower alcohol having 1 to 3 carbon atoms and water. The solvent in the water-based resin composition that is used to form the optical adjustment member preferably includes water and an alcohol having 1 to 3 carbon atoms and is more preferably water or a solvent mixture in which the content ratio of water to the alcohol having 1 to 3 carbon atoms is 15/85 to 85/15 in terms of mass ratio. The content ratio of water to the alcohol having 1 to 3 carbon atoms is particularly preferably in a range of 20/80 to 80/20 and more particularly preferably 25/75 to 75/25 in terms of mass ratio.

The pH of the water-based resin composition at 25° C. is preferably 7.0 or more and 12.0 or less, more preferably 7.0 to 10.0, and particularly preferably 7.0 to 8.5. The pH of the water-based resin composition can be adjusted to the above-described preferred range by, for example, adding the monomer having an acidic group or the resin having an acidic group to the acidic groups using an excess amount of ammonia.

In addition, the resin composition that is used to form the optical adjustment member is preferably at least one of a thermosetting resin composition or a photocurable resin composition. In a case in which the transparent protective layer and the optical adjustment member are curable transparent resin layers, even in a case in which the transparent protective layer is laminated, and then the optical adjustment member is laminated without curing the transparent protective layer, the layers are favorably differentiated from each other, and the transparent electrode pattern-masking properties can be improved. In a case in which the transparent protective layer is a curable transparent resin layer, furthermore, in the transparent electrode-attached complex described below, after an overcoat layer and a refractive index adjustment layer (that is, the transparent protective layer and the optical adjustment member) are transferred onto the transparent electrode pattern from the obtained transfer film at the same time, the transparent protective layer which becomes a layer closer to the outside than the optical adjustment member at least after being transferred can be developed in a desired pattern by means of photolithography. Furthermore, an aspect in which the optical adjustment member is curable is more preferred, and, in this aspect, the transparent protective layer and the optical adjustment member can be developed in a desired pattern at the same time by means of photolithography after being transferred onto the transparent electrode pattern at the same time.

The resin composition that is used to form the optical adjustment member preferably includes a binder polymer, a photo- or thermopolymerizable compound, and a photo- or thermopolymerization initiator.

The resin composition that is used to form the optical adjustment member more preferably has an ammonium salt of a monomer having an acidic group or an ammonium salt of a resin having an acidic group. The water-based resin composition preferably includes an ammonium salt of a monomer having an acidic group or an ammonium salt of a resin having an acidic group.

The ammonium salt of a monomer having an acidic group or the ammonium salt of a resin having an acidic group is not particularly limited. The ammonium salt of a monomer having an acidic group or the ammonium salt of a resin having an acidic group in the optical adjustment member is preferably an ammonium salt of an acrylic monomer or an acrylic resin having an acidic group. Only the ammonium salt of a resin having an acidic group may be a binder polymer, or, in addition to the ammonium salt of a resin having an acidic group, an additional binder polymer may be jointly used. The ammonium salt of a resin having an acidic group may be a photo- or thermopolymerizable compound, and, in addition to the ammonium salt of a resin having an acidic group, an additional photo- or thermopolymerizable compound may be jointly used.

The method for manufacturing the transfer film preferably includes a step of preparing a water-based resin composition including a monomer or a resin obtained by dissolving the monomer having an acidic group or the resin having an acidic group in an ammonia aqueous solution and turning at least some of the acidic group into an ammonium salt.

The concentration of the ammonia aqueous solution that can be used in the method for manufacturing the transfer film is not particularly limited, but an ammonia aqueous solution in which the concentration of ammonia is 0.1% to 25% by mass is preferred, an ammonia aqueous solution in which the concentration of ammonia is 0.5% to 10% by mass is more preferred, and an ammonia aqueous solution in which the concentration of ammonia is 1% to 5% by mass is particularly preferred.

The monomer having an acidic group or the resin having an acidic group is preferably a resin having an acidic group.

—Binder Polymer—

The resin composition that is used to form the optical adjustment member preferably includes a binder polymer.

Examples of the binder polymer include resins having an acidic group and other binder polymers having no acidic groups.

—Resins Having Acidic Group—

The resin having an acidic group is preferably a resin having a monovalent acidic group (a carboxyl group or the like).

The resin which is used in the water-based resin composition that is used to form the optical adjustment member and is soluble in water-based solvents (preferably water or solvent mixtures of a lower alcohol having 1 to 3 carbon atoms and water) is not particularly limited within the scope of the gist of the present invention and can be appropriately selected from well-known resins.

The resin having an acidic group that is used in the water-based resin composition is preferably an alkali-soluble resin. The alkali-soluble resin can be appropriately selected from alkali-soluble resins which are linear organic macromolecular polymers and have at least one group that accelerates alkali dissolution (that is, an acidic group: for example, a carboxyl group, a phosphoric acid group, a sulfonic acid group, or the like) in a molecule (preferably a molecule having an acrylic copolymer or a styrene-based copolymer as a main chain). Among these, alkali-soluble resins which are soluble in organic solvents and can be developed using a weak alkaline aqueous solution are more preferred. The acidic group is preferably a carboxyl group.

To the manufacturing of the alkali-soluble resin, it is possible to apply, for example, a method in which a well-known radical polymerization method is used. The polymerization conditions such as temperature, pressure, the kind and amount of radical initiators, and the kind of solvents in the case of manufacturing the alkali-soluble resin using a radical polymerization method can be easily set by persons skilled in the art, and the conditions can also be experimentally determined.

The linear organic macromolecular polymer is preferably a polymer having a carboxylic acid in a side chain. For example, poly(meth)acrylates, methacrylic acid copolymers, acrylic acid copolymers, itaconic acid copolymers, crotonic acid copolymers, maleic acid copolymers such as styrene/maleic acid, partially-esterified maleic acid copolymers, and the like, which are respectively described in JP1984-44615A (JP-S59-44615A), JP1979-34327B (JP-S54-34327B), JP1983-12577B (JP-S58-12577B), JP1979-25957B (JP-S54-25957B), JP1984-53836A (JP-S59-53836A), JP1984-71048A (JP-S59-71048A), JP1971-2121A (JP-S46-2121A), and JP 1981-40824B (JP-S56-40824B) and, furthermore, acidic cellulose derivatives having a carboxylic acid in the side chain such as carboxyalkyl cellulose and carboxyalkyl starch, polymers obtained by adding an acid anhydride to a polymer having a hydroxyl group, and the like are preferred. Furthermore, macromolecular polymers having a reactive functional group such as a (meth)acryloyl group in a side chain are also preferred.

Among these, particularly, benzyl (meth)acrylate/(meth)acrylic acid copolymers or multicomponent copolymers made of benzyl (meth)acrylate/(meth)acrylic acid/other monomers are preferred.

Additionally, polymers obtained by copolymerizing 2-hydroxyethylmethacrylate are also useful. The amount of the polymer being mixed and used can be arbitrary.

Additionally, examples thereof include 2-hydroxypropyl (meth)acrylate/polystyrene macromonomer/benzyl methacrylate/methacrylic acid copolymers, 2-hydroxy-3-phenoxypropyl acrylate/polymethyl methacrylate macromonomer/benzyl methacrylate/methacrylic acid copolymers, 2-hydroxyethyl methacrylate/polystyrene macromonomer/ methyl methacrylate/methacrylic acid copolymers, 2-hydroxyethyl methacrylate/polystyrene macromonomer/benzyl methacrylate/methacrylic acid copolymers, and the like which are described in JP1995-140654A (JP-H07-140654A).

Regarding the specific constitutional unit of the alkali-soluble resin, particularly, copolymers of (meth)acrylic acid and an additional monomer capable of being copolymerized with (meth)acrylic acid are preferred.

Examples of the additional monomer capable of being copolymerized with (meth)acrylic acid include alkyl (meth)acrylates, aryl (meth)acrylates, vinyl compounds, and the like. Here, hydrogen atoms in alkyl groups and aryl groups may be substituted with substituents.

Specific examples of alkyl (meth)acrylate and aryl (meth)acrylate include methyl (meth)acrylates, ethyl (meth)acrylates, propyl (meth)acrylates, butyl (meth)acrylates, isobutyl (meth)acrylates, pentyl (meth)acrylates, hexyl (meth)acrylates, octyl (meth)acrylates, phenyl (meth)acrylates, benzyl acrylates, tolyl acrylates, naphthyl acrylates, cyclohexyl acrylates, and the like.

In addition, examples of the vinyl compounds include styrene, α-methyl styrene, vinyl toluene, glycidyl methacrylate, acrylonitrile, vinyl acetate, N-vinyl pyrrolidone, tetrahydrofurfuryl methacrylate, polystyrene macromonomers, polymethyl methacrylate macromonomers, $CH_2=CR^1R^2$, $CH_2=C(R^1)(COOR^3)$ [here, $R^1$ represents a hydrogen atom or an alkyl group having 1 to 5 carbon atoms, $R^2$ represents an aromatic hydrocarbon ring having 6 to 10 carbon atoms, and $R^3$ represents an alkyl group having 1 to 8 carbon atoms or an aralkyl group having 6 to 12 carbon atoms.], and the like.

The additional monomer capable of being copolymerized with (meth)acrylic acid can be used singly or a combination of two or more monomers capable of being copolymerized with (meth)acrylic acid can be used. A preferred additional monomer capable of being copolymerized with (meth)acrylic acid is at least one monomer selected from $CH_2=CR^1R^2$, $CH_2=C(R^1)(COOR^3)$, phenyl (meth)acrylates, benzyl (meth)acrylates, and styrene and particularly preferably $CH_2=CR^1R^2$ and/or $CH_2=C(R^1)(COOR^3)$.

Additionally, examples thereof include resins having an ethylenic unsaturated double bond introduced into a linear macromolecule which are obtained by reacting a (meth)

acrylic compound having a reactive functional group, cinnamic acid, or the like with the linear macromolecule having a substituent capable of reacting with this reactive functional group. Examples of the reactive functional group include a hydroxyl group, a carboxyl group, an amino group, and the like, and examples of the substituent capable of being reacted with this reactive functional group include an isocyanate group, an aldehyde group, an epoxy group, and the like.

Among these, acrylic resins having an acidic group are preferred as the resin having an acidic group. Meanwhile, in the present specification, acrylic resins refer to both methacrylic resins and acrylic resins, and, similarly, (meth)acrylic resins refers to methacrylic resins and acrylic resins.

—Other Binder Polymers—

Other binder polymers having no acidic groups are not particularly limited, and the binder polymer that is used in the resin composition that is used to form the transparent protective layer can be used.

—Polymerizable Compound—

The resin composition that is used to form the optical adjustment member preferably includes a polymerizable compound such as a photopolymerizable compound or a thermopolymerizable compound from the viewpoint of increasing the strength or the like of films by being cured.

Examples of the polymerizable compound in the resin composition that is used to form the optical adjustment member include monomers having an acidic group and polymerizable compounds other than the monomers having an acidic group.

The polymerizable compound in the resin composition resin composition that is used to form the optical adjustment member preferably includes a photopolymerizable compound other than the monomer having an acidic group and more preferably includes a monomer having an acidic group and a photopolymerizable compound other than the monomer having an acidic group.

—Monomers Having Acidic Group—

As the monomer having an acidic group, it is possible to preferably use an acrylic monomer such as (meth)acrylic acid or a derivative thereof or the following monomer.

Examples thereof include tri- or tetrafunctional radical polymerizable monomers (monomers obtained by introducing a carboxylic acid group into a pentaerythritol tri- and tetraacrylate skeleton (acid value=80 to 120 mg-KOH/g)), penta- or hexafunctional radical polymerizable monomers (monomers obtained by introducing a carboxylic acid group into a dipentaerythritol penta- and hexaacrylate skeleton (acid value=25 to 70 mg-KOH/g)), and the like. Specific titles are not described, but bifunctional alkali-soluble radical polymerizable monomers may also be used as necessary.

Additionally, it is possible to preferably use the monomers having an acidic group described in "0025" to "0030" of JP2004-239942A, the content of which is incorporated into the present invention.

Among these, acrylic monomers such as (meth)acrylic acids or derivatives thereof can be more preferably used. Meanwhile, in the present specification, acrylic monomers refer to both methacrylic monomers and acrylic monomers.

—Other Polymerizable Compounds—

The polymerizable compounds other than the monomer having an acidic group which can be used in the resin composition that is used to form the optical adjustment member are preferably photopolymerizable compounds.

As the photopolymerizable compounds, it is possible to use the photopolymerizable compounds described in Paragraphs "0023" and "0024" of JP4098550B. Among these, pentaerythritol tetraacrylate, pentaerythritol triacrylate, and tetraacrylates of pentaerythritol ethylene oxide adducts can be preferably used. These polymerizable compounds may be used singly or a plurality of polymerizable compounds may be used in combination. In a case in which a mixture of pentaerythritol tetraacrylate and pentaerythritol triacrylate is used, the percentage of pentaerythritol triacrylate is preferably 0% to 80% by mass and more preferably 10% to 60% by mass with respect to all of the mixture of pentaerythritol tetraacrylate and pentaerythritol triacrylate in terms of the mass ratio.

Specific examples of the photopolymerizable compounds that are used in the resin composition that is used to form the optical adjustment member include water-soluble polymerizable compounds represented by Structural Formula 1, pentaerythritol tetraacrylate mixtures (NK ester A-TMMT manufactured by Shin-Nakamura Chemical Co., Ltd., containing approximately 10% of triacrylate as an impurity), mixtures of pentaerythritol tetraacrylate and triacrylate (NK ester A-TMM3LM-N manufactured by Shin-Nakamura Chemical Co., Ltd., 37% by mass triacrylate), mixtures of pentaerythritol tetraacrylate and triacrylate (NK ester A-TMM-3L manufactured by Shin-Nakamura Chemical Co., Ltd., 55% by mass triacrylate), mixtures of pentaerythritol tetraacrylate and triacrylate (NK ester A-TMM3 manufactured by Shin-Nakamura Chemical Co., Ltd., 57% by mass triacrylate), tetraacrylates of a pentaerythritol ethylene oxide adduct (KAYARAD RP-1040 manufactured by Nippon Kayaku Co., Ltd.), ARONIX TO-2349 (manufactured by Toagosei Co., Ltd.), and the like.

As the photopolymerizable compounds that are used in the resin composition that is used to form the optical adjustment member, among these, it is possible to preferably use the water-soluble polymerizable compound represented by Structural Formula 1, a pentaerythritol tetraacrylate mixture (NK ester A-TMMT manufactured by Shin-Nakamura Chemical Co., Ltd.), a mixture of pentaerythritol tetraacrylate and triacrylate (NK ester A-TMM3LM-N manufactured by Shin-Nakamura Chemical Co., Ltd., 37% triacrylate), or a mixture of pentaerythritol tetraacrylate and triacrylate (NK ester A-TMM-3L manufactured by Shin-Nakamura Chemical Co., Ltd., 55% triacrylate) from the viewpoint of improving the reticulation of the transfer film of the present invention.

Structural Formula 1

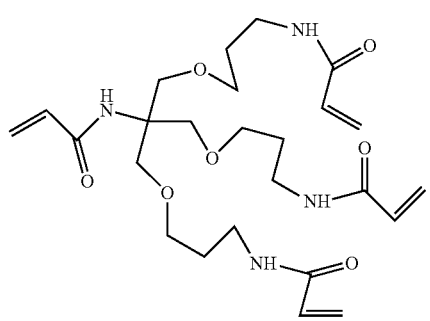

Additional photopolymerizable compounds that are used in the resin composition that is used to form the optical adjustment member are also preferably soluble in solvent mixtures of a lower alcohol having 1 to 3 carbon atoms such as methanol and water in a case in which an alcohol dispersion liquid of the metal oxide particles described below is jointly used in the water-based resin composition. As the polymerizable compound that is soluble in water or solvent mixtures of a lower alcohol having 1 to 3 carbon atoms and water, it is possible to use a monomer having a hydroxyl group or a monomer having an ethylene oxide or a polypropylene oxide and a phosphoric acid group in the molecule. The polymerizable compound that is also soluble in solvent mixtures of a lower alcohol having 1 to 3 carbon atoms and water is preferably KAYARAD RP-1040 (manufactured by Nippon Kayaku Co., Ltd.), ARONIX TO-2349 (manufactured by Toagosei Co., Ltd.), a polymerizable monomer A-9300 (manufactured by Shin-Nakamura Chemical Co., Ltd.), A-GLY-20E (manufactured by Shin-Nakamura Chemical Co., Ltd.), or the like. Meanwhile, the polymerizable compound also being soluble in solvent mixtures of a lower alcohol having 1 to 3 carbon atoms and water means that 0.1% by mass or more of the polymerizable compound is dissolved in solvent mixtures of an alcohol and water.

In addition, the content of the polymerizable compound is preferably 0% to 20% by mass, more preferably 0% to 10% by mass, and still more preferably 0% to 5% by mass of the total mass of the solid content of the resin composition that is used to form the optical adjustment member.

—Photopolymerization Initiator—

As the photopolymerization initiator which is used in the optical adjustment member and is soluble in water or solvent mixtures of a lower alcohol having 1 to 3 carbon atoms and water, it is possible to use Irgacure 2959 or an initiator of Structural Formula 11.

In addition, the content of the photopolymerization initiator is preferably 0% to 5% by mass, more preferably 0% to 1% by mass, and still more preferably 0% to 0.5% by mass of the total mass of the solid content of the resin composition that is used to form the optical adjustment member.

Structural Formual 11

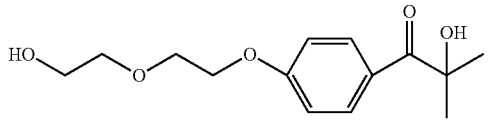

—Metal Oxide Particles—

The resin composition that is used to form the optical adjustment member may or may not include particles (preferably metal oxide particles) for the purpose of adjusting the refractive index or the light-transmitting property, but the resin composition that is used to form the high-refractive index layer preferably includes metal oxide particles from the viewpoint of controlling the refractive index of the high-refractive index layer in the optical adjustment member in the above-described range. To the resin composition that is used to form the high-refractive index layer in the optical adjustment member, it is possible to add metal oxide particles in an arbitrary ratio depending on the kind of the polymer or the polymerizable compound (preferably the photopolymerizable compound) being used. In the resin composition that is used to form the high-refractive index layer, the content of the metal oxide particles is preferably 10% to 95% by mass, more preferably 40% to 95% by mass, particularly preferably 55% to 95% by mass, more particularly preferably 62% to 90% by mass, and still more particularly preferably 65% to 90% by mass with respect to the total solid content of the resin composition that is used to form the high-refractive index layer.

The refractive index of the metal oxide particles is preferably higher than the refractive index of the optical adjustment member which does not include the metal oxide particles. That is, the metal oxide particles preferably have a refractive index that is higher than the refractive indexes of compositions made of the materials of the optical adjustment member except for the particles. Specifically, the high-refractive index layer in the optical adjustment member preferably contains particles having a refractive index of 1.50 or higher, more preferably include particles having a refractive index of 1.55 or higher, particularly preferably include particles having a refractive index of 1.70 or higher, and most preferably include particles having a refractive index of 1.90 or higher with respect to light having a wavelength of 400 to 750 nm.

Here, the refractive index of 1.50 or higher with respect to light having a wavelength of 400 to 750 nm means that the average refractive index is 1.50 or higher with respect to light having a wavelength in the above-described range, and the refractive index does not need to be 1.50 or higher with respect to all light rays having wavelengths in the above-described range. In addition, the average refractive index is the average value of refractive indexes with respect to individual light rays having wavelengths in the above-described range.

Meanwhile, the metal of the above-described metal oxide particles may also be a semi-metal such as B, Si, Ge, As, Sb, or Te.

The metal oxide particles which are light-transmissible and have a high refractive index are preferably oxide particles including atoms such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, and Te, more preferably titanium oxide, titanium complex oxide, zinc oxide, zirconium oxide, indium/tin oxide, or antimony/tin oxide, still more preferably titanium oxide, titanium complex oxide, or zirconium oxide, particularly preferably titanium oxide or zirconium oxide, and most preferably titanium oxide. Particularly, titanium oxide is preferably rutile-type titanium oxide having a high refractive index. The surfaces of these metal oxide particles can also be treated with an organic material in order to impart dispersion stability.

From the viewpoint of the transparency of the optical adjustment member, the average primary particle diameter of the metal oxide particles is preferably 1 to 200 nm and particularly preferably 3 to 80 nm. Here, the average primary particle diameter of particles refers to the arithmetic average of the diameters of 200 arbitrary particles measured using an electronic microscope. In addition, in a case in which the shapes of particles are not spherical, the longest sides are considered as the diameters.

In addition, one kind of the metal oxide particles may be used or two or more kinds of the metal oxide particles can be jointly used.

In the present invention, the optical adjustment member preferably has at least one of $ZrO_2$ particles, $Nb_2O_5$ particles, or $TiO_2$ particles from the viewpoint of controlling the refractive index in the range of the refractive index of the optical adjustment member, and $ZrO_2$ particles and $Nb_2O_5$ particles are more preferred.

The high-refractive index layer in the optical adjustment member may or may not include the metal oxide particles, but preferably includes the metal oxide particles from the viewpoint of controlling the refractive index of the optical adjustment member in the above-described range. To the high-refractive index layer in the optical adjustment member, it is possible to add the metal oxide particles in an arbitrary ratio depending on the kind of the polymer or the polymerizable compound being used. The content of the metal oxide particles in the high-refractive index layer in the optical adjustment member is preferably 10% to 95% by mass, more preferably 55% to 95% by mass, particularly preferably 62% to 90% by mass, and still more particularly preferably 65% to 90% by mass with respect to the total solid content of the high-refractive index layer in the optical adjustment member.

On the other hand, the low-refractive index layer in the optical adjustment member may or may not include metal oxide particles, but the low-refractive index layer preferably includes 0% to 35% by mass of the metal oxide particles and more preferably includes 0% to 10% by mass of the metal oxide particles with respect to the solid content of the low-refractive index layer and particularly preferably includes no metal oxide particles. The low-refractive index layer in the optical adjustment member preferably includes no metal oxide particles, but the low-refractive index layer including metal oxide particles is also within the scope of the present invention. Examples of the kind of the metal oxide particles in a case in which the low-refractive index layer in the optical adjustment member includes metal oxide particles include $ZrO_2$ particles, $Nb_2O_5$ particles, and $TiO_2$ particles.

In the transparent electrode-attached complex of the present invention, the method for measuring the contents of the metal oxide particles in the transparent protective layer and the optical adjustment member is as described below.

A cross section of the transparent electrode-attached complex is cut out, and then the cross section is observed using a transmission electron microscope (TEM). The ratio of the occupation area of the metal oxide particles to the film cross section area of the optical adjustment member (or the transparent protective layer) is measured at three arbitrary places in the layer, and the average value thereof is considered as the volume fraction (VR).

The volume fraction (VR) and the weight fraction (WR) are converted using the following expression, thereby computing the weight fraction (WR) of the metal oxide particles in the optical adjustment member (or the transparent protective layer).

$$WR=D*VR/(1.1*(1-VR)+D*VR)$$

D: The specific weight of the metal oxide particles

In a case in which the metal oxide particles are titanium oxide, D is 4.0 in the calculation, and, in a case in which the metal oxide particles are zirconium oxide, D is 6.0 in the calculation.

—Metal Oxidation Suppressor—

The resin composition that is used to form the optical adjustment member preferably includes a metal oxidation suppressor. In a case in which the optical adjustment member includes a metal oxidation suppressor, it becomes possible to treat the surface of a metal wire portion in direct contact with the optical adjustment member in a case in which the optical adjustment member is laminated on a base material (the base material preferably includes a transparent electrode pattern, the metal wire portion, and the like). The protection property of the metal wire portion which is imparted by treating the surface is considered to remain effective even after the optical adjustment member (and the transparent protective layer) is removed.

The metal oxidation suppressor that is used in the present invention is preferably a compound having an aromatic ring including a nitrogen atom in the molecule.

In addition, in the metal oxidation suppressor that is used in the present invention, the aromatic ring including a nitrogen atom is preferably at least one ring selected from the group consisting of an imidazole ring, a triazole ring, a tetrazole ring, a thiadiazole ring, and fused rings of the above-described ring and an additional aromatic ring, and the aromatic ring including a nitrogen atom is more preferably an imidazole ring or a fused ring of an imidazole ring and an additional aromatic ring.

The additional aromatic ring may be a homocyclic ring or a heterocyclic ring, but is preferably a homocyclic ring, more preferably a benzene ring or a naphthalene ring, and still more preferably a benzene ring.

The metal oxidation suppressor is preferably imidazole, benzimidazole, tetrazole, mercaptothiadiazole, and benzotriazole, and more preferably imidazole, benzimidazole, and benzotriazole.

In addition, the content of the metal oxidation suppressor is preferably 0.1% to 20% by mass, more preferably 0.5% to 10% by mass, and still more preferably 1 to 5% by mass of the total mass of the low-refractive index layer or the high-refractive index layer in the optical adjustment member.

(Drying)

The preferred range of the detailed conditions of a heating and drying step will be described below.

As the heating and drying method, it is also possible to use a method in which the composition is passed through a furnace comprising a heating device or blasting. The heating and drying conditions may be appropriately set depending on organic solvents and the like being used, and the composition may be heated to a temperature of 40° C. to 150° C.

In the case of forming the transparent protective layer and the optical adjustment member, the drying temperature is particularly preferably a temperature of 100° C. to 130° C. and more particularly preferably a temperature of 110° C. to 120° C.

In the composition that has been subjected to heating and drying, the moisture content in the wet standard is preferably 5% by mass or less, more preferably 3% by mass or less, and still more preferably 1% by mass or less.

Furthermore, the method for manufacturing the transfer film preferably includes a step of generating acidic groups by volatilizing ammonia from the ammonium salt of a monomer having an acidic group or the ammonium salt of a resin having an acidic group. The step of generating acidic groups by volatilizing ammonia from the ammonium salt of a monomer having an acidic group or the ammonium salt of a resin having an acidic group is preferably a step of heating the applied water-based resin composition.

<Other Steps>

The method for manufacturing the transfer film may include a step of further forming a thermoplastic resin layer before the formation of the transparent protective layer on the temporary support.

After the step of further forming the thermoplastic resin layer, a step of forming an interlayer between the thermoplastic resin layer and the transparent protective layer may be provided. In the case of forming the transfer film having the interlayer, it is preferable to provide a thermoplastic resin layer by applying and drying a solution obtained by dissolving additives together with a thermoplastic organic macromolecule (coating fluid for the thermoplastic resin layer) on the temporary support and then laminating the interlayer by applying and drying a preparation liquid obtained by adding resins or additives to a solvent that does not dissolve the thermoplastic resin layer (coating fluid for the interlayer) on the thermoplastic resin layer. Furthermore, a photosensitive resin layer is preferably laminated on the interlayer by applying and drying a coating fluid for the photosensitive resin layer which is prepared using a solvent that does not dissolve the interlayer.

As other manufacturing methods such as the step of forming the protective film on the optical adjustment member, it is possible to employ the method for producing a photosensitive transfer material described in Paragraphs "0094" to "0098" of JP2006-259138A.

<Applications of Transfer Film>

The transfer film of the present invention is preferably a dry-resist film. In the present specification, the dry-resist refers to a product obtained by providing a film shape to the transfer film.

The transfer film of the present invention is preferably used to form transparent insulating layers or transparent protective layers in electrostatic capacitance-type input devices.

The transfer film of the present invention can be preferably used as a transfer material for forming a lamination pattern of the optical adjustment member and the transparent protective layer on the transparent electrode pattern by means of photolithography.

[Electrostatic Capacitance-Type Input Device]

The electrostatic capacitance-type input device of the present invention includes the transparent electrode-attached complex of the present invention.

The electrostatic capacitance-type input device of the present invention is preferably produced by laminating the optical adjustment member and the transparent protective layer of the transfer film in this order on the base material including the transparent electrode pattern using the transfer film of the present invention and more preferably produced by transferring the optical adjustment member and the transparent protective layer disposed adjacent to the optical adjustment member onto the transparent electrode pattern in the electrostatic capacitance-type input device from the transfer film of the present invention.

The electrostatic capacitance-type input device preferably cures the transparent protective layer and the optical adjustment member which have been transferred from the transfer film of the present invention at the same time and more preferably pattern-cures the transparent protective layer and the optical adjustment member at the same time. Meanwhile, in a case in which the transparent protective layer and the optical adjustment member which have been transferred from the transfer film of the present invention are cured at the same time, it is preferable not to peel the temporary support from the transfer film of the present invention.

The electrostatic capacitance-type input device of the present invention more preferably develops and removes the non-cured portion of the transparent protective layer and the optical adjustment member which have been transferred from the transfer film of the present invention and pattern-cured at the same time. Meanwhile, it is preferable to cure the transparent protective layer and the optical adjustment member which have been transferred from the transfer film of the present invention at the same time and then peel the temporary support from the transfer film of the present invention to be developed. The electrostatic capacitance-type input device of the present invention needs to be connected to a flexible wire formed on a polyimide film at the terminal portion of a guidance wire and is thus preferably not covered with the transparent protective layer (and the optical adjustment member).

Figure 13:
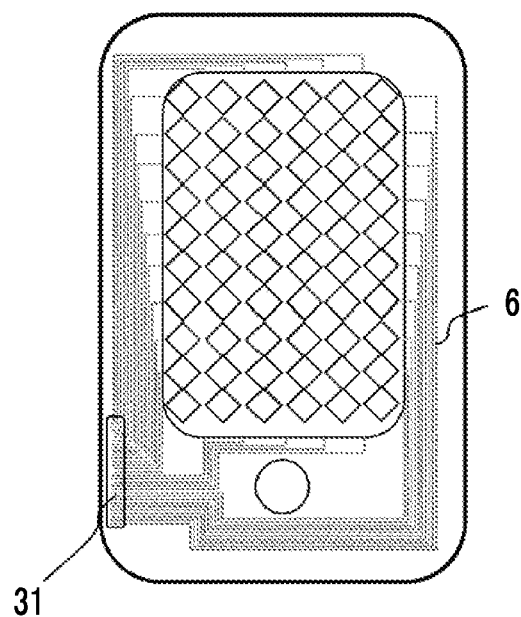
FIG. 13 is a top view illustrating another example of the constitution of the electrostatic capacitance-type input device of the present invention and illustrates an aspect including a terminal portion (end portion) of a guidance wire which is pattern-exposed and is not covered with a transparent protective layer.

The above-described aspect is illustrated in FIG. 13. FIG. 13 illustrates an electrostatic capacitance-type input device having the following constitution which includes a guidance wire (the additional conductive element 6) of the transparent electrode pattern and a terminal portion 31 of the guidance wire.

The transparent protective layer on the terminal portion 31 of the guidance wire forms a non-cured portion (non-exposed portion) and is thus removed by means of development, whereby the terminal portion 31 of the guidance wire is exposed.

Figure 14:
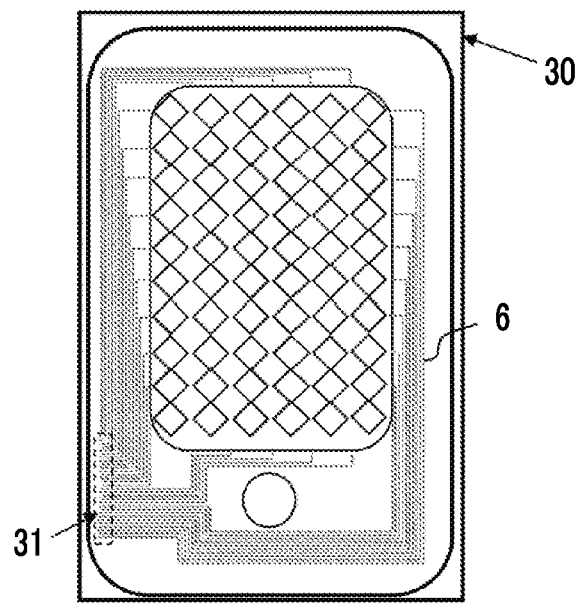
Figure 15:
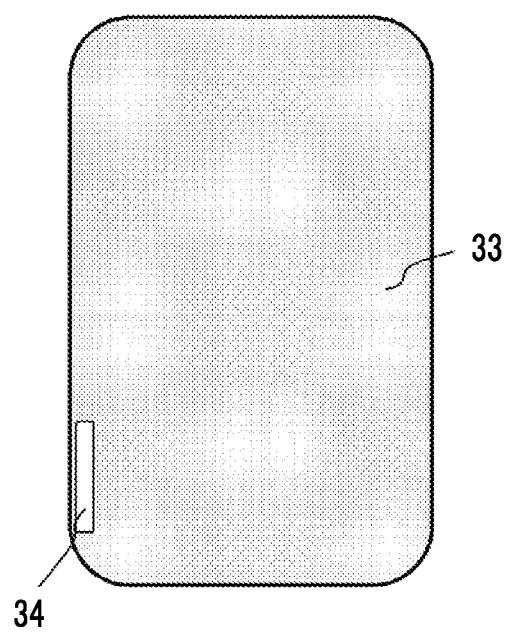
FIG. 15 is a schematic view illustrating an example of a desired pattern in which the transparent protective layer and the optical adjustment member are cured.

Specific exposure and development aspects are illustrated in FIGS. 14 and 15. FIG. 14 illustrates a state in which the transfer film 30 of the present invention having the transparent protective layer and the optical adjustment member is laminated on the transparent electrode pattern in the electrostatic capacitance-type input device by means of lamination and is to be cured by means of exposure or the like. In a case in which photolithography is used, that is, a case in which the transfer film is cured by means of exposure, the electrostatic capacitance-type input device can be obtained by pattern-exposing the cured portion (exposed portion) 33 of the transparent protective layer and the optical adjustment member having a shape illustrated in FIG. 15 using a mask and developing the non-exposed portions. Specifically, in FIG. 15, a cured portion (desired pattern) of the transparent protective layer and the optical adjustment member for preventing the terminal portion (the ejection wire portion) of the guidance wire from being covered, from which an opening portion 34 corresponding to the terminal portion of the guidance wire as the non-cured portion of the transparent protective layer and the optical adjustment member and the end portions of the transfer film of the present invention having the transparent protective layer and the optical adjustment member which protrude outside the contour of the frame portion of the electrostatic capacitance-type input device has been removed, are obtained.

Therefore, it is possible to directly connect the flexible wire produced on the polyimide film to the terminal portion 31 of the guidance wire, and thus it becomes possible to send signals from sensors to electric circuits.

Hereinafter, the detail of a preferred aspect of the electrostatic capacitance-type input device of the present invention will be described.

The electrostatic capacitance-type input device of the present invention has a base material (corresponding to the base material in the transparent electrode-attached complex of the present invention, also referred to as the front plate) and at least the following elements (3) to (5), (7), or (8) on the noncontact surface side of the base material and preferably has the transparent electrode-attached complex of the present invention:

(3) a plurality of first transparent electrode patterns in which a plurality of pad portions are formed so as to extend in a first direction through a connection portion;

(4) a plurality of second electrode patterns which are electrically insulated from the first transparent electrode patterns and are made of a plurality of pad portions formed so as to extend in a direction orthogonal to the above-described first direction;

(5) an insulating layer that electrically insulates the first transparent electrode pattern and the second electrode pattern;

(7) an optical adjustment member formed so as to fully or partially cover the elements (3) to (5); and (8) a transparent protective layer adjacently formed so as to cover the element (7).

Here, the optical adjustment member (7) corresponds to the optical adjustment member in the transparent electrode-attached complex of the present invention. In addition, the transparent protective layer (8) corresponds to the transparent protective layer in the transparent electrode-attached complex of the present invention. Meanwhile, generally, the transparent protective layer is preferably a so-called transparent protective layer in well-known electrostatic capacitance-type input devices.

In the electrostatic capacitance-type input device of the present invention, the second electrode pattern (4) may or may not be a transparent electrode pattern but is preferably a transparent electrode pattern.

The electrostatic capacitance-type input device of the present invention preferably further has an additional conductive element other than the first transparent electrode pattern and the second electrode pattern which is electrically connected to at least one of the first transparent electrode pattern or the second electrode pattern (6).

Here, in a case in which the second electrode pattern (4) is not a transparent electrode pattern and the additional conductive element (6) is not provided, the first transparent electrode pattern (3) corresponds to the transparent electrode pattern in the transparent electrode-attached complex of the present invention.

In a case in which the second electrode pattern (4) is a transparent electrode pattern and the additional conductive element (6) is not provided, at least one of the first transparent electrode pattern (3) or the second electrode pattern (4) corresponds to the transparent electrode pattern in the transparent electrode-attached complex of the present invention.

In a case in which the second electrode pattern (4) is not a transparent electrode pattern and the additional conductive element (6) is provided, at least one of the first transparent electrode pattern (3) or the additional conductive element (6) corresponds to the transparent electrode pattern in the transparent electrode-attached complex of the present invention.

In a case in which the second electrode pattern (4) is a transparent electrode pattern and the additional conductive element (6) is provided, at least one of the first transparent electrode pattern (3), the second electrode pattern (4), or the additional conductive element (6) corresponds to the transparent electrode pattern in the transparent electrode-attached complex of the present invention.

The electrostatic capacitance-type input device of the present invention preferably further has the transparent film (2) between the first transparent electrode pattern (3) and the base material, between the second electrode pattern (4) and the base material, or between the additional conductive element (6) and the base material. Here, the transparent film (2) preferably corresponds to the transparent film in the transparent electrode-attached complex of the present invention.

The electrostatic capacitance-type input device of the present invention preferably has the mask layer (1) and/or a decorative layer as necessary. The mask layer is also provided as a black trim around a region touched by a finger, a stylus, or the like in order to prevent the guidance wire of the transparent electrode pattern from being visible from the touch side or decorate the input device. The decorative layer is provided as a trim around the region touched by a finger, a stylus, or the like in order for decoration, and, for example, a white decorative layer is preferably provided.

The mask layer (1) and/or the decorative layer are preferably provided between the transparent film (2) and the base material, between the first transparent electrode pattern (3) and the base material, between the second transparent electrode pattern (4) and the base material, or between the additional conductive element (6) and the base material. The mask layer (1) and/or the decorative layer are more preferably provided adjacent to the base material.

Even in a case in which the electrostatic capacitance-type input device includes a variety of members, in a case in which the electrostatic capacitance-type input device of the present invention includes the optical adjustment member disposed adjacent to the transparent electrode pattern and the transparent protective layer disposed adjacent to the optical adjustment member, it is possible to prevent the transparent electrode pattern from becoming visible and solve a problem of the transparent electrode pattern-masking properties.

<Constitution of Electrostatic Capacitance-Type Input Device>

First, a preferred constitution of the electrostatic capacitance-type input device of the present invention will be described together with methods for manufacturing the respective members constituting the device. FIG. 1 is a cross-sectional view illustrating a preferred constitution of the electrostatic capacitance-type input device of the present invention. FIG. 1 illustrates an aspect in which an electrostatic capacitance-type input device 10 is composed of the base material 1, the mask layer 2, the transparent film 11 having a refractive index of 1.46 to 1.58, the first transparent electrode pattern (what is illustrated in the drawing is a connection portion 3*b* of the first transparent electrode pattern), the second transparent electrode pattern 4, the insulating layer 5, the additional conductive element 6, the optical adjustment member 12, and the transparent protective layer 7.

Figure 9:
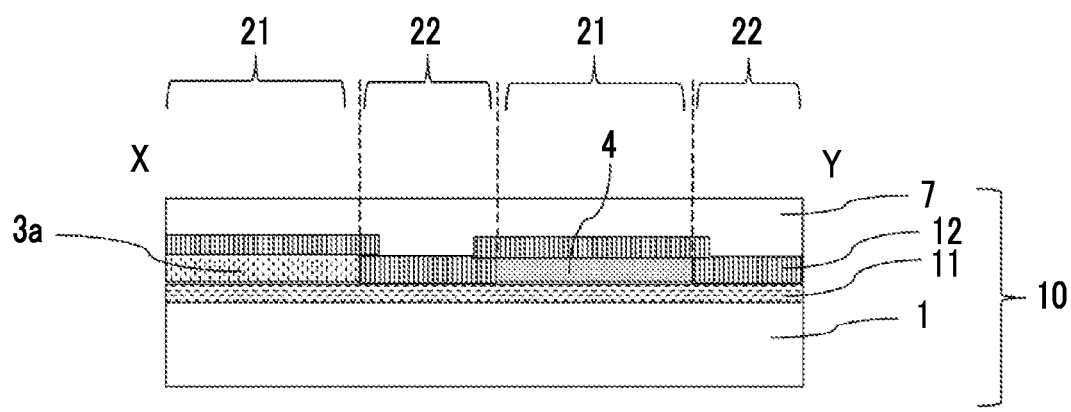
FIG. 9 is a schematic cross-sectional view illustrating another example of a constitution of an electrostatic capacitance-type input device of the present invention.

In addition, FIG. 9 which illustrates a cross-sectional view in a direction of X-Y direction in FIG. 3 described below is also, similarly, a cross-sectional view illustrating a preferred constitution of the electrostatic capacitance-type input device of the present invention. FIG. 9 illustrates an aspect in which the electrostatic capacitance-type input device 10 is composed of the base material 1, the transparent film 11 having a refractive index of 1.46 to 1.58, the first transparent electrode pattern 3 (what is illustrated is a pad portion 3*a* of the first transparent electrode pattern), the second transparent electrode pattern 4, the optical adjustment member 12, and the transparent protective layer 7.

For the base material 1, the material exemplified as the material of the transparent electrode pattern in the transparent electrode-attached complex of the present invention can be used. In addition, in FIG. 1, the side of the base material 1 on which the respective elements are provided is referred to as the noncontact surface side. In the electrostatic capacitance-type input device 10 of the present invention, input is carried out by bringing a finger or the like into contact with the contact surface (the surface opposite to the noncontact surface) of the base material 1.

In addition, on the noncontact surface side of the base material 1, the mask layer 2 is provided. The mask layer 2 is a trim-shaped pattern around a display region formed on the noncontact surface side of a touch panel base material and is formed in order to prevent the guidance wire and the like from being visible.

Figure 2:
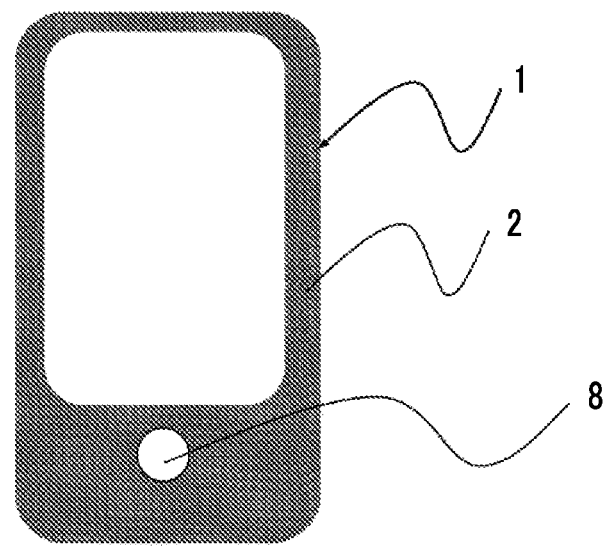
FIG. 2 is an explanatory view illustrating an example of a base material in the present invention.

In the electrostatic capacitance-type input device 10 of the present invention, the mask layer 2 is provided so as to cover a part of the region (a region other than the input surface in FIG. 2) of the base material 1 as illustrated in FIG. 2. Furthermore, an opening portion 8 can be provided in a part of the base material 1 as illustrated in FIG. 2. In the opening portion 8, a press-type mechanical switch can be installed.

In FIG. 1, on the noncontact surface of the base material 1, a plurality of first transparent electrode patterns 3 in which a plurality of the pad portions are formed so as to extend in the first direction through the connection portions, a plurality of second transparent electrode patterns 4 which are electrically insulated from the first transparent electrode pattern 3 and are made of a plurality of pad portions formed so as to extend in a direction orthogonal to the first direction, and the insulating layer 5 that electrically insulates the first transparent electrode pattern 3 (what is illustrated in FIG. 1 is a connection portion 3b of the first transparent electrode pattern) and the second transparent electrode pattern 4 is formed. For the first transparent electrode pattern 3, the second transparent electrode pattern 4, and the additional conductive element 6, the materials exemplified as the material of the transparent electrode pattern in the transparent electrode-attached complex of the present invention can be used, and ITO films are preferred.

In addition, at least one of the first transparent electrode pattern 3 or the second transparent electrode pattern 4 can be installed so as to astride both regions of the noncontact surface of the base material 1 and the surface of the mask layer 2 opposite to the base material 1. FIG. 1 illustrates a view in which the second transparent electrode pattern 4 is installed so as to astride both regions of the noncontact surface of the base material 1 and the surface of the mask layer 2 opposite to the base material 1.

As described above, even in a case in which a photosensitive film is laminated so as to astride the mask layer which requires a certain thickness and the noncontact surface (the rear surface of the contact surface) of the base material, in a case in which a photosensitive film having a specific layer constitution described below is used, lamination causing no generation of foam in the boundary with the mask portion becomes possible with a simple step without using an expensive facility such as a vacuum laminator.

The first transparent electrode pattern 3 and the second transparent electrode pattern 4 will be described using FIG. 3. FIG. 3 is an explanatory view illustrating an example of the first transparent electrode pattern and the second transparent electrode pattern in the present invention. As illustrated in FIG. 3, in the first transparent electrode pattern 3, the pad portions 3a are formed so as to extend in the first direction C through the connection portion 3b. In addition, the second transparent electrode pattern 4 is electrically insulated from the first transparent electrode pattern 3 using the insulating layer 5 and is composed of a plurality of the pad portions formed so as to extend in a direction orthogonal to the first direction C (a second direction D in FIG. 3). Here, in a case in which the first transparent electrode pattern 3 is formed, the pad portions 3a and the connection portions 3b may be integrally produced or it is also possible to produce the connection portions 3b alone and integrally produce (pattern) the pad portions 3a and the second transparent electrode pattern 4. In a case in which the pad portions 3a and the second transparent electrode pattern 4 are integrally produced (patterned), the respective layers are formed so that some of the connection portions 3b and some of the pad portions 3a are coupled together as illustrated in FIG. 3 and the first transparent electrode pattern 3 and the second transparent electrode pattern 4 are electrically insulated from each other using the insulating layer 5.

Figure 3:
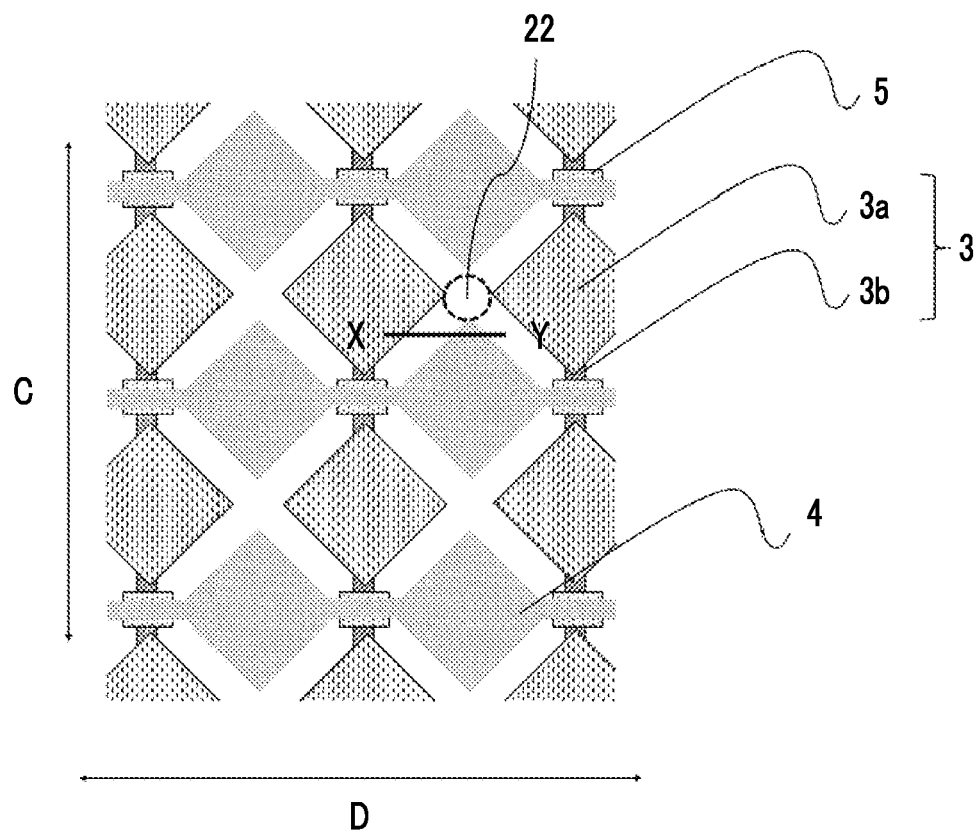
FIG. 3 is an explanatory view illustrating an example of a relationship between a transparent electrode pattern and non-patterned regions in the present invention.

In addition, in FIG. 3, a region in which the first transparent electrode pattern 3, the second transparent electrode pattern 4, or the additional conductive element 6 is not formed corresponds to the non-patterned region 22 in the transparent electrode-attached complex of the present invention.

In FIG. 1, the additional conductive element 6 is installed on the surface side of the mask layer 2 opposite to the base material 1. The additional conductive element 6 is electrically connected to at least one of the first transparent electrode pattern 3 (what is illustrated in FIG. 1 is a connection portion 3b of the first transparent electrode pattern) or the second transparent electrode pattern 4 and is a separate element from the first transparent electrode pattern 3 and the second transparent electrode pattern 4.

FIG. 1 illustrates an aspect in which the additional conductive element 6 is connected to the second transparent electrode pattern 4.

In addition, in FIG. 1, the transparent protective layer 7 is installed so as to cover all of the respective constituent elements. The transparent protective layer 7 may be composed so as to cover only part of the respective constituent elements. The insulating layer 5 and the transparent protective layer 7 may be made of the same material or different materials. As the material constituting the insulating layer 5, it is possible to preferably use the material exemplified as the material of the transparent protective layer or the optical adjustment member in the transparent electrode-attached complex of the present invention.

<Method for Manufacturing Electrostatic Capacitance-Type Input Device>

Figure 4:
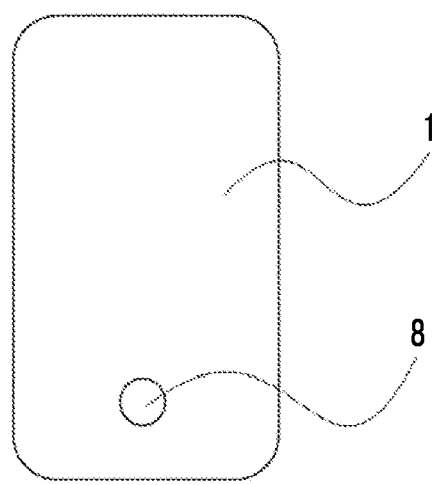
FIG. 4 is a top view illustrating an example of the base material in which an opening portion is formed.
Figure 5:
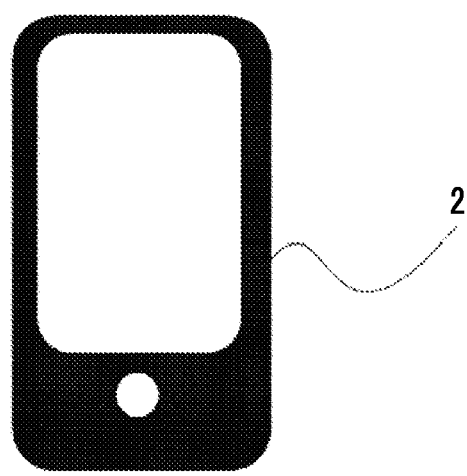
FIG. 5 is a top view illustrating an example of the base material on which a mask layer is formed.
Figure 6:
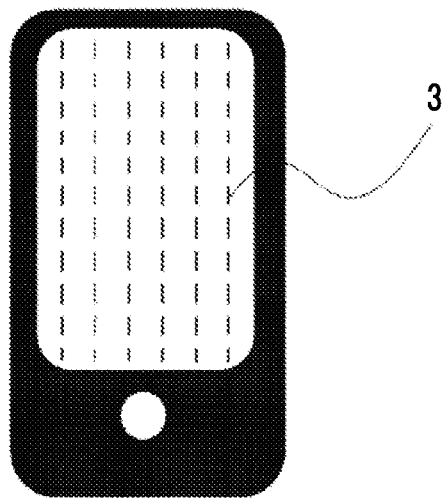
FIG. 6 is a top view illustrating an example of the base material on which a first transparent electrode pattern is formed.
Figure 7:
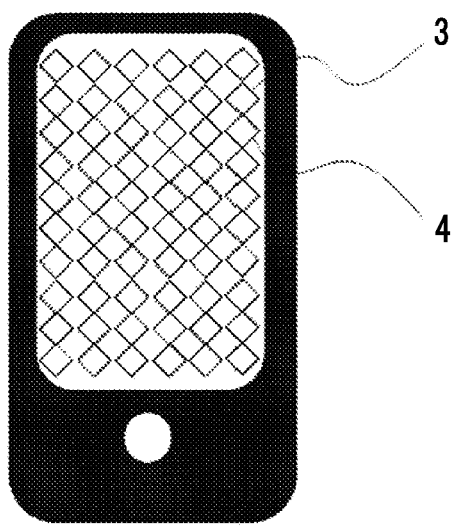
FIG. 7 is a top view illustrating an example of the base material on which the first transparent electrode pattern and a second transparent electrode pattern are formed.
Figure 8:
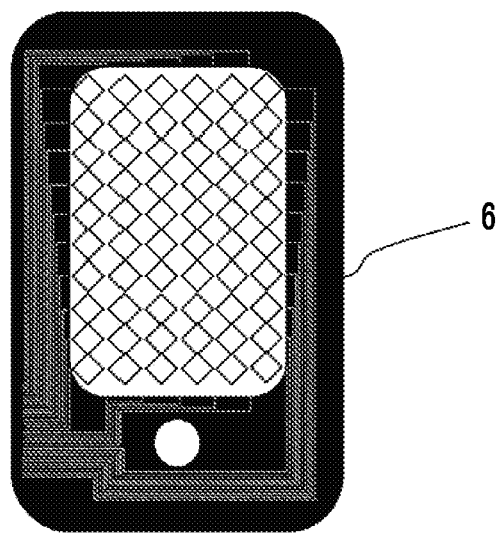
FIG. 8 is a top view illustrating an example of the base material on which a conductive element different from the first and second transparent electrode patterns is formed.

Examples of an aspect being formed in a process for manufacturing the electrostatic capacitance-type input device of the present invention include aspects of FIGS. 4 to 8. FIG. 4 is a top view illustrating an example of the base material 1 in which the opening portion 8 is formed. FIG. 5 is a top view illustrating an example of the base material in which the mask layer 2 is formed. FIG. 6 is a top view illustrating an example of the base material in which the first transparent electrode pattern 3 is formed. FIG. 7 is a top view illustrating an example of the base material in which the first transparent electrode pattern 3 and the second transparent electrode pattern 4 are formed. FIG. 8 is a top view illustrating an example of the base material in which the additional conductive element 6 other than the first transparent electrode pattern and the second transparent electrode pattern is formed. These aspects illustrate examples in which the following description is specified, and the scope of the present invention is not interpreted to be limited by these drawings.

In the method for manufacturing the electrostatic capacitance-type input device, in a case in which the optical adjustment member 12 and the transparent protective layer 7 are formed, the layers can be formed by transferring the optical adjustment member and the transparent protective layer onto the surface of the base material 1 on which the respective elements are arbitrarily formed using the transfer film of the present invention.

In the method for manufacturing the electrostatic capacitance-type input device, at least one element of the mask layer 2, the first transparent electrode pattern 3, the second transparent electrode pattern 4, the insulating layer 5, or the additional conductive element 6 is preferably formed using the photosensitive film having the temporary support and the photocurable resin layer in this order.

In a case in which the respective elements (at least one element of the mask layer 2, the first transparent electrode pattern 3, the second transparent electrode pattern 4, the insulating layer 5, or the additional conductive element 6) are formed using the transfer film of the present invention or the photosensitive film, even in the base material having the opening portion, resist components do not leak and/or protrude through the opening portion, and, particularly, in the mask layer in which a light-blocking pattern needs to be formed up to immediately above the boundary line of the edge portion of the base material, resist components do not leak and/or protrude from the edge portion of the base material. Therefore, the noncontact surface side of the base material is not contaminated, and it is possible to manufacture touch panels having a reduced thickness and a reduced weight with simple steps.

In a case in which the mask layer, the insulating layer, and the conductive photocurable resin layer are used, in a case in which the permanent materials of the first transparent electrode pattern, the second transparent electrode pattern, the conductive element, and the like are formed using the photosensitive film, the photosensitive film may be laminated on the base material and then exposed in a pattern shape as necessary. The photosensitive film may be a negative-type material or a positive-type material. Patterns can be obtained by removing the non-exposed portions in a case in which the photosensitive film is a negative-type material or the exposed portions in a case in which the photosensitive film is a positive-type material by means of a development treatment. In the development, the thermoplastic resin layer and the photocurable resin layer may be developed and removed using separate fluids or may be removed using the same fluid. Well-known development facilities such as a brush and a high-pressure jet may be combined together as necessary. After the development, post exposure and post baking may be carried out as necessary.

(Photosensitive Film)

The photosensitive film other than the transfer film of the present invention which is preferably used to manufacture the electrostatic capacitance-type input device of the present invention will be described. The photosensitive film has a temporary base material and a photocurable resin layer and preferably has a thermoplastic resin layer between the temporary base material and the photocurable resin layer. In a case in which the mask layer and the like are formed using the photosensitive film having the thermoplastic resin layer, air bubbles are not easily generated in elements formed by transferring the photocurable resin layer, image unevenness or the like is not easily caused in image display devices, and excellent display characteristics can be obtained.

The photosensitive film may be a negative-type material or a positive-type material.

—Layers Other than Photocurable Resin Layer and Production Method—

As the temporary base material and the thermoplastic resin layer in the photosensitive film, it is possible to use the same temporary base material and thermoplastic resin layer as those respectively used as the same temporary support and thermoplastic resin layer as those used in the transfer film of the present invention. In addition, as the method for producing the photosensitive film, it is possible to use the same method as the method for producing the transfer film of the present invention.

—Photocurable Resin Layer—

In the photosensitive film, additives are added to the photocurable resin layer depending on the applications of the photosensitive film. That is, in a case in which the photosensitive film is used to form the mask layer, a colorant is added to the photocurable resin layer. In addition, in a case in which the photosensitive film has a conductive photocurable resin layer, a conductive fiber and the like are added to the photocurable resin layer.

The photocurable resin layer in the photosensitive film may be a negative-type material or a positive-type material.

In a case in which the photocurable resin layer in the photosensitive film is a negative-type material, the photocurable resin layer preferably includes an alkali-soluble resin, a polymerizable compound, and a polymerization initiator. Furthermore, conductive fibers, colorants, other additives, and the like are used, but the components are not limited thereto.

Regarding the material of the photocurable resin layer, the formation of the mask layer and the insulating layer using the photosensitive film, and the formation of the first and second transparent electrode patterns, and the additional conductive element using the photosensitive film, it is possible to use the description of "0226" to "0255" of JP2014-178922A, the content of which is incorporated herein by reference.

<Image Display Device>

To the electrostatic capacitance-type input device of the present invention and image display devices comprising this electrostatic capacitance-type input device as a constituent element, it is possible to apply the constitution disclosed by "Advanced touch panel technology" (published by Techno Times Co., Ltd. on Jul. 6, 2009), "Technology and development of touch panels" edited by Yuji Mitani, CMC Publishing Co., Ltd. (December 2004), FPD International 2009 Forum T-11 lecture textbook, Cypress Semiconductor Corporation application note AN2292, and the like.

EXAMPLES

Hereinafter, the present invention will be more specifically described using examples. Materials, amounts used, ratios, processing contents, processing orders, and the like described in the following examples can be appropriately modified within the scope of the gist of the present invention. Therefore, the scope of the present invention is not limited to specific examples described below. Meanwhile, unless particularly otherwise described, "parts" are mass-based.

Examples 1, 2, 4, and 5 and Comparative Examples 3 to 5

<Production of Transfer Films>

(Preparation of Materials for Transparent Protective Layer and Optical Adjustment Member)

A material A1 which was a coating fluid for a transparent protective layer was prepared as shown in the following table.

TABLE 1

| Materials | | Material A |
|---|---|---|
| Photopolymerizable compound | Tricyclodecrine dimethanol diacrylate (A-DCP: manufactured by Shin-Nakamura Chemical Co., Ltd.) | 5.63 |
| | Carboxylic acid-containing monomer ARONIX TO-2349 (manufactured by Toagosei Co., Ltd.) | 0.93 |
| | Urethane acrylate 8UX-015A (manufactured by Taisei Fine Chemical Co., Ltd.) | 2.81 |
| Binder polymer | The following compound A | 15.63 |
| Photopolymerization initiator | Ethanone,1-[9-ethyl-6-(2-methylbenzoyl)-9H-carbazole-3-yl]-,1-(0-acetyloxime) (OXE-02, manufactured by BASF) | 0.11 |
| | 2-Methyl-1(4-methylthiophenyl)-2-morpholinopropane-1-one (Irgacure907, manufactured by BASF) | 0.21 |
| Additive | DURANATE TPA-B80E (manufactured by Asahi Kasei Corporation) | 3.63 |
| | MEGAFACE F551 (manufactured by DIC Corporation) | 0.02 |
| Solvent | 1-Methoxy-2-propylacetate | 31.03 |
| | Methyl ethyl ketone | 40.00 |
| | Total (parts by mass) | 100 |

Compound A

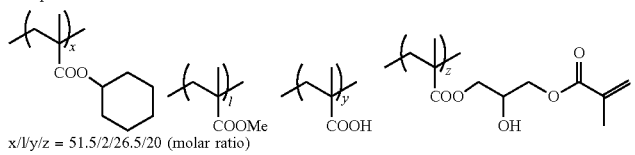

x/l/y/z = 51.5/2/26.5/20 (molar ratio)

Next, as shown in the following table, materials B1 to B5 were prepared.

TABLE 2

| | Materials | | | | |
|---|---|---|---|---|---|
| | Material B1 | Material B2 | Material B3 | Material B4 | Material B5 |
| NANOUSE OZ-S30M: $ZrO_2$ particles, methanol dispersion liquid (nonvolatile component: 30.5%) manufactured by Nissan Chemical Industries, Ltd. | 1.81 | 1.59 | 2.03 | 1.68 | |
| Ammonia water (2.5%) | 2.96 | 2.96 | 2.96 | 2.96 | 2.96 |
| Copolymer resin of methacrylic acid/allyl methacrylate (Mw: 25,000, compositional ratio = 40/60, nonvolatile component: 99.8%) | 0.109 | 0.163 | 0.050 | 0.141 | 0.653 |
| Carboxylic acid-containing monomer ARONIX TO-2349 (manufactured by Toagosei Co., Ltd.) | 0.007 | 0.014 | 0.003 | 0.010 | 0.014 |
| Benzotriazole BT120 (manufactured by Johoku Chemical Co., Ltd.) | 0.007 | 0.014 | 0.003 | 0.010 | 0.014 |
| MEGAFACE F444 (manufactured by DIC Corporation) | 0.005 | 0.005 | 0.005 | 0.005 | 0.005 |
| Ion exchange water | 35.10 | 35.25 | 34.95 | 35.19 | 36.35 |
| Methanol | 60.00 | 60.00 | 60.00 | 60.00 | 60.00 |
| Amount of metal oxide particles (% by mass, with respect to solid content) | 81.2 | 71.2 | 91.1 | 75.5 | |
| Total (parts by mass) | 100 | 100 | 100 | 100 | 100 |

Next, as shown in the following table, materials C1 to C3 were prepared.

TABLE 3

| | Materials | | |
|---|---|---|---|
| | Material C1 | Material C2 | Material C3 |
| NANOUSE OZ-S30M: $ZrO_2$ particles, methanol dispersion liquid (nonvolatile component: 30.5%) manufactured by Nissan Chemical Industries, Ltd. | | | 1.81 |
| Colloidal silica SNOWTEX ST-N (nonvolatile component: 20%, manufactured by Nissan Chemical Industries, Ltd.) | | 2.56 | |
| Ammonia water (2.5%) | 2.96 | 2.96 | 2.96 |
| Copolymer resin of methacrylic acid/allyl methacrylate (Mw: 25,000, compositional ratio = 40/60, nonvolatile component: 99.8%) | 0.653 | 0.440 | 0.109 |

TABLE 3-continued

| | Materials | | |
|---|---|---|---|
| | Material C1 | Material C2 | Material C3 |
| Carboxylic acid-containing monomer ARONIX TO-2349 (manufactured by Toagosei Co., Ltd.) | 0.014 | 0.014 | 0.007 |
| Benzotriazole BT120 (manufactured by Johoku Chemical Co., Ltd.) | 0.014 | 0.014 | 0.007 |
| MEGAFACE F444 (manufactured by DIC Corporation) | 0.005 | 0.005 | 0.005 |
| Ion exchange water | 36.35 | 34.01 | 35.10 |
| Methanol | 60.00 | 60.00 | 60.00 |
| Amount of metal oxide particles (% by mass, with respect to solid content) | | | 81.2 |
| Total (parts by mass) | 100 | 100 | 100 |

(Production of Transfer Films)

The material A1 for a transparent protective layer was applied onto a temporary support which was a polyethylene terephthalate film using slit-shaped nozzles at an adjusted application amount so that the thickness of the dried film reached the value in Table 6, thereby forming a transparent protective layer.

After the solvent was volatilized in a drying zone (120° C.), among the material B1, the material B2, the material B3, or the material B5, the material shown in Table 6 was applied using slit-shaped nozzles at an adjusted application amount so that the thickness of the dried film reached the value in Table 6, thereby forming a layer disposed second closest to the transparent electrode side in an optical adjustment member.

After the solvent was volatilized in the drying zone (120° C.), among the material C1, the material C2, or the material C3, the material shown in Table 6 was applied using slit-shaped nozzles at an adjusted application amount so that the thickness of the dried film reached the value in Table 6, thereby forming a layer disposed closest to the transparent electrode side in the optical adjustment member.

The obtained transfer films were dried in the drying zone (120° C.), thereby forming transfer films of Examples 1 to 5 and Comparative Examples 2 to 5.

(Measurement of Refractive Indexes and Thicknesses of Individual Layers)

As the method for measuring refractive indexes and thicknesses, there are a method in which refractive indexes and thicknesses are computed by means of fitting to theoretical values from spectral reflectivity spectra, a method in which refractive indexes and thicknesses are obtained by means of ellipsometry, and the like. In the respective examples and the respective comparative examples, the refractive indexes and thicknesses of the respective layers were computed from spectral reflectivity spectra. As a measurement instrument, a thickness monitor FE-3000 (manufactured by Otsuka Electronics Co., Ltd.) was used.

(1) A laminate was produced by adhering PT100 NB (manufactured by Lintec Corporation) which was a black polyethylene terephthalate (PET) material to one surface of the temporary support that was used in each of the examples and the comparative examples through transparent adhesive tape (trade name: OCA tape 8171CL: manufactured by The 3M Company). The reflection spectrum (wavelength: 430 to 800 nm) of the laminate of the temporary support and the black PET was measured using the thickness monitor FE-3000, and the refractive indexes of the temporary support at the respective wavelengths were obtained by means of computation.

(2) A laminate was produced by bringing a black PET material into contact with the temporary support surface of a sample obtained by forming the transparent protective layer alone on the temporary support in the same manner as in the respective examples and the respective comparative examples through transparent adhesive tape (OCA tape 8171CL: manufactured by The 3M Company). The reflection spectrum (wavelength: 430 to 800 nm) of the laminate of the temporary support and the black PET was measured using the thickness monitor FE-3000, and the refractive indexes of the transparent protective layer at the respective wavelengths and the thickness of the transparent protective layer were obtained by means of fitting computation for which the fast Fourier transform (FFT) method and the least-square method were used. At this time, as the initial value of the thickness that was used in the computation, the thickness of the transparent protective layer measured using a transmission electron microscope (TEM: HT7700, manufactured by Hitachi High-Tech Fielding Corporation) was used.

(3) Similarly, the reflection spectra of laminates obtained by respectively adhering a black PET material to samples of a laminate of the temporary support, the transparent protective layer, and the layer disposed second closest to the transparent electrode side and a laminate of the temporary support, the transparent protective layer, the layer disposed second closest to the transparent electrode side, and the layer disposed closest to the transparent electrode side were measured, and the refractive indexes and thicknesses of the respective layers were computed.

<Production of Transparent Electrode-Attached Complex>

(Formation of Transparent Film)

A material D shown in Table 4 was applied onto a 50 μm-thick polyethylene terephthalate film, which was used as a base material, using slit-shaped nozzles, dried at approximately 110° C., and then irradiated with ultraviolet rays (at an integral of light of 300 mJ/cm²), thereby forming a 2 μm-thick transparent film having a refractive index of 1.51.

TABLE 4

| Materials | Material-D |
|---|---|
| DPHA liquid (dipentaerythritol hexaaerylate: 38%, dipentaerythritol penlaacrylate: 38%, 1-methoxy-2-propylacetate: 24%) | 0.44 |
| Urethane-based monomer: NK OLIGO UA-32P manufactured by Shin-Nakamura Chemical Co., Ltd.: nonvolatile component: 75%, 1-methoxy-2-propylacetate: 25% | 0.21 |
| Monomer mixture (polymerizable compound (b2-1) described in Paragraph "0111" of JP2012-78528A, n = 1: content ratio of tripentaerythritol octaacrylate of 85%, the sum of n = 2 and n = 3 as impurities is 15%) | 0.54 |
| Polymer solution 1 (Structural Formula P-25 described in Paragraph "0058" of JP2008-146018A: weight-average molecular weight = 35,000, solid content 45%, 15% of 1-methoxy-2-propyl acetate, 40% of 1-methoxy-2-propanol) | 2.84 |
| Photoradical polymerization initiator: 2-benzyl-2-dimethylamino-1-(4-morpholinophenyl)-butanone (Irgacure 379, inamlfactured by BASF) | 0.05 |
| Photopolymerization initiator: KAYACURE DETX-S (alkyl thioxanthone manufactured by Nippon Kayabal Co., Ltd) | 0.05 |
| Polymer solution 2 (compound represented by Structural Formula (2): weight-average molecutat weight-15,000, nonvolatile component = 30 wt %, methyl ethyl ketone = 70 wt %) | 0.02 |
| 1-Methoxy-2-propyl acetate | 38.73 |
| Methyl ethyl ketone | 57.15 |
| Total (parts by mass) | 100 |

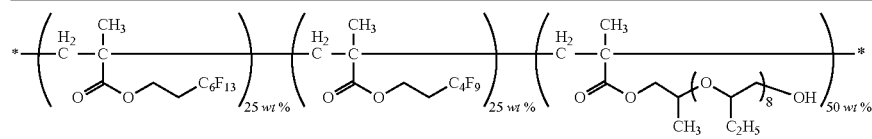

(Formation of Transparent Electrode Pattern)
—Formation of Transparent Electrode Layer—

The film base material on which the transparent film had been laminated was introduced into a vacuum chamber, and a 25 nm-thick ITO thin film having a refractive index of 1.9 was formed using an ITO target (indium:tin=95:5 (molar ratio)) in which the content ratio of $SnO_2$ was 10% by mass by means of direct current (DC) magnetron sputtering (conditions: the temperature of the base material was 150° C., the argon pressure was 0.13 Pa, and the oxygen pressure was 0.01 Pa), thereby obtaining a film having the transparent film and the transparent electrode layer on the base material. The surface electrical resistance of the ITO thin film was 80Ω/☐ (Ω per square).

—Preparation of Photosensitive Film for Etching E1—

A coating fluid for a thermoplastic resin layer made of Formulation H1 was applied and dried on a 75 μm-thick polyethylene terephthalate film temporary base material using slit-shaped nozzles. Next, a coating fluid for an interlayer made of Formulation P1 was applied and dried. Furthermore, a coating fluid for a photocurable resin layer for etching made of Formulation E1 was applied and dried. A laminate having a thermoplastic resin layer having a dried thickness of 15.1 μm, an interlayer having a dried thickness of 1.6 μm, and a photocurable resin layer for etching having a thickness of 2.0 μm on the temporary base material was obtained in the above-described manner, and, finally, a protective film (12 μm-thick polypropylene film) was pressed thereto. Therefore, a photosensitive film for etching E1 in which the temporary base material, the thermoplastic resin layer, the interlayer, and the photocurable resin layer for etching were integrated together was produced.

-- Coating fluid for photocurable resin layer for etching: Formulation E1 --

| | |
|---|---|
| Methyl methacrylate/styrene/methacrylic acid copolymer (copolymer composition (% by mass): 31/40/29, weight-average molecular weight of 60,000, acid value: 163 mgKOH/g) | 16 parts by mass |
| Monomer 1 (trade name: BPE-500, manufactured by Shin-Nakamura Chemical Co., Ltd.) | 5.6 parts by mass |
| Adduct of hexamethylene diisocyanate and 0.5 mol of tetraethylene oxide monomethacrylate | 7.0 parts by mass |
| Cyclohexane dimethanol monoacrylate as a compound having one polymerizable group in the molecule | 2.8 parts by mass |
| 2-Chloro-N-butylacridone | 0.42 parts by mass |
| 2,2-Bis(orthochlorophenyl)-4,4',5,5'-tetraphenyl biimidazole | 2.17 parts by mass |
| Malachite green oxalate | 0.02 parts by mass |
| Leuco crystal violet | 0.26 parts by mass |
| Phenothiazine | 0.013 parts by mass |
| Surfactant (trade name: MEGAFACE F780F, manufactured by DIC Corporation) | 0.03 parts by mass |
| Methyl ethyl ketone | 40 parts by mass |
| 1-Methoxy-2-propanol | 20 parts by mass |

Meanwhile, the viscosity of the coating fluid for a photocurable resin layer for etching E1 after the removal of the solvent at 100° C. was 2,500 Pa·sec.

-- Coating fluid for thermoplastic resin layer: Formulation H1 --

| | |
|---|---|
| Methanol | 11.1 parts by mass |
| Propylene glycol monomethyl ether acetate | 6.36 parts by mass |
| Methyl ethyl ketone | 52.4 parts by mass |
| Methyl methacrylate/2-ethylhexyl acrylate/benzyl methacrylate/methacrylic acid copolymer (copolymerization compositional ratio (molar ratio) = 55/11.7/4.5/28.8, weight-average molecular weight = 100,000, Tg≈70° C.) | 5.83 parts by mass |
| Styrene/acrylic acid copolymer (copolymerization compositional ratio (molar ratio) = 63/37, weight-average molecular weight = 10,000, Tg≈100° C.) | 13.6 parts by mass |
| Monomer 1 (trade name: BPE-500, manufactured by Shin-Nakamura Chemical Co., Ltd.) | 9.1 parts by mass |
| Fluorine-based polymer | 0.54 parts by mass |

The fluorine-based polymer was a copolymer of 40 parts of $C_6F_{13}CH_2CH_2OCOCH=CH_2$, 55 parts of $H(OCH(CH_3)CH_2)_7OCOCH=CH_2$, and 5 parts of $H(OCH_2CH_2)_7OCOCH=CH_2$ and a solution of 30% by mass of methyl ethyl ketone having a weight-average molecular weight of 30,000 (trade name: MEGAFACE F780F, manufactured by DIC Corporation).

| -- Coating fluid for interlayer: Formulation P1 -- | |
| --- | --- |
| Polyvinyl alcohol (trade name: PVA205, manufactured by Kuraray Co., Ltd., degree of saponification = 88%, degree of polymerization 550) | 32.2 parts by mass |
| Polyvinyl pyrrolidone (trade name: K-30, manufactured by ISB Corporation) | 14.9 parts by mass |
| Distilled water | 524 parts by mass |
| Methanol | 429 parts by mass |

—Patterning of Transparent Electrode Layer—

The film having the transparent film and the transparent electrode layer formed on the base material was washed, and the photosensitive film for etching E1 from which the protective film had been removed was laminated so that the surface of the transparent electrode layer and the surface of the photocurable resin layer for etching faced each other (the temperature of the base material: 130° C., the rubber roller temperature: 120° C., the linear pressure: 100 N/cm, and the transportation rate: 2.2 m/minute). After the peeling of the temporary base material, the thermoplastic resin layer and the interlayer were transferred to the surface of the transparent electrode layer together with the photocurable resin layer for etching. The distance between an exposure mask (a silica exposure mask having a transparent electrode pattern) and the photocurable resin layer for etching was set to 200 μm, and the photocurable resin layer for etching was pattern-exposed at an exposure amount of 50 mJ/cm² (i rays) through the thermoplastic resin layer and the interlayer.

Next, a development treatment was carried out at 25° C. for 100 seconds using a triethanolamine-based developer (containing 30% by mass of triethanolamine, a liquid obtained by diluting T-PD2 (trade name, manufactured by Fujifilm Corporation) with pure water ten times), the thermoplastic resin layer and the interlayer were dissolved, and a washing treatment was carried out at 33° C. for 20 seconds using a surfactant-containing washing liquid (a liquid obtained by diluting T-SD3 (trade name, manufactured by Fujifilm Corporation) with pure water ten times). Pure water was sprayed from ultrahigh-pressure washing nozzles, residues on the thermoplastic resin layer were removed using a rotary brush, and furthermore, a post-baking treatment was carried out at 130° C. for 30 minutes, thereby obtaining a film having the transparent film, the transparent electrode layer, and a photocurable resin layer pattern for etching formed on the base material.

The film having the transparent film, the transparent electrode layer, and the photocurable resin layer pattern for etching formed on the base material was immersed in an etching tank filled with ITO etchants (hydrochloric acid and an aqueous solution of potassium chloride, liquid temperatures: 30° C.) and treated for 100 seconds (etching treatment), and the transparent electrode layer in exposed regions which were not covered with the photocurable resin layer for etching was dissolved and removed, thereby obtaining a transparent electrode-patterned film including the photocurable resin layer pattern for etching.

Next, the transparent electrode-patterned film including the photocurable resin layer pattern for etching was immersed in a resist peeling tank filled with a resist peeling fluid (N-methyl-2-pyrrolidone, monoethanolamine, the liquid temperature of a surfactant (trade name: SURFYNOL 465, manufactured by Air Products and Chemicals, Inc.): 45° C.) and treated for 200 seconds (peeling treatment), and the photocurable resin layer for etching was removed, thereby obtaining a film including the transparent film and the transparent electrode pattern formed on the base material.

(Lamination of Optical Adjustment Member and Transparent Protective Layer)

The optical adjustment member, the transparent protective layer, and the temporary support were transferred in this order to the transparent electrode-patterned film from the transfer film of each of the examples and the comparative examples using the transfer film of each of the examples and the comparative examples from which the protective film had been peeled off so that the optical adjustment member covered the transparent film and the transparent electrode pattern in the transparent electrode-patterned film in which the transparent film and the transparent electrode pattern were formed on the base material, thereby obtaining a laminate (the temperature of the base material: 40° C., the rubber roller temperature: 110° C., the linear pressure: 3 N/cm, and the transportation rate: 2 m/minute).

After that, the obtained laminate was pattern-exposed using a proximity-type stepper having an ultrahigh-pressure mercury lamp (manufactured by Hitachi High-Tech Fielding Corporation) at a distance between an exposure mask (a silica exposure mask having a pattern for forming an overcoat layer) and the temporary support set to 125 μm and an exposure amount of 100 mJ/cm² (i rays) through the temporary support. After the peeling of the temporary support, a washing treatment was carried out on the pattern-exposed laminate (film base material) using an aqueous solution of 2% by mass of sodium carbonate at 32° C. for 60 seconds. Ultrapure water was sprayed to the washed base material from ultrahigh-pressure washing nozzles, thereby removing residues. Subsequently, moisture on the base material was removed by blowing the air, and a post-basking treatment was carried out at 145° C. for 30 minutes, thereby obtaining a transparent electrode-attached complex of each of Examples 1, 2, 4, and 5 and Comparative Examples 3 to 5. The transparent electrode-attached complexes of Examples 1, 2, 4, and 5 and Comparative Examples 3 to 5 were transparent electrode-attached complexes having the base material, the transparent film, the transparent electrode pattern, the optical adjustment member made up of the low-refractive index layer disposed closest to the transparent electrode pattern side and the high-refractive index layer disposed second closest to the transparent electrode pattern side, and the transparent protective layer.

(Measurement of Refractive Indexes and Thicknesses of Individual Layers after Production of Transparent Electrode-Attached Complex)

The reflection spectrum of the laminate obtained by sequentially laminating the layers one by one on the base material and attaching a black PET to the rear surface was measured using the thickness monitor FE-3000, and the refractive indexes and thicknesses of the respective layer were computed by means of computation using the same method as in the computation of the refractive indexes and thicknesses of the respective layers in a state of the transfer film.

As a result, the refractive indexes and thicknesses of the respective layers were the same as the values computed for the transfer films.

Example 3

A transfer film of Example 3 was produced using the same method as for the transfer film of Example 1 except for the fact that the material was applied at an adjusted application amount so as to obtain a value shown in Table 6.

A transparent electrode-attached complex of Example 3 was produced in the same manner as in the production of the transparent electrode-attached complex of Example 1 except for the fact that the transparent electrode layer was directly formed on a 50 μm-thick polyethylene terephthalate film, which was used as the base material, and the transfer film of Example 3 was used instead of the transfer film of Example 1.

Example 6

The material A1 for a transparent protective layer was applied onto a temporary support which was a polyethylene terephthalate film using slit-shaped nozzles at an adjusted application amount so that the thickness of the dried film reached the value in Table 6, thereby forming a transparent protective layer.

After the solvent was volatilized in a drying zone (120° C.), the material B2 was applied using slit-shaped nozzles at an adjusted application amount so that the thickness of the dried film reached the value in Table 6, thereby forming a layer disposed fourth closest to the transparent electrode side in the optical adjustment member.

After the solvent was volatilized in the drying zone (120° C.), the material C2 was applied using slit-shaped nozzles at an adjusted application amount so that the thickness of the dried film reached the value in Table 6, thereby forming a layer disposed third closest to the transparent electrode side in the optical adjustment member.

After the solvent was volatilized in a drying zone (120° C.), the material B4 was applied using slit-shaped nozzles at an adjusted application amount so that the thickness of the dried film reached the value in Table 6, thereby forming a layer second disposed closest to the transparent electrode side in the optical adjustment member.

After the solvent was volatilized in the drying zone (120° C.), the material C2 was applied using slit-shaped nozzles at an adjusted application amount so that the thickness of the dried film reached the value in Table 6, thereby forming a layer disposed closest to the transparent electrode side in the optical adjustment member.

The obtained transfer films were dried in the drying zone (120° C.), thereby forming a transfer film of Example 6.

For the transfer film of Example 6, in the method for measuring the refractive indexes and thicknesses of the respective layers in the transfer film of Example 1, the reflection spectra of laminates obtained by respectively adhering a black PET material to samples of the temporary support alone, a laminate of the transparent protective layer and the underneath layer, a laminate of the layer fourth closest to the transparent electrode side and the underneath layers, a laminate of the layer third closest to the transparent electrode side and the underneath layers, a laminate of the layer second closest to the transparent electrode side and the underneath layers, and a laminate of the layer closest to the transparent electrode side and the underneath layers were measured, and the refractive indexes and thicknesses of the respective layers were computed.

A transparent electrode-attached complex of Example 6 was produced in the same manner as in the production of the transparent electrode-attached complex of Example 1 except for the fact that the transfer film of Example 6 was used instead of the transfer film of Example 1.

Example 7

The material A1 for a transparent protective layer was applied onto a temporary support which was a polyethylene terephthalate film using slit-shaped nozzles at an adjusted application amount so that the thickness of the dried film reached the value in Table 6, thereby forming a transparent protective layer. The obtained transfer film was dried in a drying zone (120° C.), thereby producing a transfer film for laminating the transparent protective layer.

On the transparent film and the transparent electrode pattern in the film obtained by forming the transparent film and the transparent electrode pattern on the base material produced in the same manner as in Example 1, two layers of a 43 nm-thick $SiO_x$ film (x: 2.0, refractive index: 1.46) which was a layer disposed closest to the transparent electrode pattern side (the low-refractive index layer) and a 21 nm-thick $Y_2O_3$ film (refractive index: 1.80) which was a layer disposed second closest to the transparent electrode pattern side (the high-refractive index layer) were sequentially formed using a vacuum deposition method, thereby producing an optical adjustment member.

Onto the optical adjustment member made up of the formed low-refractive index layer and the formed high-refractive index layer, the transparent protective layer and the temporary support were transferred from the transfer film for laminating the transparent protective layer produced using the material A1 (the temperature of the base material: 40° C., the rubber roller temperature: 110° C., the linear pressure: 3 N/cm, and the transportation rate: 2 m/minute).

After that, the distance between the surface of an exposure mask (a silica exposure mask having a pattern for forming an overcoat layer) and the temporary support was set to 125 μm using a proximity-type stepper having an ultrahigh-pressure mercury lamp (manufactured by Hitachi High-Tech Fielding Corporation), and the transparent protective layer and the temporary support were pattern-exposed at an exposure amount of 100 mJ/cm$^2$ (i rays) through the temporary support. After the peeling of the temporary support, a washing treatment was carried out using an aqueous solution of 2% sodium carbonate at 32° C. for 60 seconds. Ultrapure water was sprayed to the washed base material from ultra-high-pressure washing nozzles, thereby removing residues. Subsequently, moisture on the base material was removed by blowing the air, and a post-basking treatment was carried out at 145° C. for 30 minutes, thereby producing a transparent electrode-attached complex of Example 7.

After the production of the transparent electrode-attached complex, the refractive indexes and thicknesses of the respective layers were measured in the same manner as in Example 1. The obtained results are shown in Table 1.

Example 8

A transparent electrode-attached complex of Example 8 was produced in the same manner as in Example 7 except for the fact that the thickness of the layer disposed closest to the transparent electrode pattern side was changed to the thickness shown in Table 6, and the layer disposed second closest to the transparent electrode pattern side was changed to a 9 nm-thick $ZrO_2$ film (refractive index: 2.10) which was a high-refractive index layer.

Example 9

A transparent film was formed in the same manner as in Example 1 except for the fact that, in Example 9, the material-C shown in Table 5 was used as the material of the transparent film. A transparent electrode-attached complex of Example 9 was produced in the same manner as in Example 1 except for the fact that the transparent film formed in Example 9 was used. The transparent film formed in Example 9 was a transparent film having a refractive index of 1.60 and a thickness of 80 nm.

TABLE 51

| Materials | Material-C |
|---|---|
| $ZrO_2$: ZR-010 manufactured by Solar Co., Ltd. | 2.08 |
| DPHA liquid (dipentaerythritol hexaacrylate: 38%, dipentaerythritol. pentaacrylate: 38%, 1-methoxy-2-propylacetate: 24%) | 0.29 |
| Urethane-based monomer: NK OLIGO UA-32P manufactured by Shin-Nakamura Chemical Co., Ltd.: nonvolatile component: 75%, 1-methoxy-2-propylacetate: 25% | 0.14 |
| Monomer mixture (polymerizable compound (b2-1) described in Paragraph "0111" of JP2012-78528A n = 1: content ratio of tripentaerythritol octaacrylate of 85%, the sum of n = 2 and n = 3 as impurities is 15%) | 0.36 |
| Polymer solution 1 (Structural Formula P-25 described in Paragraph "0058" of JP2008-146018A: weight-average molecular weight = 35,000, solid content 45%, 15% of 1-methoxy-2-propyl acetate, 40% of 1-methoxy 2-propanol | 1.89 |
| Photoradical polymerization initiator: 2-benzyl-2-dimethylamino-1-(4-morpholinophenyl)-butanone (Irgacure 379, manufactured by BASF) | 0.03 |
| Photopolymerization initiator: KAYACURE DETX-S (alkyl thioxatithone manufactured by Nippon Kayaku Co., Ltd.) | 0.03 |
| Polymer solution 2 (compound represented by (Structural Formula (3): weight-average molecular weight = 15,000, nonvolatile component = 30 wt %, methyl ethyl ketone = 70 wt %) | 0.01 |
| 1-Methoxy-2-propyl acetate | 38.73 |
| Methyl ethyl ketone | 56.80 |
| Total (parts by mass) | 100 |

"%" in the table indicates "% by mass". Meanwhile, "wt %" in the specification is the same as "% by mass".

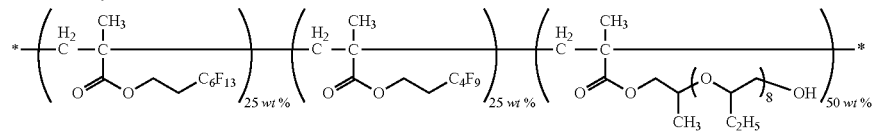

Comparative Example 1

The material A1 for a transparent protective layer was applied onto a temporary support which was a polyethylene terephthalate film using slit-shaped nozzles at an adjusted application amount so that the thickness of the dried film reached the value in Table 6, thereby forming a transparent protective layer.

After the solvent was volatilized in a drying zone (120° C.), the material B1 was applied using slit-shaped nozzles at an adjusted application amount so that the thickness of the dried film reached the value in Table 6, thereby forming a layer disposed closest to the transparent electrode side in an optical adjustment member.

For the transfer film of Comparative Example 1, in the method for measuring the refractive indexes and thicknesses of the respective layers in the transfer film of Example 1, the reflection spectra of laminates obtained by respectively adhering a black PET material to samples of the temporary support alone, a laminate of the transparent protective layer and the underneath layer, and a laminate of the layer disposed closest to the transparent electrode side and the underneath layers were measured, and the refractive indexes and thicknesses of the respective layers were computed.

A transparent electrode-attached complex of Comparative Example 1 was produced in the same manner as in the production of the transparent electrode-attached complex of Example 1 except for the fact that the transfer film of Comparative Example 1 was used instead of the transfer film of Example 1.

Comparative Example 2

The material B1 for a transparent protective layer was applied onto a temporary support which was a polyethylene terephthalate film using slit-shaped nozzles at an adjusted application amount so that the thickness of the dried film reached the value in Table 6, thereby forming a layer disposed second closest to the transparent electrode side in the optical adjustment member.

After the solvent was volatilized in a drying zone (120° C.), the material C1 was applied using slit-shaped nozzles at an adjusted application amount so that the thickness of the dried film reached the value in Table 6, thereby forming a layer disposed closest to the transparent electrode side in the optical adjustment member.

The obtained transfer film was dried in the drying zone (120° C.), thereby producing a transfer film of Comparative Example 2.

A transparent electrode-attached complex of Comparative Example 2 was produced in the same manner as in the production of the transparent electrode-attached complex of Example 1 except for the fact that the transfer film of Comparative Example 2 was used instead of the transfer film of Example 1.

Comparative Example 6

In the formation of the optical adjustment member in Example 7, the thickness of the layer disposed closest to the transparent electrode pattern side was changed to the thickness shown in Table 6, the layer disposed second closest to the transparent electrode pattern side was changed to a 21 nm-thick $Nb_2O_3$ film (refractive index: 2.33) which was a high-refractive index layer, furthermore, a 40 nm-thick $SiO_x$ film (x: 2.0, refractive index: 1.46) which was a layer disposed third closest to the transparent electrode pattern side (a low-refractive index layer), a 29 nm-thick $Nb_2O_3$ film (refractive index: 2.33) disposed fourth closest to the transparent electrode pattern side (a high-refractive index layer), and a 97 nm-thick $SiO_x$ film (x: 2.0, refractive index: 1.46) which was a layer disposed fifth closest to the transparent electrode pattern side (a low-refractive index layer) were sequentially formed to fiver layers using a vacuum deposition method, thereby producing an optical adjustment member. A transparent electrode-attached complex of Comparative Example 6 was produced in the same manner as in the production of the transparent electrode-attached complexes of the examples regarding the other aspects.

Comparative Example 7

A transparent electrode-attached complex of Comparative Example 7 was produced in the same manner as in Example 7 except for the fact that the thickness of the layer disposed closest to the transparent electrode pattern side was changed to the thickness shown in Table 6, and the layer disposed second closest to the transparent electrode pattern side was changed to a 7 nm-thick $Nb_2O_3$ film (refractive index: 2.33) which was a high-refractive index layer.

[Evaluation of Transparent Electrode-Attached Complexes]

<Transparent Electrode Pattern-Masking Properties>

The transparent electrode-attached complex having the transparent film, the transparent electrode pattern, the optical adjustment member, and the transparent protective layer laminated on the base material in this order and a black PET material were adhered to each other through transparent adhesive tape (OCA tape 8171CL: manufactured by The 3M Company) in a lamination order in which the black PET material and the transparent adhesive tape were adjacent to each other and the transparent adhesive tape and the transparent protective layer were adjacent to each other, thereby producing a substrate for evaluation which was entirely light-shielded.

In a dark room, light was incident on the base material surface side of the substrate for evaluation using a fluorescent lamp (light source) and the produced substrate for evaluation, reflected light from the surface of the base material on which light was incident was visually observed at an inclined angle, and the transparent electrode pattern-masking properties were evaluated on the basis of the following evaluation standards. AA, A, B, or C is a practical level, AA, A, or B is preferred, AA or A is more preferred, and AA is particularly preferred. The evaluation results are summarized in Table 6.

<<Evaluation Standards>>

AA: The transparent electrode pattern was not observed visually and in a magnifying glass.

A: The transparent electrode pattern was not observed visually but was slightly observed in a magnifying glass.

B: The transparent electrode pattern was slightly observed, but barely observed.

C: The transparent electrode pattern was observed (not easily identified and practically permissible).

D: The transparent electrode pattern was observed.

E: The transparent electrode pattern was clearly observed (easily identified).

<Unevenness Attributed to Optical Adjustment Member>

In addition, light was incident on the base material side of the substrate for evaluation using the same visible observation method as for the transparent electrode pattern-masking properties, whether or not unevenness attributed to the optical adjustment member other than the transparent electrode pattern could be viewed in reflected light from the surface of the base material on which light was incident was observed, and the unevenness was evaluated using the following evaluation standards. A, B, or C is a practical level, A or B is preferred, and A is more preferred. The evaluation results are summarized in Table 6.

<<Evaluation Standards>>

A: Unevenness attributed to the optical adjustment member was not observed.

B: Unevenness attributed to the optical adjustment member was slightly observed, but barely observed.

C: Unevenness attributed to the optical adjustment member was observed, but was practically permissible.

D: Unevenness attributed to the optical adjustment member was clearly observed (easily identified).

<Reflectivity of Transparent Electrode Pattern>

A transparent electrode-attached complex for measuring reflectivity was formed in the same manner as in the production of the transparent electrode-attached complexes of the respective examples and the respective comparative examples except for the fact that, in the production of the transparent electrode-attached complexes of the respective examples and the respective comparative examples, the transparent electrode was not patterned. A sample was produced using this transparent electrode-attached complex for measuring reflectivity in the same manner as in the evaluation of the transparent electrode pattern-masking properties.

The reflectivity of the sample with respect to a D65 light source was measured using a spectrophotometer V-570 (manufactured by JASCO Corporation).

The results are summarized in Table 6.

<Pencil Hardness>

As an index of scratch resistance, the pencil hardness evaluation described in Japanese Industrial Standards (JIS) K 5400 was carried out. The humidity of the transparent electrode-attached complex of each of the examples and the comparative examples was adjusted at a temperature of 25° C. and a relative humidity of 60% for one hour, and the evaluation of n=7 was carried out at a load of 500 g using the 2H testing pencil regulated by JIS S 6006. A, B, and C are practical levels, A or B is preferred, and A is particularly preferred.

<<Evaluation Standards>>

A: The number of scratches was less than three.

B: The number of scratches was three or more and less than five.

C: The number of scratches was five or more and less than six.

D: The number of scratches was six or more.

The obtained results are shown in Table 6.

TABLE 6

| | Transparent film | | Optical adjustment member | | | | | |
|---|---|---|---|---|---|---|---|---|
| | | | Layer closest to transparent electrode pattern side | | | Layer second closest to transparent electrode pattern side | | |
| | Refractive index | Thickness μm | Material | Refractive index | Thickness nm | Material | Refractive index | Thickness nm |
| Example 1 | 1.51 | 2 | Material C1 | 1.51 | 44 | Material B1 | 1.70 | 32 |
| Example 2 | 1.51 | 2 | Material C2 | 1.48 | 39 | Material B1 | 1.70 | 32 |
| Example 3 | — | — | Material C2 | 1.48 | 33 | Material B1 | 1.70 | 35 |
| Example 4 | 1.51 | 2 | Material C1 | 1.51 | 32 | Material B2 | 1.65 | 52 |
| Example 5 | 1.51 | 2 | Material C1 | 1.51 | 46 | Material B3 | 1.75 | 26 |
| Example 6 | 1.51 | 2 | Material C2 | 1.48 | 37 | Material B4 | 1.67 | 59 |
| Example 7 | 1.51 | 2 | Vapor deposition (SiO$_2$) | 1.46 | 43 | Vapor deposition (Y$_2$O$_3$) | 1.80 | 21 |
| Example 8 | 1.51 | 2 | Vapor deposition (SiO$_2$) | 1.46 | 51 | Vapor deposition (ZrO$_3$) | 2.10 | 9 |
| Example 9 | 1.60 | 0.08 | Material C1 | 1.51 | 44 | Material B1 | 1.70 | 32 |
| Comparative Example 1 | 1.51 | 2 | Material B1 | 1.70 | 32 | | | |
| Comparative Example 2 | 1.51 | 2 | Material C1 | 1.51 | 44 | Material B1 | 1.70 | 32 |
| Comparative Example 3 | 1.51 | 2 | Material C3 | 1.70 | 32 | Material B5 | 1.51 | 44 |
| Comparative Example 4 | 1.51 | 2 | Material C1 | 1.51 | 100 | Material B1 | 1.70 | 100 |
| Comparative Example 5 | 1.51 | 2 | Material C2 | 1.48 | 100 | Material B1 | 1.70 | 50 |
| Comparative Example 6 | 1.51 | 2 | Vapor deposition (SiO$_2$) | 1.46 | 51 | Vapor deposition (Nb$_2$O$_5$) | 2.33 | 21 |
| Comparative Example 7 | 1.51 | 2 | Vapor deposition (SiO$_2$) | 1.46 | 46 | Vapor deposition (Nb$_2$O$_5$) | 2.33 | 7 |

| | Optical adjustment member | | | | | | | |
|---|---|---|---|---|---|---|---|---|
| | Layer third closest to transparent electrode pattern side | | | Layer fourth closest to transparent electrode pattern side | | | Layer fifth closest to transparent electrode pattern side | | |
| | Material | Refractive index | Thickness nm | Material | Refractive index | Thickness nm | Material | Refractive index | Thickness nm |
| Example 1 | | | | | | | | | |
| Example 2 | | | | | | | | | |
| Example 3 | | | | | | | | | |
| Example 4 | | | | | | | | | |
| Example 5 | | | | | | | | | |
| Example 6 | Material C2 | 1.48 | 50 | Material B2 | 1.65 | 22 | | | |
| Example 7 | | | | | | | | | |
| Example 8 | | | | | | | | | |
| Example 9 | | | | | | | | | |
| Comparative Example 1 | | | | | | | | | |
| Comparative Example 2 | | | | | | | | | |
| Comparative Example 3 | | | | | | | | | |
| Comparative Example 4 | | | | | | | | | |
| Comparative Example 5 | | | | | | | | | |
| Comparative Example 6 | Vapor deposition (SiO$_2$) | 1.46 | 40 | Vapor deposition (Nb$_2$O$_5$) | 2.33 | 29 | Vapor deposition (SiO$_2$) | 1.46 | 97 |
| Comparative Example 7 | | | | | | | | | |

TABLE 6-continued

| | Transparent protective layer | | | Transparent electrode pattern-masking properties | Unevenness attributed to optical adjustment member | Reflectivity of transparent electrode pattern | Pencil hardness |
|---|---|---|---|---|---|---|---|
| | Material | Refractive index | Thickness nm | | | | |
| Example 1 | Material A1 | 1.51 | 8 | A | A | 1.3% | A |
| Example 2 | Material A1 | 1.51 | 8 | A | A | 1.3% | A |
| Example 3 | Material A1 | 1.51 | 8 | AA | A | 0.2% | A |
| Example 4 | Material A1 | 1.51 | 8 | A | A | 1.3% | A |
| Example 5 | Material A1 | 1.51 | 8 | A | A | 1.3% | A |
| Example 6 | Material A1 | 1.51 | 8 | A | A | 1.2% | A |
| Example 7 | Material A1 | 1.51 | 8 | A | A | 1.2% | A |
| Example 8 | Material A1 | 1.51 | 8 | A | B | 1.2% | A |
| Example 9 | Material A1 | 1.51 | 8 | A | A | 1.0% | A |
| Comparative Example 1 | Material A1 | 1.51 | 8 | D | A | 5.0% | A |
| Comparative Example 2 | None | — | — | A | A | 1.3% | D |
| Comparative Example 3 | Material A1 | 1.51 | 8 | E | A | 5.0% | A |
| Comparative Example 4 | Material A1 | 1.51 | 8 | E | A | 8.7% | A |
| Comparative Example 5 | Material A1 | 1.51 | 0.2 | E | A | 3.5% | C |
| Comparative Example 6 | Material A1 | 1.51 | 8 | E | A | 11.0% | A |
| Comparative Example 7 | Material A1 | 1.51 | 8 | A | D | 1.2% | A |

From Table 6, it was found that the transparent electrode-attached complex of the present invention has excellent transparent electrode pattern-masking properties, is capable of reducing unevenness attributed to the optical adjustment member, and has an excellent pencil hardness even without using a transparent film having a high refractive index on the base material-side of the transparent electrode pattern. Meanwhile, the fact that the low-refractive index layers, the high-refractive index layers, and the transparent protective layers in the transfer films of Examples 1 to 6 were all in a state of being not cured was confirmed on the basis of the fact that the unsaturated double bond consumption percentage of unsaturated double bond groups was less than 10% using the method described in WO2014/084112A.

Meanwhile, from Comparative Example 1, it was found that, in a case in which the optical adjustment member included only the high-refractive index layer, and the low-refractive index layer was not provided as the layer disposed closest to the transparent electrode pattern side, the transparent electrode pattern-masking properties were poor.

From Comparative Example 2, it was found that, in a case in which the transparent protective layer was not provided, the pencil hardness was poor.

From Comparative Example 3, it was found that, in a case in which, as the optical adjustment member, the refractive index of the layer disposed closest to the transparent electrode pattern side was not lower than the refractive index of the layer disposed second closest to the transparent electrode pattern side by the value determined by the present invention or more, the transparent electrode pattern-masking properties were poor.

From Comparative Example 4, it was found that, in a case in which the thicknesses of the low-refractive index layer and the high-refractive index layer used in the optical adjustment member exceeded the upper limit value determined by the present invention, the transparent electrode pattern-masking properties were poor.

From Comparative Example 5, it was found that, in a case in which the thickness of the low-refractive index layer used as the optical adjustment member exceeded the upper limit value determined by the present invention, the transparent electrode pattern-masking properties were poor. Comparative Example 5 was a transparent electrode-attached complex intended for a replication study of the preferred form of JP2004-50734A. The transparent electrode-attached complex of Comparative Example 5 was also found to be slightly poor in terms of the pencil hardness.

From Comparative Examples 6 and 7, it was found that, in a case in which the refractive indexes of the even-numbered high-refractive index layers from the transparent electrode pattern, as the optical adjustment member, exceeded the upper limit value determined by the present invention and the number of the high-refractive index layers was two or more, the transparent electrode pattern-masking properties were poor, and, in a case in which the number of the high-refractive index layers was one, unevenness attributed to the optical adjustment member was poor.

Furthermore, the content of the metal oxide particles in the low-refractive index layer or the high-refractive index layer in the optical adjustment member of the transparent electrode-attached complex of each of the examples and the comparative examples was measured using the following method and was found out to be the value shown in Table 2 or 3.

A cross section of the transparent electrode-attached complex was cut out, and then the cross section was observed using a transmission electron microscope (TEM). The ratio of the occupation area of the metal oxide particles to the film cross section area of the low-refractive index layer or the high-refractive index layer in the optical adjustment member was measured at three arbitrary places in the layer, and the average value thereof was considered as the volume fraction (VR).

The volume fraction (VR) and the weight fraction (WR) were converted using the following expression, thereby computing the weight fraction (WR) of the metal oxide particles of the low-refractive index layer or the high-refractive index layer in the optical adjustment member.

$$WR=D*VR/(1.1*(1-VR)+D*VR)$$

D: The specific weight of the metal oxide particles

In a case in which the metal oxide particles were titanium oxide, D was 4.0 in the calculation, and, in a case in which the metal oxide particles were zirconium oxide, D was 6.0 in the calculation.

Meanwhile, the content of the metal oxide particles in the low-refractive index layer or the high-refractive index layer in the optical adjustment member of the transparent electrode-attached complex of each of the examples and the comparative examples can also be computed from the composition of the low-refractive index layer or the high-refractive index layer.

Examples 101 to 109

<Production of Image Display Devices (Touch Panels)>

The transparent electrode-attached complex of each of the examples which had been previously manufactured was attached to a liquid crystal display element manufactured using the method described in "0097" to "0119" of JP2009-47936A, thereby producing an image display device which included the transparent electrode-attached complex of each of the examples and was provided with an electrostatic capacitance-type input device as a constituent element using a well-known method.

<Evaluation of Electrostatic Capacitance-Type Input Device and Image Display Device>

It was found that, in the electrostatic capacitance-type input device and the image display device including the transparent electrode-attached complex of each of the examples, the transparent electrode pattern was masked, unevenness attributed to the optical adjustment member other than the transparent electrode pattern was reduced, and the pencil hardness was excellent.

The image display devices in which there were no defects such as air bubbles in the optical adjustment member and the transparent protective layer and the display characteristics were excellent were obtained.

The transparent electrode-attached complex of the present invention has excellent transparent electrode pattern-masking properties, reduces unevenness caused by the optical adjustment member other than the transparent electrode pattern, and has excellent pencil hardness and thus can be preferably used as a material for touch panels (particularly, electrostatic capacitance-type input devices) or a material for image display devices comprising a touch panel (particularly, an electrostatic capacitance-type input device) as a constituent element. The transfer film of the present invention has photolithographic properties, and thus, in a case in which it is necessary to form desired pattern using the transfer film of the present invention, patterns can be formed by means of photolithography having superior productivity to cutting methods.

EXPLANATION OF REFERENCES

1: base material
2: mask layer
3: transparent electrode pattern (first transparent electrode pattern)
3*a*: pad portion
3*b*: connection portion
4: transparent electrode pattern (second transparent electrode pattern)
5: insulating layer
6: additional conductive element
7: transparent protective layer
8: opening portion
10: electrostatic capacitance-type input device
11: transparent film
12: optical adjustment member
12A: low-refractive index layer
12B: high-refractive index layer
13: transparent electrode-attached complex
21: region in which transparent electrode pattern, optical adjustment member, and transparent protective layer are laminated in this order
22: non-patterned region
α: taper angle
26: temporary support
29: protective film
30: transfer film
31: terminal portion of guidance wire
33: cured portion of transparent protective layer and optical adjustment member
34: opening portion corresponding to terminal portion of guidance wire (non-cured portion of transparent protective layer and optical adjustment member)
C: first direction
D: second direction

What is claimed is:

1. A transparent electrode-attached complex comprising in this order:
   a base material;
   a transparent electrode pattern;
   an optical adjustment member; and
   a transparent protective layer,
   wherein the optical adjustment member has at least one layer of low-refractive index layers that are odd-numbered layers from a transparent electrode pattern side and at least one layer of high-refractive index layers that are even-numbered layers from the transparent electrode pattern side,
   a difference in refractive index between the low-refractive index layer and the high-refractive index layer that are directly adjacent to each other is 0.05 or more,
   a refractive index of the high-refractive index layer is 2.10 or lower,
   a thickness of the low-refractive index layer is 5 to 80 nm, and
   a thickness of the high-refractive index layer is 32 to 80 nm.

2. The transparent electrode-attached complex according to claim 1,
   wherein the base material and the transparent electrode pattern are disposed directly or through a transparent film having a refractive index of 1.46 to 1.58.

3. The transparent electrode-attached complex according to claim 1,
wherein the optical adjustment member has one low-refractive index layer and one high-refractive index layer.

4. The transparent electrode-attached complex according to claim 1,
wherein a refractive index of the low-refractive index layer is 1.25 to 1.53.

5. The transparent electrode-attached complex according to claim 1,
wherein the refractive index of the high-refractive index layer is 1.60 to 2.00.

6. The transparent electrode-attached complex according to claim 1,
wherein the high-refractive index layer contains 10% to 95% by mass of metal oxide particles.

7. The transparent electrode-attached complex according to claim 1,
wherein the optical adjustment member and the transparent protective layer are formed by means of transferring.

8. The transparent electrode-attached complex according to claim 1,
wherein the low-refractive index layer and the high-refractive index layer are transparent resin layers.

9. A transfer film comprising in this order:
a temporary support;
a transparent protective layer;
an optical adjustment member; and
a protective film,
wherein the optical adjustment member has at least one layer of low-refractive index layers that are odd-numbered layers from a protective film side and at least one layer of high-refractive index layers that are even-numbered layers from the protective film side,
a difference in refractive index between the low-refractive index layer and the high-refractive index layer that are directly adjacent to each other is 0.05 or more,
a refractive index of the high-refractive index layer is 2.10 or lower,
a thickness of the low-refractive index layer is 5 to 80 nm, and
a thickness of the high-refractive index layer is 32 to 80 nm.

10. The transfer film according to claim 9,
wherein the low-refractive index layer and the high-refractive index layer are curable transparent resin layers including a polymerizable compound, and the curable transparent resin layers are in a state of being not cured.

11. A method for manufacturing a transparent electrode-attached complex, the method comprising:
laminating an optical adjustment member and a transparent protective layer in this order on a transparent electrode pattern disposed on a base material,
wherein the optical adjustment member has at least one layer of low-refractive index layers that are odd-numbered layers from a transparent electrode pattern side and at least one layer of high-refractive index layers that are even-numbered layers from the transparent electrode pattern side,
a difference in refractive index between the low-refractive index layer and the high-refractive index layer that are directly adjacent to each other is 0.05 or more,
a refractive index of the high-refractive index layer is 2.10 or lower,
a thickness of the low-refractive index layer is 5 to 80 nm, and
a thickness of the high-refractive index layer is 32 to 80 nm.

12. The method for manufacturing a transparent electrode-attached complex according to claim 11,
wherein the base material and the transparent electrode pattern are disposed directly or through a transparent film having a refractive index of 1.46 to 1.58.

13. The method for manufacturing a transparent electrode-attached complex according to claim 11,
wherein the laminating is transferring the optical adjustment member and the transparent protective layer from a transfer film onto the transparent electrode pattern disposed on the base material,
the transfer film comprises a temporary support, a transparent protective layer, an optical adjustment member, and a protective film in this order, in which the optical adjustment member has at least one layer of low-refractive index layers that are odd-numbered layers from a protective film side and at least one layer of high-refractive index layers that are even-numbered layers from the protective film side; a difference in refractive index between the low-refractive index layer and the high-refractive index layer that are directly adjacent to each other is 0.05 or more; a refractive index of the high-refractive index layer is 2.10 or lower; a thickness of the low-refractive index layer is 5 to 80 nm; and a thickness of the high-refractive index layer is 32 to 80 nm.

14. The method for manufacturing a transparent electrode-attached complex according to claim 11,
wherein the low-refractive index layer and the high-refractive index layer are curable transparent resin layers including a polymerizable compound, and the curable transparent resin layers before being laminated on the transparent electrode pattern are in a state of being not cured.

15. A transparent electrode-attached complex manufactured using the method for manufacturing a transparent electrode-attached complex according to claim 11.

16. An electrostatic capacitance-type input device comprising:
the transparent electrode-attached complex according to claim 1.

17. The transparent electrode-attached complex according to claim 1, wherein the refractive index of the high-refractive index layer is 1.80 or lower.

18. The transparent electrode-attached complex according to claim 1, wherein the low-refractive index layer and the high-refractive index layer are cured films of curable transparent resin layers.

19. The transparent electrode-attached complex according to claim 1, wherein the low-refractive index layer is a transparent layer.

20. The transparent electrode-attached complex according to claim 1, wherein the transparent protective layer is a cured film of a transparent resin layer.

21. The transparent electrode-attached complex according to claim 1, wherein the low-refractive index layer, the high-refractive index layer and the transparent protective layer are cured film of transparent resin layers.

* * * * *